US009485328B2

(12) United States Patent
Abe et al.

(10) Patent No.: US 9,485,328 B2
(45) Date of Patent: Nov. 1, 2016

(54) GAME CONTROL DEVICE, GAME PROGRAM, GAME CONTROL METHOD AND GAME SYSTEM

(75) Inventors: Yosuke Abe, Tokyo (JP); Minoru Yoneyama, Kashiwa (JP); Kenji Suzuki, Tokyo (JP); Yuji Minohoshi, Yokohama (JP); Masaki Morimoto, Saitama (JP); Kiwamu Takahashi, Kashiwa (JP); Mitsuru Kida, Ebina (JP); Kosuke Shimizu, Koganei (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 52 days.

(21) Appl. No.: 13/409,499

(22) Filed: Mar. 1, 2012

(65) Prior Publication Data
US 2012/0231888 A1  Sep. 13, 2012

(30) Foreign Application Priority Data

Mar. 9, 2011 (JP) ................................ 2011-050994
Sep. 12, 2011 (JP) ................................ 2011-198063

(51) Int. Cl.
A63F 13/58 (2014.01)
H04L 29/06 (2006.01)
A63F 13/812 (2014.01)

(52) U.S. Cl.
CPC ............. *H04L 67/38* (2013.01); *A63F 13/58* (2014.09); *A63F 13/812* (2014.09); *A63F 2300/5573* (2013.01); *A63F 2300/6018* (2013.01)

(58) Field of Classification Search
CPC ..................................................... A63F 13/58
USPC ........................................................ 463/1, 4
See application file for complete search history.

(56) References Cited

U.S. PATENT DOCUMENTS 5,885,156 A * 3/1999 Toyohara et al. ................. 463/1
6,251,010 B1 * 6/2001 Tajiri et al. ........................ 463/1
(Continued)

FOREIGN PATENT DOCUMENTS

JP 2000-189677 A 7/2000
JP 2003-019355 A 1/2003
(Continued)

OTHER PUBLICATIONS

Office Action of the corresponding Japanese Patent Application No. 2011-050994, dated May 31, 2011, and a brief English Summary.
(Continued)

*Primary Examiner* — Jay Liddle
(74) *Attorney, Agent, or Firm* — Global IP Counselors, LLP

(57) ABSTRACT

The game control device may include a storage unit, a first match-up executing unit, a character ability updating unit, and a second match-up executing unit. The storage unit stores an ability value of each player character. The first match-up executing unit executes a first match-up between two player characters in response to input of a communication terminal, and to determine a result of the first match-up based on the stored ability value of each player character. The character ability updating unit updates, based on the result of the first match-up, the ability values of the two player characters, and causes the storage unit to store the updated ability values. The second match-up executing unit executes a second match-up between player characters independently from the first match-up without input of the communication terminal, and determines a result of the second match-up based on the stored ability value of each player character.

26 Claims, 30 Drawing Sheets

(56) References Cited

U.S. PATENT DOCUMENTS

| | | | |
|---|---|---|---|
| 6,679,774 B2* | 1/2004 | Fujioka et al. | 463/1 |
| 6,685,565 B2* | 2/2004 | Tanibuchi et al. | 463/31 |
| 7,300,344 B2* | 11/2007 | Fujioka et al. | 463/4 |
| 8,272,961 B2* | 9/2012 | Busey et al. | 463/42 |
| 8,328,644 B2* | 12/2012 | Busey et al. | 463/42 |
| 2006/0258463 A1* | 11/2006 | Cugno et al. | 463/42 |
| 2006/0270478 A1* | 11/2006 | Barhydt et al. | 463/41 |
| 2007/0243936 A1* | 10/2007 | Binenstock et al. | 463/42 |
| 2008/0207332 A1* | 8/2008 | Bortnik et al. | 463/42 |
| 2009/0149248 A1* | 6/2009 | Busey et al. | 463/29 |
| 2009/0247303 A1* | 10/2009 | Yamaguchi | 463/42 |
| 2010/0197408 A1* | 8/2010 | Tsurisaki | 463/42 |
| 2012/0015726 A1* | 1/2012 | Busey et al. | 463/31 |

FOREIGN PATENT DOCUMENTS

| | | |
|---|---|---|
| JP | 2005-027950 A | 2/2005 |
| JP | 2006-346123 A | 12/2006 |
| JP | 2008-036240 A | 2/2008 |
| JP | 2008-264183 A | 11/2008 |
| JP | 2009-034318 A | 2/2009 |
| JP | 2014-133151 A | 7/2014 |
| JP | 2014-133152 A | 7/2014 |

OTHER PUBLICATIONS

LOGiN (Enterbrain Inc.) p. 86-87 dated Jun. 2007.
Yakyutsuku 3 Official Complete Guide (Enterbrain Inc.) p. 58-59, p. 64-66 dated Jul. 28, 2006.
Japanese Office Action for 2014-107774 dated Sep. 2, 2014.
Weekly Famitsu dated May 12, 2011, pp. 102-103.
Kimisuta Official Book Kanzen Kouryaku Guide dated Sep. 1, 2010, pp. 003, 006 and 007.

* cited by examiner

PLAYER DATABASE

☐SELECT YOUR OPPONENT!☐
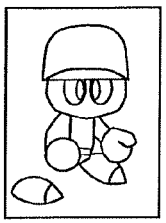 RIC    TX_ATHLETES
Lv.XX
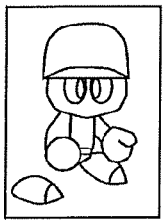 TOM    NY_STARS
Lv.XX
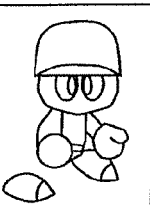 KAY    CA_LIONS
Lv.XX
...
...
FIG.8

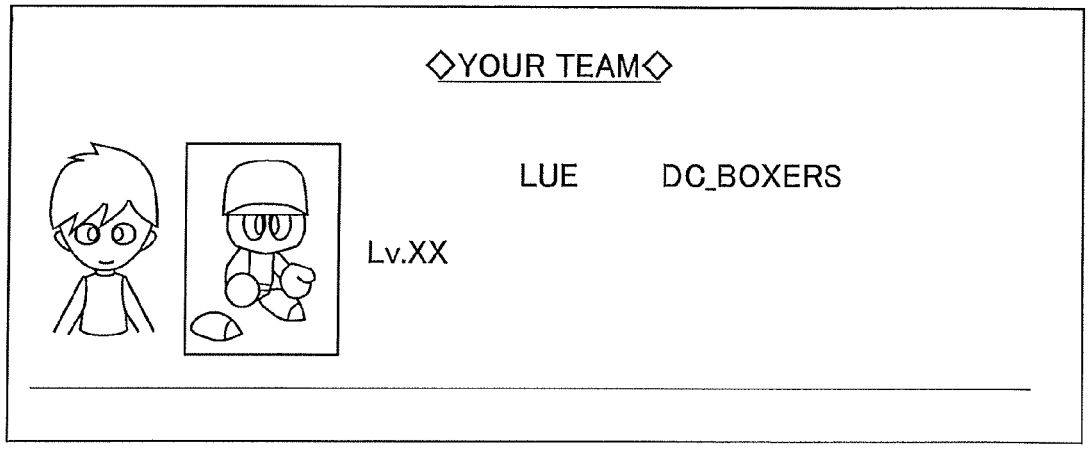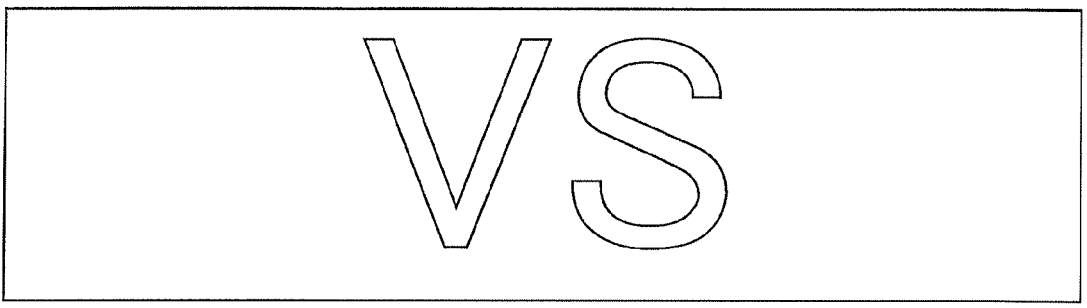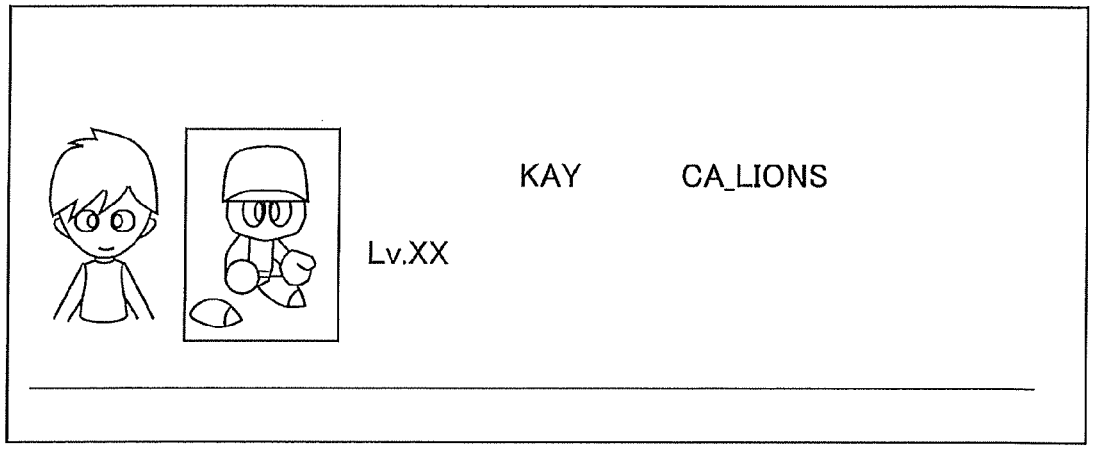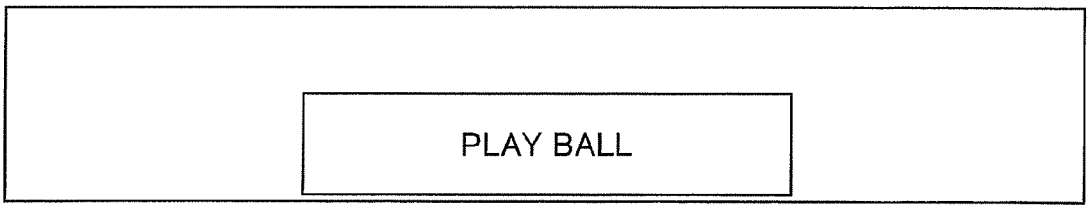
FIG.9

Sa
```
YOU WON THE GAME!
```
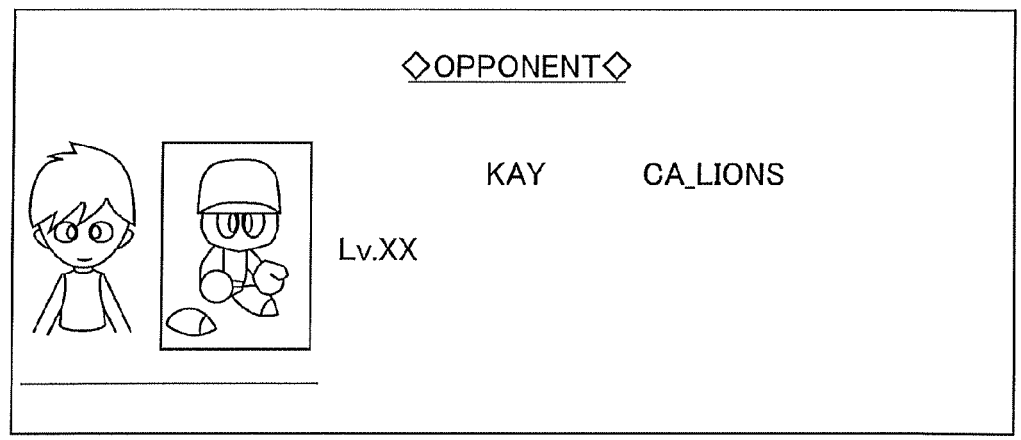
Sb
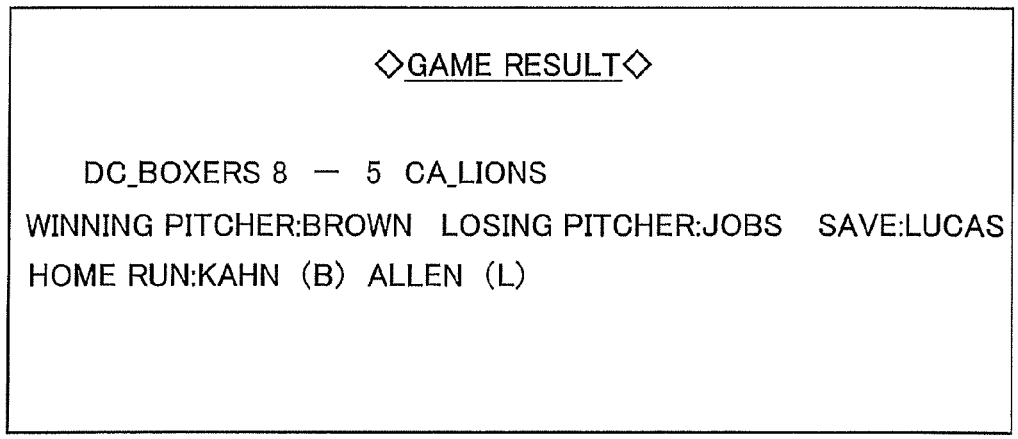
FIG.10

Sa — YOU LOST THE GAME!
◇OPPONENT◇
 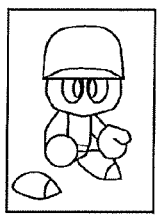
Lv.XX          KAY     CA_LIONS
Sb —
◇GAME RESULT◇
DC_BOXERS 2 — 5 CA_LIONS
WINNING PITCHER:JOBS   LOSING PITCHER:BROWN
HOME RUN:HURT (L)
FIG.11

| CLASS: 1 | RESULTS OF THIRD SEASON'S LEAGUE COMPETITION ON MATCH 11 | | | |
|---|---|---|---|---|
| MATCH-UP ID | WINNING GAME PLAYER ID | LOSING GAME PLAYER ID | SCORES | OTHER DATA |
| XXXXXX | 000001 | 000395 | 3-2 | ... |
| ⋮ | ⋮ | ⋮ | ⋮ | |

LEAGUE COMPETITION DATABASE

FIG.12

| CLASS: 1 | LEAGUE COMPETITION RANKING | | | |
|---|---|---|---|---|
| No. | GAME PLAYER ID | WINS | LOSSES | TIES |
| 1 | 000049 | 18 | 0 | 0 |
| 2 | 001301 | 17 | 0 | 1 |
| ⋮ | ⋮ | ⋮ | ⋮ | ⋮ |
| | | | | |
| | | | | |

RANKING DATABASE

FIG.13

◇◇RESULTS OF LEAGUE COMPETITION◇◇

☆THIS WEEK☆
  REGULAR LEAGUE 1  45 WINS, 15 LOSSES
  RANKING OF 6573/20573 PLAYERS
☆LAST WEEK☆
  ROOKIE LEAGUE 2   50 WINS, 10 LOSSES,
  RANKING OF 2402/19765 PLAYERS

---

◇◇6TH SEASON REMAINING TIME TO START: 00 HOURS 15 MINUTES◇◇

2011/01/21  22:00
1ST GAME  VS NY_STARS
2ND GAME  VS LA_BEAMS
3RD GAME  VS FL_JAWS

---

◇◇5TH SEASON GAME OVER◇◇

2011/01/21  18:00
1ST GAME  VS NY_STARS    3-11 DETAILS OF RESULT
2ND GAME  VS LA_BEAMS    3-11 DETAILS OF RESULT

⋮

---

◇◇4TH SEASON GAME OVER◇◇

FIG.14

◇◇RESULTS OF LEAGUE COMPETITION◇◇

☆THIS WEEK☆
 REGULAR LEAGUE 1  45 WINS, 15 LOSSES
 RANKING OF 6573/20573 PLAYERS

PROMOTION/DEMOTION COMPETITION (DEMOTED) 3 WINS, 7 LOSSES
 RANKING OF 17000/23456 PLAYERS

☆LAST WEEK☆
 ROOKIE LEAGUE 2   50 WINS, 10 LOSSES
 RANKING OF 2402/19765 PLAYERS

PROMOTION/DEMOTION COMPETITION (PROMOTED)18 WINS 6 LOSSES
 RANKING OF 5123/17689 PLAYERS

---

◇◇6TH SEASON REMAINING TIME TO START: 00 HOURS 15 MINUTES◇◇
     2011/01/21  22:00
     1ST GAME  VS NY_STARS
     2ND GAME  VS LA_BEAMS
     3RD GAME  VS FL_JAWS

---

◇◇5TH SEASON GAME OVER◇◇

2011/01/21  18:00
1ST GAME  VS NY_STARS    3-11 DETAILS OF RESULT
2ND GAME  VS LA_BEAMS    3-11 DETAILS OF RESULT

⋮

---

◇◇4TH SEASON GAME OVER◇◇

GO TO LEAGUE COMPETITION RESULT

Sb —

NUMBER OF TICKES YOU HAVE NOW: 12 TICKETS

- YOU ARE ALLOWED TO DRAW ONCE FROM TITLE HOLDERS

DRAW

- YOU NEED 8 MORE TICKETS FOR DRAWING
  FROM BEST NINE PLAYERS OF THE YEAR

GAME CONTROL DEVICE, GAME PROGRAM, GAME CONTROL METHOD AND GAME SYSTEM

CROSS-REFERENCE TO RELATED APPLICATION

This application is based upon and claims the benefit of priority of the prior Japanese Patent Application No. 2011-050994, filed on Mar. 9, 2011, and the prior Japanese Patent Application No. 2011-198063, filed on Sep. 12, 2011, the entire contents of which are incorporated herein by reference.

TECHNICAL FIELD

The present invention relates to a technology for executing a match-up game to be executed on a network by the unspecified majority of game players through communication terminals accessible to the network.

BACKGROUND

Game players have enjoyed playing games by operating game devices for themselves. In such well-known situations, the game devices normally include hardware for loading and running video game application software (i.e., video game application). Match-up games (e.g., baseball games) have been popular as video games to be run by such video game applications. To realize video games full of amusement, diversity has been embedded not only in types of the match-up but also in the other factors. As an example of diversity, the video games have been embedded with a function of allowing a game player to customize an ability of a game character (i.e., a player character) as a game player's operating target.

For example, Japan Laid-open Patent Application Publication No. JP-A-2000-189677 describes a game system (a baseball game) including a schedule creating unit configured to create an action schedule of a player character. The game system is configured to change (e.g., enhance) an ability of the player character, for instance, through an instruction of causing the player character to perform a specific action. In the game system, it is assumed that a game player plays a nurturing mode of nurturing (i.e., enhances the ability of) the player character and then plays a match-up mode with another game player or computer, or alternatively, a game player alternately plays the nurturing mode and the match-up mode.

Now, so-called social games have been recently widespread. The social games are configured to be run by video game applications created based on the operating environment such as API (Application Programming Interface) to be operated on web browsers in SNS (Social Networking Service). The social games are a type of online games to be played by the unspecified majority of game players communicating with each other. However, unlike the well-known online games, the social games are not a type of games to be played by game players through video game devices with a communication function and video game software embedded therein. Therefore, game players are not required to install or download such video game software. In short, game players can execute social games if they bring web-browser embedded communication devices with them. For example, game players can enjoy playing social games regardless of time and places if they bring portable terminals accessible to the Internet with them.

Some of the aforementioned social games are of user friendly. In the cases of match-up types, the social games are often configured to allow game players to immediately confirm a result of a match-up. Therefore, such social games are now being accepted by game players who do not want to spend much time for playing games or game players who want to casually play games. On the other hand, the social games have a drawback that the game element thereof is simple for game players who have enjoyed playing games by operating the well-known game devices and such game players may thereby easily get bored. In a baseball game using a game device of the well-known type, for instance, a game player operating a batter character is required to perform an operation of causing the batter character to swing a bat towards a ball moving towards the batter character in an appropriate timing. When a baseball game is realized as a social game, by contrast, a simple operation of pressing a button without considering timing may be only required without requiring such an operation to be performed with concentration. Therefore, those game players who want to fully enjoy playing a baseball game are not satisfied with the baseball games to be realized as the social games. By contrast, those game players who want to casually enjoy playing a baseball game easily accept the baseball games to be realized as the social games due to simple operability thereof. Rather, simple operability can be an essential point for those game players who cannot spend much time for playing games.

The aforementioned well-known baseball games would be highly amusing in that an element of nurturing a player character is embedded therein. However, each game player is required to perform a time-consuming operation of nurturing a player character and subsequently playing match-ups with other game players or a computer. Therefore, it is not easy for a lot of game players, who want to enjoy playing games with a simple operation for a short period of time, to accept the well-known baseball games.

The present invention has been proposed in view of the above. It is an object of the present invention to provide a game control device, a game program, a game control method and a game system, which are full of amusement and allow a game player to play a game with a simple operation without getting the game player bored.

SUMMARY OF THE INVENTION

First aspect of the present invention may be a game control device connected to at least one communication terminal through a network, the at least one communication terminal being operated by a game player, for executing a match-up between two player characters associated with two respective sets of unique game player identification information, the game control device including:

a storage unit configured to store an ability value of each player character in association with a corresponding set of unique game player identification information;

a first match-up executing unit configured to execute a first match-up between two player characters in response to an input at one of the aforementioned at least one communication terminal, the two player characters being associated with different sets of game player identification information, and to determine a result of the first match-up based on the stored ability value of each player character;

a character ability updating unit configured to update, based on the result of the first match-up, the ability values of the two player characters associated with the different sets of game player identification information, and to cause the storage unit to store the updated ability values;

a second match-up executing unit configured to execute a second match-up between player characters independently from the first match-up without an input at the one of the aforementioned at least one communication terminal, the player characters being associated with different sets of game player identification information, and to determine a result of the second match-up based on the stored ability value of each player character; and a notifying unit configured to notify the one of the aforementioned at least one communication terminal of a result of a result of at least one second match-up either for a predetermined term in the past or at a predetermined number of times and/or of a ranking of a corresponding set of game player identification information based on the aforementioned result of at least one second match-up.

A game control device described in the specification of the present application may be connected to at least a communication terminal to be operated by a game player and may be configured to execute a match-up between player characters associated with sets of unique game player identification information. Any suitable information processing devices may be used as the game control device as long as they can establish connections with, for instance, the respective communication devices of the specified or unspecified majority of game players through a network. For example, such game control device may be a single or plurality of servers disposed in the network or may be a large-sized computer device. Further, a single communication terminal may not be necessarily associated fixedly with a single game player. For example, it is possible to assume a usage environment that a single communication terminal is shared by a plurality of game players. Therefore, the game control device may be configured to manage game players based on sets of game player identification information (e.g., game player IDs) as a set of information for uniquely specifying game players playing a match-up game.

Second aspect of the present invention may be a game program configured to cause a computer to realize a plurality of functions, the computer connected to at least one communication terminal through a network, the at least one communication terminal being operated by a game player, for executing a match-up between two player characters associated with two respective sets of unique game player identification information, the functions including:

a storage function of causing a storage unit to store an ability value of each player character in association with a corresponding set of unique game player identification information;

a first match-up executing function of executing a first match-up between two player characters in response to an input at one of the aforementioned at least one communication terminal, the two player characters being associated with different sets of game player identification information, and to determine a result of the first match-up based on the stored ability value of each player character;

a character ability updating function of updating, based on the result of the first match-up, the ability values of the two player characters associated with the different sets of game player identification information, and to cause the storage unit to store the updated ability values;

a second match-up executing function of executing a second match-up between player characters independently from the first match-up without an input at the one of the aforementioned at least one communication terminal, the player characters being associated with different sets of game player identification information, and to determine a result of the second match-up based on the stored ability value of each player character; and a notifying function of notifying the one of the aforementioned at least one communication terminal of a result of a result of at least one second match-up either for a predetermined term in the past or at a predetermined number of times and/or of a ranking of a corresponding set of game player identification information based on the aforementioned result of at least one second match-up.

Third aspect of the present invention may be a game control method configured to be executed by a game control device connected to at least one communication terminal through a network, the at least one communication terminal being operated by a game player, for executing a match-up between two player characters associated with two respective sets of unique game player identification information, the game control method including the steps of:

executing a first match-up between two player characters in response to an input at one of the aforementioned at least one communication terminal, the two player characters being associated with different sets of game player identification information, and to determine a result of the first match-up based on the stored ability value of each player character;

updating, based on the result of the first match-up, the ability values of the two player characters associated with the different sets of game player identification information, and to cause the storage unit to store the updated ability values;

executing a second match-up between player characters independently from the first match-up without an input at the one of the aforementioned at least one communication terminal, the player characters being associated with different sets of game player identification information, and to determine a result of the second match-up based on the stored ability value of each player character; and notifying the one of the aforementioned at least one communication terminal of a result of a result of at least one second match-up either for a predetermined term in the past or at a predetermined number of times and/or of a ranking of a corresponding set of game player identification information based on the aforementioned result of at least one second match-up.

Fourth aspect of the present invention may be a game system including at least one communication terminal operated by a game player and a game control device connected to each of the aforementioned at least one communication terminal through a network for executing a match-up between two player characters associated with two sets of unique game player identification information, wherein the game control device may include:

a storage unit configured to store an ability value of each player character in association with a corresponding set of unique game player identification information;

a first match-up executing unit configured to execute a first match-up between two player characters in response to an input at one of the aforementioned at least one communication terminal, the two player characters being associated with different sets of game player identification information, and to determine a result of the first match-up based on the stored ability value of each player character;

a character ability updating unit configured to update, based on the result of the first match-up, the ability values of the two player characters associated with the different sets of game player identification information, and to cause the storage unit to store the updated ability values;

a second match-up executing unit configured to execute a second match-up between player characters independently from the first match-up without an input at the one of the aforementioned at least one communication terminal, the player characters being associated with different sets of game player identification information, and to determine a result of the second match-up based on the stored ability value of each player character; and a notifying unit configured to notify the one of the aforementioned at least one communication terminal of a result of a result of at least one second match-up either for a predetermined term in the past or at a predetermined number of times and/or of a ranking of a corresponding set of game player identification information based on the aforementioned result of at least one second match-up.

BRIEF DESCRIPTION OF THE DRAWINGS

Referring now to the attached drawings which form a part of this original disclosure:

FIG. 8 is an exemplary screen to be displayed on the communication terminal according to the first exemplary embodiment;

FIG. 9 is an exemplary screen to be displayed on the communication terminal according to the first exemplary embodiment;

FIG. 10 is an exemplary screen to be displayed on the communication terminal according to the first exemplary embodiment;

FIG. 11 is an exemplary screen to be displayed on the communication terminal according to the first exemplary embodiment;

FIG. 12 is an exemplary configuration diagram of a league competition database included in the database server;

FIG. 13 is an exemplary configuration diagram of a ranking database included in the database server;

FIG. 14 is an exemplary screen to be displayed on the communication terminal according to the first exemplary embodiment;

FIG. 20 is an exemplary screen to be displayed on a communication terminal according to the second exemplary embodiment;

DETAILED DESCRIPTION OF THE EMBODIMENTS (1) First Exemplary Embodiment (1-1) Game System Structure FIG. 1 illustrates an exemplary system configuration of a game system in an exemplary embodiment. As illustrated in FIG. 1, the game system includes a plurality of communication terminals 10a, 10b, 10c and etc., a game server 20 and a database server 30. The communication terminals 10a, 10b, 10c and etc. are connectable to a communication network NW (e.g., the Internet). The game server 20 is connected to the communication network NW. Each of the communication terminals 10a, 10b, 10c and etc. is a terminal device to be operated by an individual game player, such as a portable terminal, PDA (Personal Digital Assistant), a personal computer or the like. It should be noted that the communication terminals 10a, 10b, 10c and etc. will be hereinafter referred to as "communication terminal(s) 10" for describing them in common. In the game system, the game server 20 is embedded with an application operable on the web browser as a video game application. Each communication terminal 10 is embedded with a web browser configured to display a webpage provided by the game server 20. Each game player operates his/her communication terminal 10 for executing a video game on the webpage. The database server 30 stores a variety of information required for executing the video game as described below. To read and write the information, the database server 30 is connected to the game server 20 by means of e.g., a wired connection.

Figure 1:
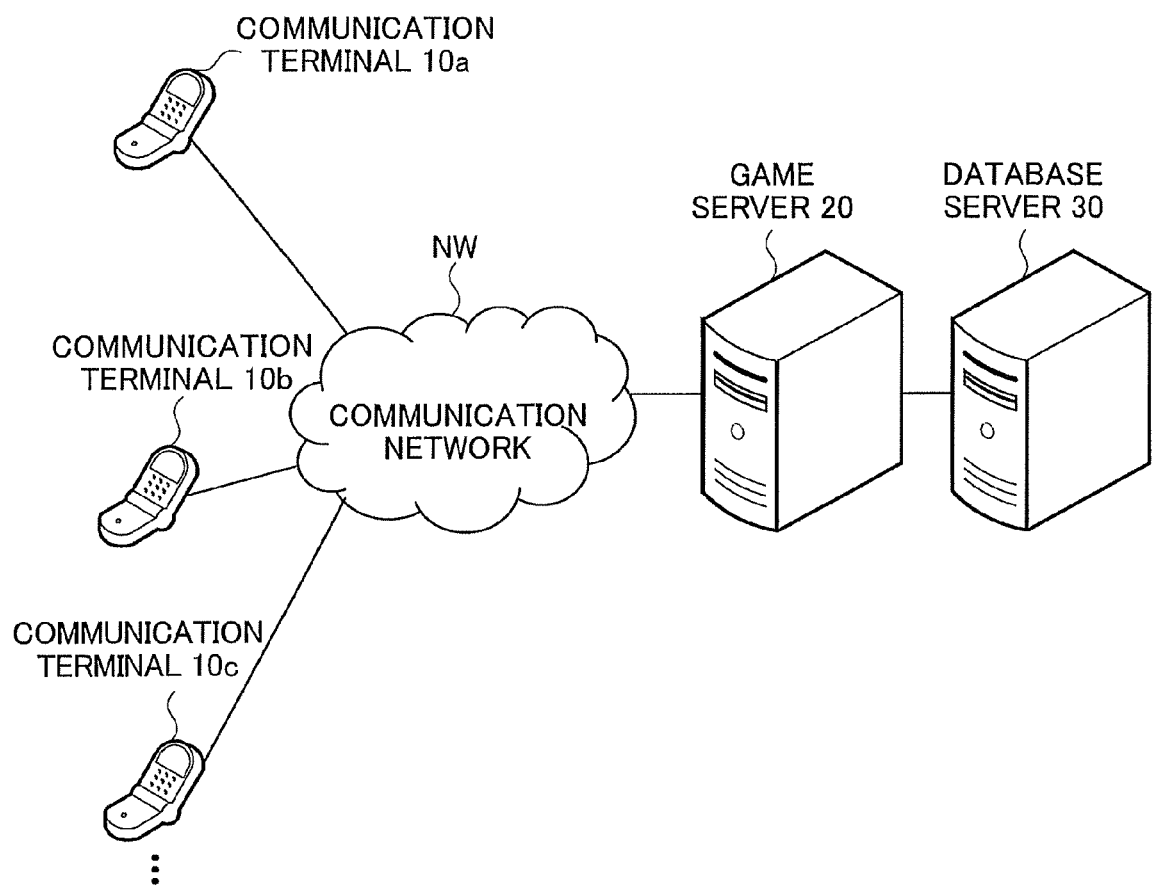
FIG. 1 is a basic configuration diagram of a game system according to a first exemplary embodiment.

In addition to the game server 20, an authentication server may be provided for authenticating respective game players of the communication terminals 10, although not illustrated in FIG. 1. Further, in providing a plurality of the game servers 20 for receiving accesses from a large number of the communication terminals 10, a load balancer may be provided for regulating loads among the plural game servers 20. Yet further, the game server 20 may be configured as a single server device or as a plurality of server devices among which functions are distributed.

(1-2) Communication Terminal Structure

The configuration of each communication terminal 10 will be hereinafter explained with reference to FIG. 2.

Figure 2:
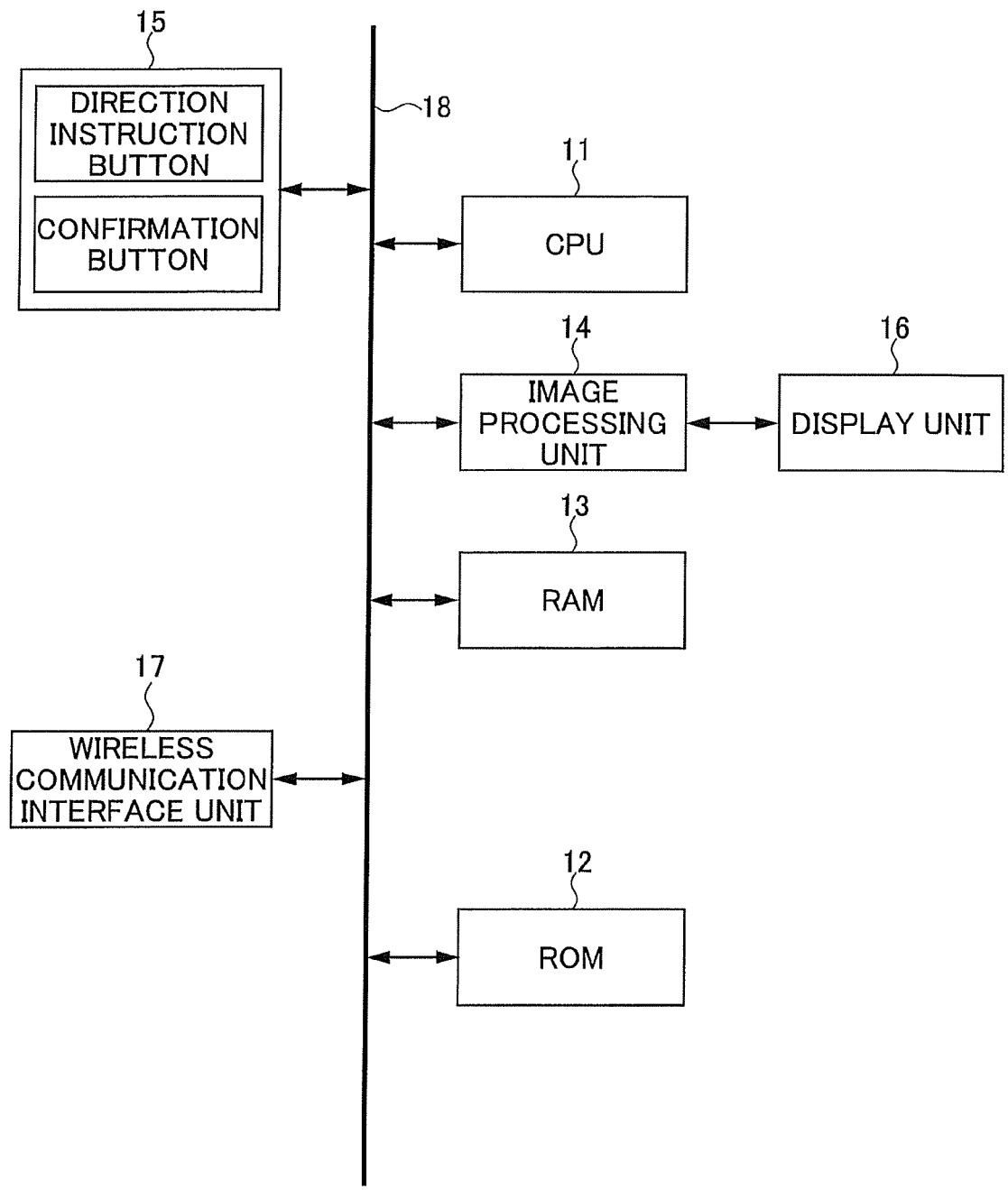
FIG. 2 is a configuration block diagram of a communication terminal according to the first exemplary embodiment.

As represented in FIG. 2, each communication terminal 10 includes a CPU (Central Processing Unit) 11, a ROM (Read Only Memory) 12, a RAM (Random Access Memory) 13, an image processing unit 14, an operation input unit 15, a display unit 16 and a wireless communication interface unit 17. Further, each communication terminal 10 includes a bus 18 for transmitting control signals or data signals among components.

The CPU 11 is configured to load a web browser stored in a ROM 12 into a RAM 13 and runs the web browser therein. Further, the CPU 11 is configured to obtain data for displaying a webpage, i.e., an HTML (Hyper Text Markup Language) document and data of objects such as images associated with the HTML document (hereinafter collectively referred to as "HTML data" on an as-needed basis), from the game server 20 through the wireless communication interface unit 17 based on an appropriately specified URL (Uniform Resource Locator) to be inputted by a game player using the operation input unit 15 and the like. The CPU 11 is then configured to interpret the obtained HTML data. It should be noted that each communication terminal 10 may be embedded with a variety of plug-ins for extending browsing functions of the web browser.

In obtaining the HTML data, the CPU 11 is configured to transmit an access request message to the game server 20 through the wireless communication interface unit 17. The access request message herein includes either a preliminarily registered game player ID (i.e., a set of game player identification information) or a game player ID inputted through the operation input unit 15.

The web browser is configured to display the webpage provided from the game server 20 on the display unit 16 through the image processing unit 14 based on the obtained HTML data. Further, when either a Hyperlink or an object on the webpage is selected through a game player's operation of the operation input unit 15, the web browser is configured to request the game server 20 to transmit new HTML data for displaying a webpage corresponding to the selection.

The image processing unit 14 is configured to display a webpage on the display unit 16 based on the image data for display to be provided from the CPU 11 as an analysis result of the HTML data. For example, the display unit 16 is a LCD (Liquid Cristal Display) monitor including thin-film transistors arranged in a matrix manner on a pixel-by-pixel basis.

The display unit 16 is configured to display the image of the webpage by driving the thin-film transistors based on the image data for display.

The operation input unit 15 may include a plurality of buttons for receiving a game player's operational input and an interface circuit that is configured to recognize an input through press-down of each button and output the input to the CPU 11. However, FIG. 2 exemplifies a directional instruction button and a confirmation button as the operation input unit 15. For example, the directional instruction button is provided for instructing the CPU 11 to scroll-display a webpage currently displayed on the display unit 16. On the other hand, the confirmation button is provided for instructing the CPU 11 to select one of a plurality of Hyperlinks or objects displayed on a webpage, which is activated (e.g., highlighted) as a result of a game player's selection. When the communication terminal 10 is a small portable terminal, the aforementioned buttons are preferably disposed on the front face of the communication terminal 10 for allowing a game player to easily operate the buttons with the thumb of a hand holding the communication terminal 10.

(1-3) Game Server Structure

Figure 3:
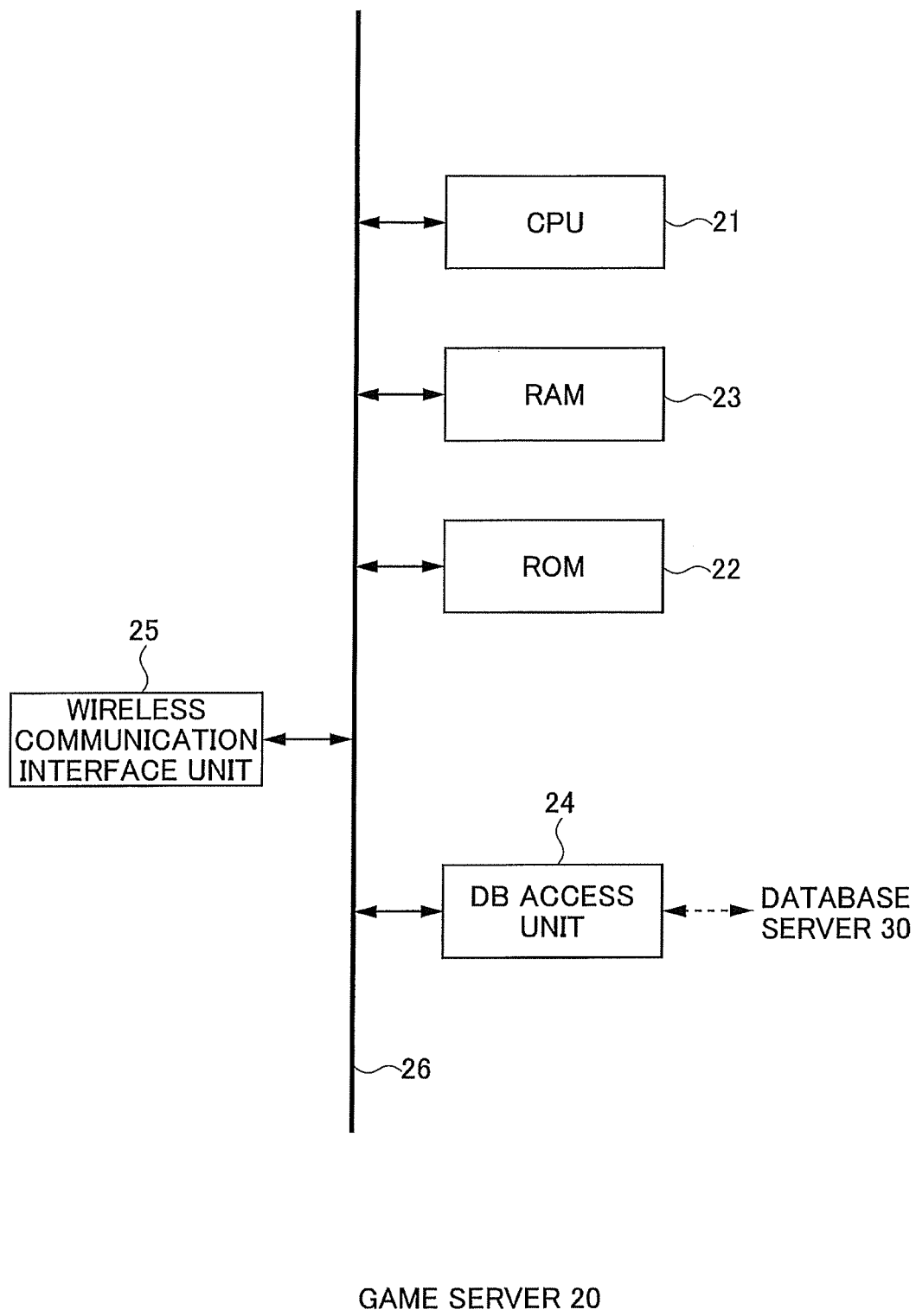
FIG. 3 is a configuration block diagram of a game server according to the first exemplary embodiment.

The structure of the game server 20 will be hereinafter explained with reference to FIG. 3.

For example, the game server 20 manages a website of a match-up game including a plurality of hierarchically structured webpages. The game server 20 provides a web service of the match-up game to the communication terminals 10. As represented in FIG. 3, the game server 20 includes a CPU 21, a ROM 22, a RAM 23, a database (DB) access unit 24 and a communication interface unit 25. Further, the game server 20 includes a bus 26 for transmitting control signals or data signals among the components. It should be noted that the game server 20 may have the same hardware structure as the general-purpose web servers.

The ROM 22 stores an application program (a game program in the present exemplary embodiment) configured to provide the service of displaying a HTML document and objects such as images (i.e., displaying a webpage) to the web browser of each communication terminal 10 as a client.

The CPU 21 is configured to load the game program stored in the ROM 22 into the RAM 23 and run the loaded game program therein and also execute a variety of processing through the communication interface unit 25.

For example, the CPU 21 is configured to transmit the HTML data to each communication terminal 10 through the communication interface unit 25. When the game server 20 herein executes authentication processing for the communication terminal 10 of each game player, the CPU 21 is in charge of the authentication processing.

The CPU 21 is configured to execute a variety of processing through the communication interface unit in accordance with a Hyperlink or an object selected by each game player on the webpage displayed on the communication terminal 10. For example, the processing herein includes transmission of new HTML data, computation or data processing within the game server 20 and etc.

The database access unit 24 is an interface functioning when the CPU 21 executes data reading and data writing with respect to the database server 30.

(1-4) Database Server Structure

The database server 30 can be realized by a general-purpose storage (e.g., a high-capacity hard disc drive, a RAID (Redundant Arrays of Inexpensive Disks) type device and etc.). The CPU 21 is herein allowed to read/write data from/in respective databases stored in the database server 30 through the database access unit 24 of the game server 20.

Figure 4:
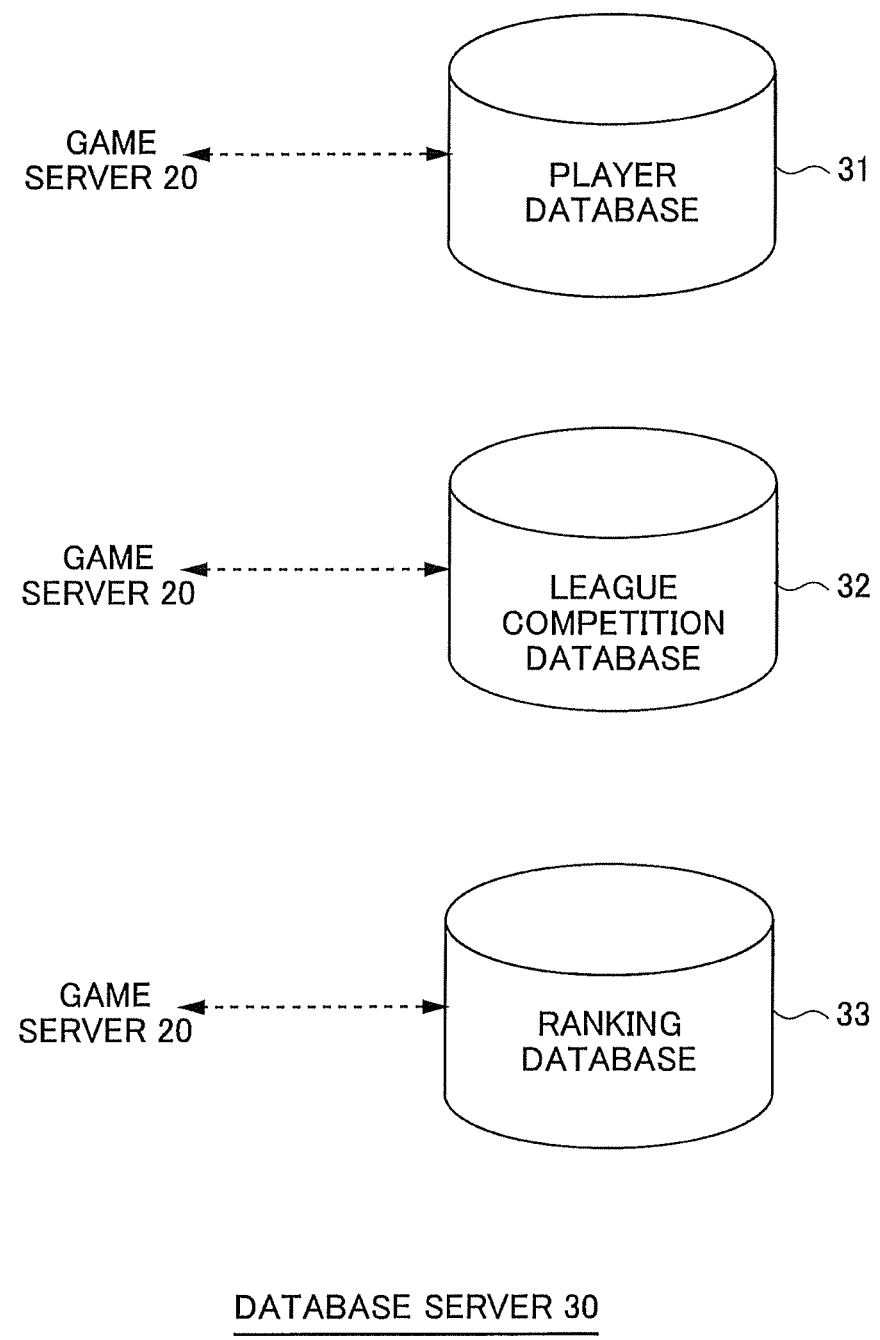
FIG. 4 is a configuration block diagram of a database server according to the first exemplary embodiment.

FIG. 4 represents an exemplary structure of the database server 30. FIG. 4 exemplifies databases for realizing the match-up game to be described. The database server 30 includes a player database 31, a league competition database 32 and a ranking database 33. The contents of the databases 31, 32 and 33 will be hereinafter explained.

(1-5) Overview of Various Functions of Game Control Device

Figure 5:
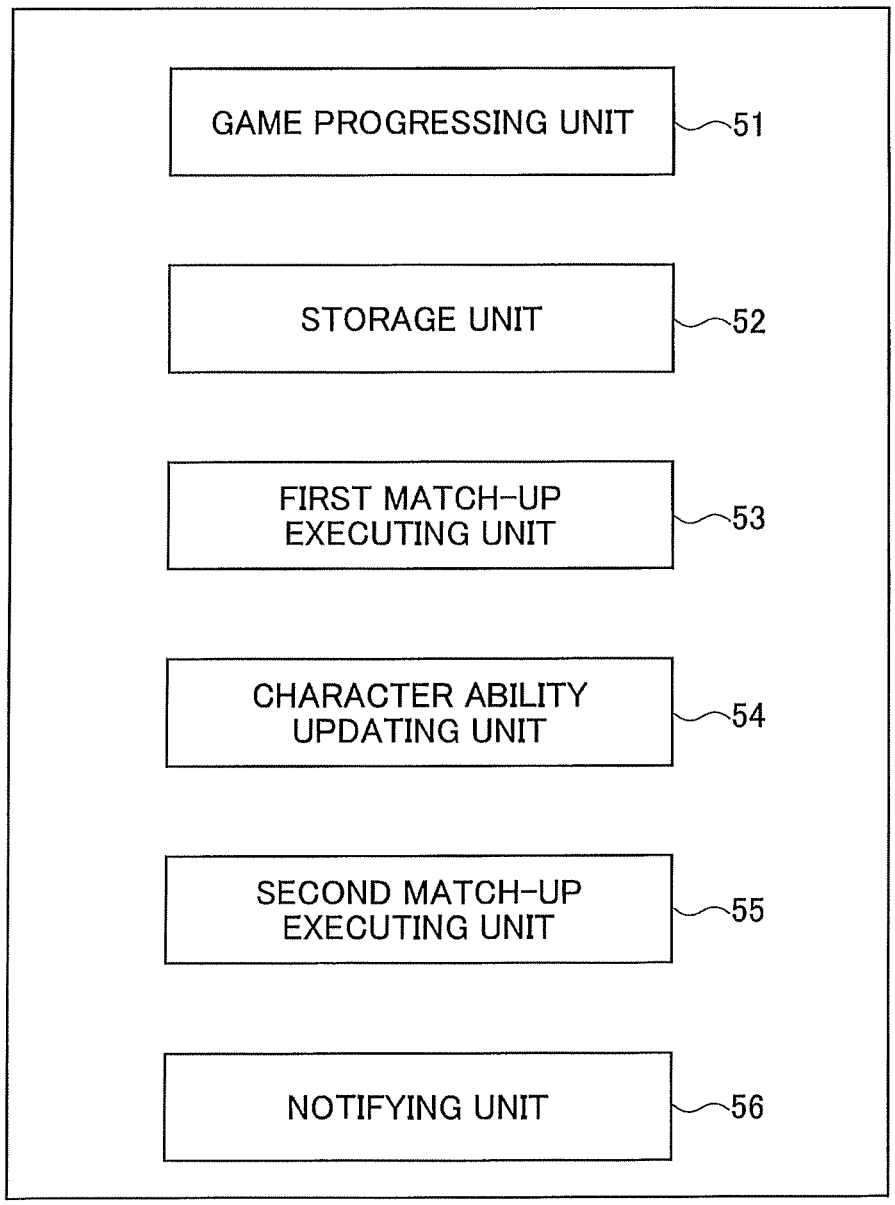
FIG. 5 is a functional block diagram for explaining functions playing main roles in a game control device according to the first exemplary embodiment.

In the present exemplary embodiment, a game control device of the present invention is formed by the game server 20 and the database server 30. Any suitable game can be selected as a game to be executed by the game control device as long as it is a type of game including an element of a match-up between game players (i.e., a match-up game) such as a game simulating a sport (e.g., baseball, football, etc.) or a game simulating battles. In the following example, a baseball game (digital card game) is executed as an exemplary match-up game. In the baseball game, each game player has a team composed of a plurality of baseball players (i.e., player characters) and aims at enhancement of abilities of the player characters or upgrade of a class (alternatively, an order in the ranking, a rank, etc.) of his/her team (i.e., the game player) through the match-ups with the other game players. Each player character is herein configured to be displayed as a card on each game player's communication terminal. Appearance of the player character during a game, abilities of the player character and so forth are displayed on the front face of the card. The baseball game is configured to execute collection of player characters corresponding to cards, updating of abilities (i.e., enhancement) of player characters, match-ups with teams of the other game players, and etc. With reference to FIG. 5, explanation will be hereinafter given for functions to be realized by the game control device when the aforementioned game is executed by the game control device of the present exemplary embodiment. FIG. 5 is a functional block diagram for explaining functions playing main roles in the game control device of the present exemplary embodiment.

In the baseball game of the present exemplary embodiment, two types of match-ups are configured to be progressed. One is an individual competition (i.e., a first match-up) configured to be held between player characters associated with different unique game player IDs in response to a game player's operational input at the communication terminal 10. The other is a league competition (i.e., a second match-up) configured to be automatically held between player characters associated with different unique game player IDs without a game player's operational input at the communication terminal 10.

It should be noted that the term "match-up between game player IDs" will be hereinafter synonymous for the term "match-up between characters associated with different unique game player IDs".

A game progressing unit 51 has a function of progressing the video game configured to be displayed on each game player's communication terminal 10 through the webpage displayed thereon in accordance with a game player's operation of the communication terminal 10. For example, as the game processing unit 51, the CPU 21 of the game server 20 is configured to transmit the HTML data to the communication terminal 10 through the communication interface unit 25 for allowing the communication terminal 10 to display a new webpage in accordance with either Hyperlink or an object selected by each game player on the currently displayed webpage. The CPU 21 is configured to sequentially transmit new HTML data in accordance with the Hyperlink/object selected by each game player on the currently displayed webpage. Accordingly, the webpage displayed on the communication terminal 10 is sequentially switched. Each game player thereby recognizes progression of the video game.

Further, when receiving an access request message from the communication terminal 10 through the communication interface 25 prior to start of the video game, the CPU 21 of the game server 20, as the game progressing unit 51, is configured to execute a predetermined authentication processing and subsequently recognize a game player ID included in the access request message from the communication terminal 10. Yet further, the CPU 21 of the game server 20 is configured to manage progression of the video game displayed on the respective communication terminals 10 on a game player ID basis. For example, a game player ID may be configured to be assigned to a game player after the game player accesses the website of the baseball game provided by the game server 20 through the communication terminal 10 and completes a predetermined procedure.

Figure 6:
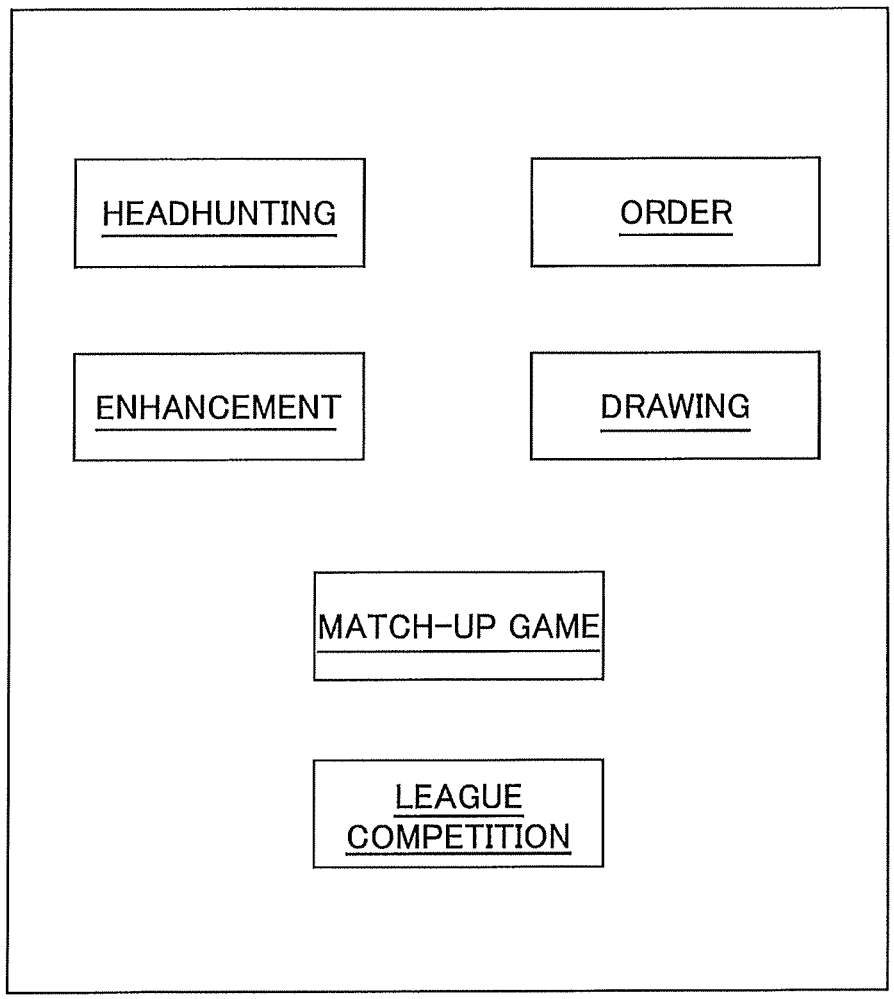
FIG. 6 is an exemplary screen to be displayed on the communication terminal according to the first exemplary embodiment.

FIG. 6 is an exemplary webpage to be displayed on the communication terminal 10 by the game progressing unit 51. The webpage illustrated in FIG. 6 is configured to be displayed on the communication terminal 10 when each game player accesses the website of the baseball game provided by the game server 20 through the communication terminal 10. The webpage corresponds to a main menu screen of the baseball game. In the webpage illustrated in FIG. 6, Hyperlinked text character sequences are displayed within predetermined areas (objects). For example, the text character sequences include "HEADHUNTING", "ORDER", "ENHANCEMENT", "DRAWING", "MATCH-UP GAME" and "LEAGUE COMPETITION". For example, when one of the text character sequences is selected by moving a cursor with the directional instruction button onto an intended text character sequence and pressing the confirmation button, the currently displayed screen is changed into a screen for executing the content of the selected one of the text character sequences. "HEADHUNTING" herein refers to obtaining a player character. For example, "HEADHUNTING" can be executed as follows. When "HEADHUNTING" is selected, a map of Japan divided into a plurality of regions is displayed on the screen. When a game player operates a button for selecting a desired region under the display condition, a predetermined player character can be obtained from the selected region via a lottery draw. When "ORDER" is selected, for instance, in the case of the baseball game, information of the batting order of fielders and the order of pitchers (i.e., starter, set-upper and closer) are displayed together with images, abilities and etc. of player characters. Under the display condition, the batting order and the order of pitchers are configured to be changed by a game player's operation. "ENHANCEMENT" refers to enhancing abilities of a player character selected by a game player by integrating a plurality of player characters in response to a game player's operation. "DRAWING" refers to selecting one from the group of a plurality of player characters via a lottery draw in response to a game player's operation and giving the selected player character to the game player. However, the game balance will be herein lost if the number of times for lottery draws is unlimitedly available. Therefore, the number of times allowed for lottery draws is limited to a predetermined number of times, for instance, once or twice in a day. "MATCH-UP GAME" corresponds to the aforementioned first match-up and refers to a match-up with the other game player (i.e., an individual competition). When "MATCH-UP GAME" is selected, information of the other game players (i.e., game players having other game player IDs) as opponents is displayed, for instance, together with avatar images in a list format. A game player is allowed to select a desired opponent from the list by operating buttons and play a match-up game with the selected opponent. "LEAGUE COMPETITION" corresponds to the aforementioned second match-up and can be executed in parallel with the individual competition.

When a game player selects one of the text character sequences illustrated in FIG. 6 by operating the directional instruction button and the confirmation button of the operation input unit 15, the CPU 21 of the game server 20, as the game progressing unit 51, is configured to recognize a result of a game player's selection through the communication interface unit 25 and transmit new HTML data to the communication terminal 10. As a result, the display unit 16 of the communication terminal 10 displays a new webpage in accordance with the result of the game player's selection.

A storage unit 52 has a function of storing ability values of player characters in association with game player IDs. In the present exemplary embodiment, the storing unit 52 is realized by the player database 31 of the database server 30. It should be noted that, in this specification, the storage unit 52 may refer to an operational function to store data realized by game control device. The storage unit 52 may refer to the player database 31 (storage device).

Figure 7:
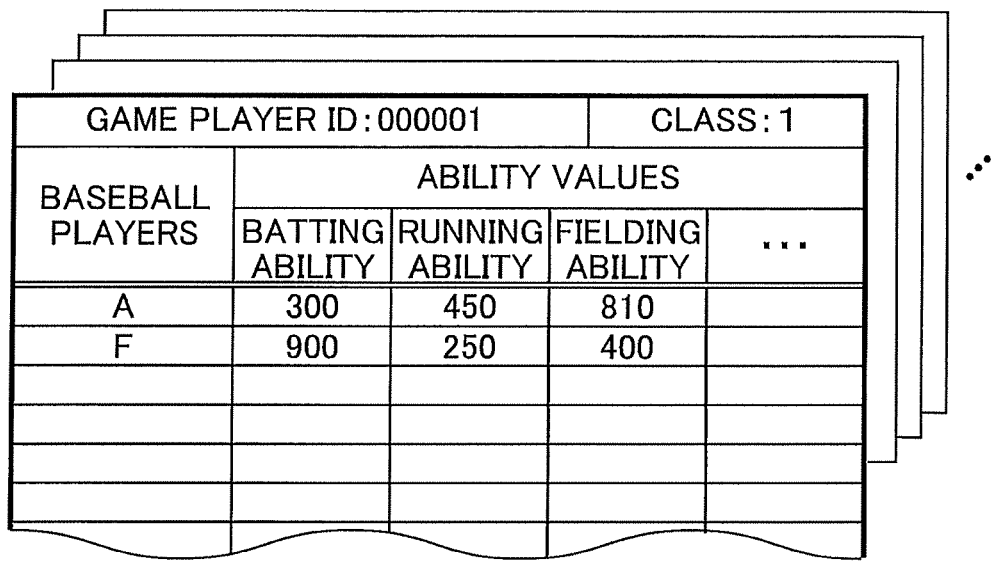
FIG. 7 is an exemplary configuration diagram of a player database included in the database server.

FIG. 7 is an exemplary player database 31 in the baseball game of the present exemplary embodiment. In the example, the player database 31 contains data of values of respective ability items for a plurality of player characters associated with game player IDs on a game player ID basis. In the example of FIG. 7, the ability value is set to be in a range of 0-1000. Each ability item is herein evaluated higher in proportion to magnitude of the value thereof. FIG. 7 exemplifies a player character A having batting ability with a value of 300, running ability with a value of 450 and fielding ability with a value of 810. FIG. 7 exemplifies "batting ability", "running ability" and "fielding ability" as ability items (i.e., indices). When the player character is a pitcher, on the other hand, "ball speed", "ball control", "stamina" and etc. may be used instead of those ability items.

When each game player obtains a game player ID, default setting values are set as ability values of player characters associated with the game player ID. In other words, the CPU 21 of the game server 20 accesses the player database 31 and writes the default data of the ability values of the player characters associated with the game player ID, and in turn, the player database 31 stores the default data of the ability values.

A first match-up executing unit 53 is configured to execute an individual competition (i.e., the first match-up) between player characters associated with different game player IDs in response to an operational input at the communication terminal 10 and determine a result of the individual competition based on the abilities of the player characters stored in the storage unit 52 (i.e., the player database 31 of the database server 30 in the present exemplary embodiment).

As the first match-up executing unit 53, the CPU 21 of the game server 20 is firstly configured to determine an opponent of a game player in the individual competition based on a game player's operational input at the operation input unit 15 of the communication terminal 10. When "MATCH-UP GAME" is selected on the webpage illustrated in FIG. 6, for instance, an exemplary webpage illustrated in FIG. 8 is displayed as a new webpage for selecting an opponent in the individual competition. In the exemplary webpage illustrated in FIG. 8, respective display regions (objects) correspond to game player IDs and display text character sequences associated with the game player IDs (team names "RIC . . . ", "TOM . . . " and etc. in the case of FIG. 8). In addition to a text character sequence associated with a game player ID, each display region may display property data associated with the game player ID such as a skill level (e.g., Lv. XX) of a game player having the game player ID, an image associated with the game player ID and an avatar. When a game player executes an operation of selecting one of the objects associated with the plural game player IDs with respect to the communication terminal 10, information of the selected game player ID is configured to be transmitted to the game server 20. As the first match-up executing unit 53, the CPU 21 of the game server 20 is consequently configured to transmit the HTML data to the communication terminal based on the game player ID selected by the game player for allowing the communication terminal to display a webpage to prompt confirmation of the opponent and start of the match-up game (see FIG. 9 illustrating an exemplary webpage).

In the example illustrated in FIG. 8, it is preferable to display the skill levels associated with game player IDs as prospective opponents in accordance with the ability values of the player character of the game player ID assigned to a game player currently selecting an opponent. It is further preferable to display a skill level corresponding to the ability values of the player character associated with the game player ID assigned to the game player currently selecting an opponent in addition to the skill levels associated with the game player IDs as the prospective opponents. With the display configuration, the game player currently selecting an opponent can select an appropriate opponent by comparing the skill level associated with his/her game player ID and the skill levels associated with the game player IDs of the prospective opponents. For example, it is possible to exclude, from the prospective opponents, such game player IDs associated with player characters with ability values much greater than those of the player character associated with the game player ID of the game player currently selecting an opponent.

In transmitting the HTML data for displaying the webpage exemplified in FIG. 8, the CPU 21 of the game server 20 is configured to access the player database 31 of the database server 30, read out ability values of the player characters associated with each game player ID, and determine the skill levels based on a predetermined criterion using the read-out ability values.

When a game player executes an operation of selecting the object containing the text character sequence "PLAY BALL" on the webpage exemplified in FIG. 9, the selection result is configured to be transmitted to the CPU 21 of the game server 20. Accordingly, an individual competition is configured to be held between player characters associated with different unique game player IDs. In executing the individual competition, the CPU 21 of the game server 20, as the first match-up executing unit 53, is configured to access the player database 31 of the database server 30 through the database access unit 24 and read out information of the ability values of the player characters associated with two game player IDs as opponents. Further, the CPU 21 is configured to execute the individual competition between the player characters associated with the two read-out game player IDs based on the read-out player characters.

Any suitable method can be employed as a method of determining win/loss of the individual competition as long as the ability values of player characters affect win/loss of the individual competition in the method. For example, based on comparison between ability values of player characters associated with two unique game players IDs as opponents, the player character with a greater ability value may be configured to win the individual competition at a higher percentage (e.g., a predetermined percentage range of 60-90%). The winning percentage may be set to be higher in proportion to magnitude of difference between ability values. When there are plural ability-value items as objects for comparison as illustrated in FIG. 7, it is possible to set a comprehensive ability value by weighting each ability-value item with a predetermined coefficient (e.g., weighting "batting ability", "running ability" and "fielding ability" with 0.4, 0.2 and 0.4, respectively, in the example of FIG. 7).

When determining the result of the individual competition between player characters associated with two unique game player IDs as opponents, the CPU 21 of the game server 20 as the first match-up executing unit 53 is configured to transmit the HTML data to the communication terminals 10 of the two game players having the unique game player IDs as opponents for allowing the communication terminals 10 to display a webpage containing the result of the match-up. In turn, each of the communication terminals 10 is configured to interpret the HTML data received from the game server 20 and display the match-up result on the display unit 16 thereof. FIGS. 10 and 11 illustrate exemplary screens to be displayed on the display unit 16. FIG. 10 illustrates an exemplary webpage to be displayed on the communication terminal 10 of one game player having a game player ID associated with a winning player character of the individual competition. On the other hand, FIG. 11 illustrates an exemplary webpage to be displayed on the communication terminal 10 of the other game player having a game player ID associated with a losing player character of the individual competition. In each of FIGS. 10 and 11, an image Sa illustrates a webpage to be displayed first for showing only the result of the match-up. On the other hand, an image Sb illustrates a webpage for showing the result of the match-up in detail. The webpage of the image Sb is newly displayed in response to a predetermined operation (an operation of selecting a predetermined object on the webpage, an operation of pressing the directional instruction button, etc.) on the webpage illustrated in the image Sa. It should be noted that details of the result of the match-up (score, a player character corresponding to a winning/losing pitcher, etc.) may be randomly determined.

The webpage exemplified in the image Sa of FIG. 10 or 11 is configured to be displayed in quite a short period of time (e.g., a few seconds) after a game player selects an object containing the text character sequence "PLAY BALL" on the webpage exemplified in FIG. 9. Therefore, the game player is allowed to know the result of the match-up in quite a short period of time only through a simple operation, i.e., an operation of starting the individual competition (i.e., an operation of selecting the object containing the text character sequence "PLAY BALL").

A character ability updating unit 54 has a function of updating ability values of a player character associated with a game player ID based on the result of the individual competition (i.e., the first match-up) on an automatic basis or in response to a game player's operation of the communication terminal.

As the character ability updating unit 54, the CPU 21 of the game server 20 is configured to access the player database 31 of the database server 30 and update ability values of a player character based on the result of the individual competition between the player character and its opponent (i.e., player characters associated with different game player IDs) on an automatic basis or in response to an operation of the communication terminal by a game player having the player character. In other words, the CPU 21 is configured to write new ability values in the player database 31.

When a player character associated with a game player ID wins the individual competition, the character ability updating unit 54 is preferably configured to update present ability values of the player character to be greater than the present ability values thereof. When a player character associated with a game player ID loses the individual competition, by contrast, the character ability updating unit 54 is preferably configured to update the present ability values of the player character to be less than the present ability values thereof. It should be noted that the amount of change for the ability values may be arbitrarily set. When plural ability value items are set as illustrated in FIG. 7, for instance, all the ability values of a player character may be configured to be increased or reduced by the same amount. Alternatively, the amount of change may be randomly set for the ability values.

A second match-up executing unit 55 is configured to automatically execute a league competition (i.e., the second match-up) at least between two player characters associated with different unique game player IDs without an operational input at the communication terminal and determine a result of a match-up in the league competition based on ability values of the player characters joining in the league competition stored in the storage unit 52 (i.e., the player database 31 of the database server 30 in the present exemplary embodiment).

The league competition to be executed by the second match-up executing unit 55 is configured to be held at a predetermined clock time (e.g., a time set by a timer embedded in the game server 20). All the game player IDs may be configured to participate (or register) in the league competition. Alternatively, only some of the game player IDs desiring to participate in the league competition may be configured to participate in the league competition.

The schedule of the league competition may be arbitrarily set. An exemplary schedule of the league competition may be set as follows. A player character associated with a given game player ID participating in the league competition is configured to play the league competition for five days from Monday to Friday. The second match-up executing unit 55 is configured to automatically execute match-ups between player characters associated with different unique game player IDs participating in the league competition at a predetermined clock time every day for five days without an operational input at the communication terminal 10. A player character associated with a given game player ID participating in the league competition is configured to play match-ups with e.g., 15 player characters associated with the other 15 different unique game player IDs every day. Then, a ranking (i.e., an order in the ranking) in the league competition held in the week including the aforementioned five days is determined based on the results of 75 match-ups held between the player characters associated with the respective game player IDs for five days. It should be noted that a predetermined clock time is set as the scheduled clock time when the above-configured league competition is held. However, an alternative configuration may be assumed that the league competition is automatically held at predetermined intervals such as every six hours. Yet alternatively, the league competition may be configured to be held every other day or once in a week without being held everyday.

The second match-up executing unit 55 may be configured to execute a method of determining win/loss of a match-up, similarly to the first match-up executing unit 53. In other words, any method can be herein employed as long as ability values of player characters affect win/loss of a match-up in the method.

It should be noted that it takes a predetermined period of time for determining the results of all the match-ups in the league competition and ability values of a player character can be updated in accordance with execution of individual competition even in the predetermined period of time. Therefore, copy data of the player database 31 is configured to be created at a clock time when the league competition is started, and ability values of a player character stored in the copy data are configured to be referred to during processing of the second match-up executing unit 55. Accordingly, the ability values of a player character (i.e., the very data of the player database 31) can be continued to be updated by the character ability updating unit 54 even during processing of the second match-up executing unit 55.

The second match-up executing unit 55 is configured to record results of match-ups in the league competition(s) at least for a predetermined term in the past. As the second match-up executing unit 55, the CPU 21 of the game server 20 is specifically configured to access the database server 30 and write the results of the match-ups in the league competition(s) in the league competition database 32 stored in the database server 30.

Now, FIG. 12 illustrates an example of the league competition database 32. In the example illustrated in FIG. 12, the league competition is held everyday and results of match-ups in the league competition are recorded on a day-by-day basis. In the example of FIG. 12, a result of each match-up in each league competition contains a match-up ID for specifying each match-up, a game player ID associated with a winning player character (i.e., a winning game player ID), a game player ID associated with a losing player character (i.e., a losing game player ID), scores and the other data (e.g., data of a player character corresponding to a winning pitcher).

The second match-up executing unit 55 is configured to record and sequentially update the ranking of a game player ID in the league competition. As the second match-up executing unit 55, the CPU 21 of the game server 20 is specifically configured to access the league competition database 32 of the database server 30, read out the results of the past match-ups within a league competition and calculate the ranking for a game player ID based on the read-out results of the match-ups. The CPU 21 is then configured to access the database server 30 and write the calculated ranking in the ranking database 33 stored in the database server 30. When the league competition is consecutively held everyday for five days, for instance, the CPU 21 is configured to calculate the ranking of each game player ID at the timing when all the match-ups are finished on the date and write the ranking in the ranking database 33. Accordingly, the ranking of each game player ID is updated in the ranking database 33 everyday.

Now, FIG. 13 illustrates an example of the ranking database 33. In the example illustrated in FIG. 13, rankings of game player IDs are sequentially recorded therein in a descending order from the first to the last, and further, the numbers of wins, losses and ties in the league competition are recorded therein on a game player ID basis.

A notifying unit 56 is configured to notify each game player's communication terminal 10 of results of match-ups in a single or plurality of the league competitions (i.e., the second match-up) either for a predetermined term in the past or at a predetermined number of times and/or the ranking (order in the ranking) of each game player ID based on the results of the match-ups. The predetermined term in the past may refer to a week before the week of the day when the video game is executed, or alternatively, refer to a term immediately before the day when the video game is executed or the preceding day of the day when the video game is executed.

When recognizing that "LEAGUE COMPETITION" is selected on the webpage illustrated in FIG. 6, for instance, the CPU 21 of the game server 20 as the notifying unit 56 is configured to transmit the HTML data to each game player's communication terminal 10 for allowing it to display a webpage containing the results of match-ups in an immediate league competition, and/or, a game-player-ID based ranking based on the results of match-ups in a single or plurality of league competitions either for a predetermined term in the past or at a predetermined number of times. FIG. 14 illustrates an exemplary webpage to be displayed on the communication terminal 10 as a result of interpretation of the HTML, data. The exemplary webpage illustrated in FIG. 14 displays the result in the league competition on a game player ID basis (e.g., a result of 45 wins and 15 losses and 6573rd ranking). The webpage exemplified in FIG. 14 is configured to be scrolled by means of the directional instruction button of the operation input unit 15 of the communication terminal 10 or the like in order to display information of the league competition regarding the respective seasons (the forth, fifth and sixth seasons). Also, FIG. 14 is an exemplary screen regarding a specific date when the fifth season of the league competition is being held. From bottom to top, the exemplary screen sequentially displays the results of the match-ups in the fourth season of the league competition, the results of the match-ups in the fifth season of the league competition, a schedule for match-ups in the sixth season of the league competition and the comprehensive win/loss results and ranking in the present league competition.

As described above, the notifying unit 56 is herein configured to transmit the HTML data to each game player's communication terminal 10 for allowing it to display the webpage containing the game-player-ID based ranking based on the results of the match-ups in the league competition as illustrated in FIG. 14. Except for information of characters and images, any suitable type of information may be herein notified as long as each game player can recognize the information contents. The suitable type of information may include voice information, vibrations, and the other tactually detectable information.

In the aforementioned exemplary embodiment, each game player's communication terminal 10 is configured to be notified of the results of match-ups in a single or plurality of league competitions (i.e., the second match-up) either for a predetermined term in the past or at a predetermined number of times, and/or, the ranking (order in the ranking) based on the results of the match-ups on a game player ID basis. However, each game player's communication terminal 10 may be notified of an evaluation value on a game player ID basis instead of the ranking (order in the ranking) on a game player ID basis. The evaluation value refers to an index value for evaluating results of match-ups of a game player based on a criterion different from the ranking (order in the ranking). For example, as will be explained in Modification 2 later, the evaluation value may be a point value obtained by converting a winning rate in the league competition. Alternatively, each game player's communication terminal 10 may be notified of the ranking within a class instead of the ranking (order in the ranking) on a game player ID basis. Specifically, all the rankings in a class may be divided into ten sub-classes where the class 1 is set as the highest while the class 10 is set as the lowest. Each game player's communication terminal 10 may be notified of a rank (i.e., class) that the game player ID of each game player is currently classified. Yet alternatively, as will be explained in Modification 6 later, each game player's communication terminal 10 may be configured to be notified of information regarding prediction of a class to which the game player ID of each game player is classified after a promotion/demotion competition (i.e., the third match-up) based on the results of the match-ups in the league competition (i.e., the second match-up) in a display manner with "PROMOTION RANGE", "DEMOTION TRANGE" and etc.

FIG. 14 illustrates remaining time to start match-ups of the next season (i.e., the sixth season) of the league competition. Thus, the notifying unit 56 is preferably configured to preliminarily notify each game player's communication terminal 10 of the clock time in the real world when the league competition (i.e., the second match-up) is started. Accordingly, each game player can get the clock time in the real world when the league competition is started. Each game player is thereby allowed to prepare for enhancement of ability values of a player character by playing the individual competition in a deliberate manner by the next clock time when the league competition is started in order to allow the player character to participate in the league competition as advantageously as possible.

As described above, ability values of a player character is updated based on a result of the individual competition and the updated player character plays the league competition. Therefore, each game player is motivated to win a lot of match-ups in the individual competition by the preliminarily notified clock time in the real world when a league competition is started in order to enhance ability values of a player character associated with his/her game player ID by the preliminarily notified clock-time in the real world. In other words, according to the game control device, each game player comes to deliberately play the individual competition in consideration of the aforementioned clock time when the league competition is started (i.e., each game player comes to perform an operation of the communication terminal for the individual competition). In short, the game control device can highly motivate each game player to play the individual competition and can attract each game player further to the video game.

(1-6) Main Processing Flow of Baseball Game

Figure 15:
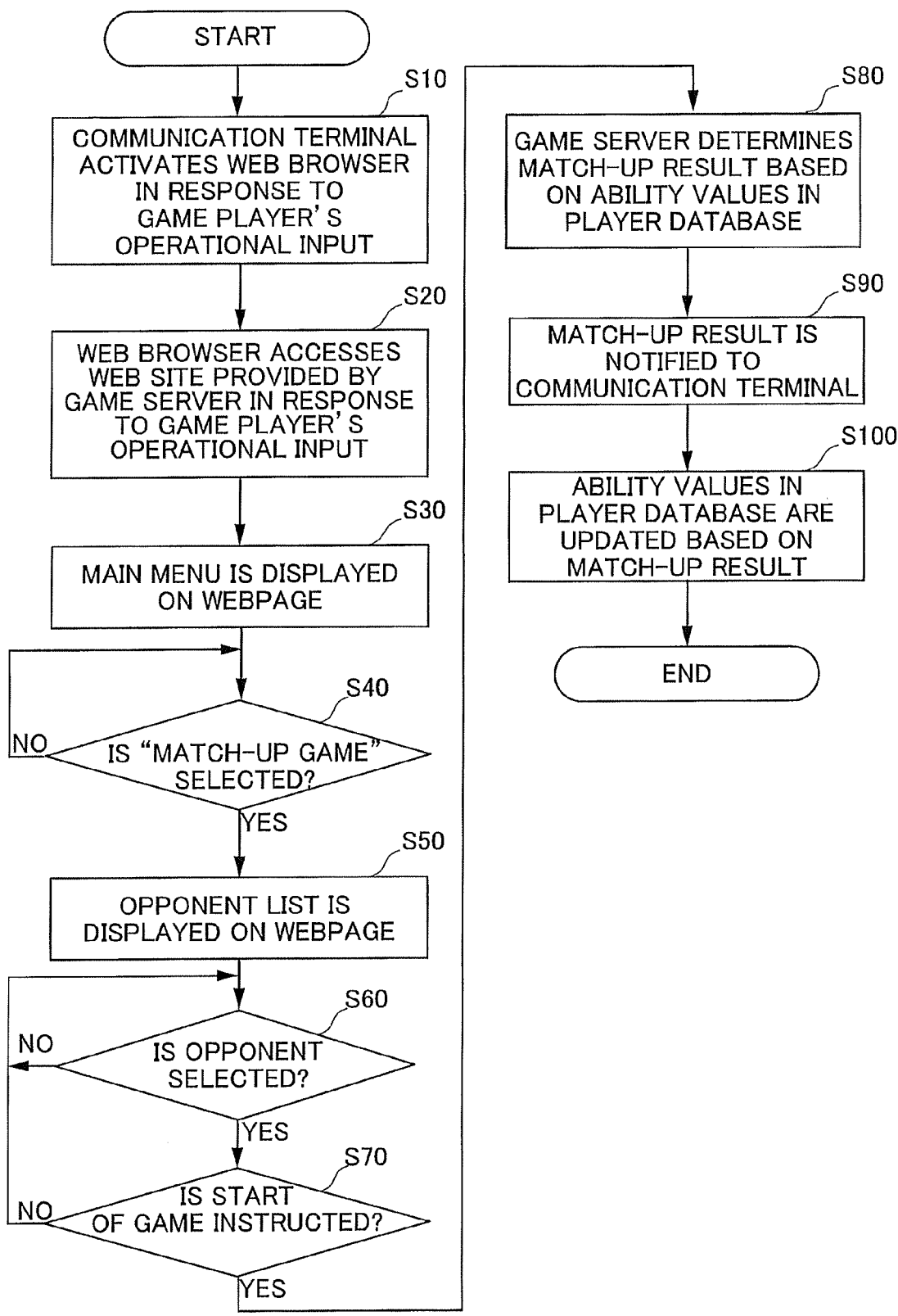
FIG. 15 is a flowchart representing a part of the main processing of a baseball game according to the first exemplary embodiment.
Figure 16:
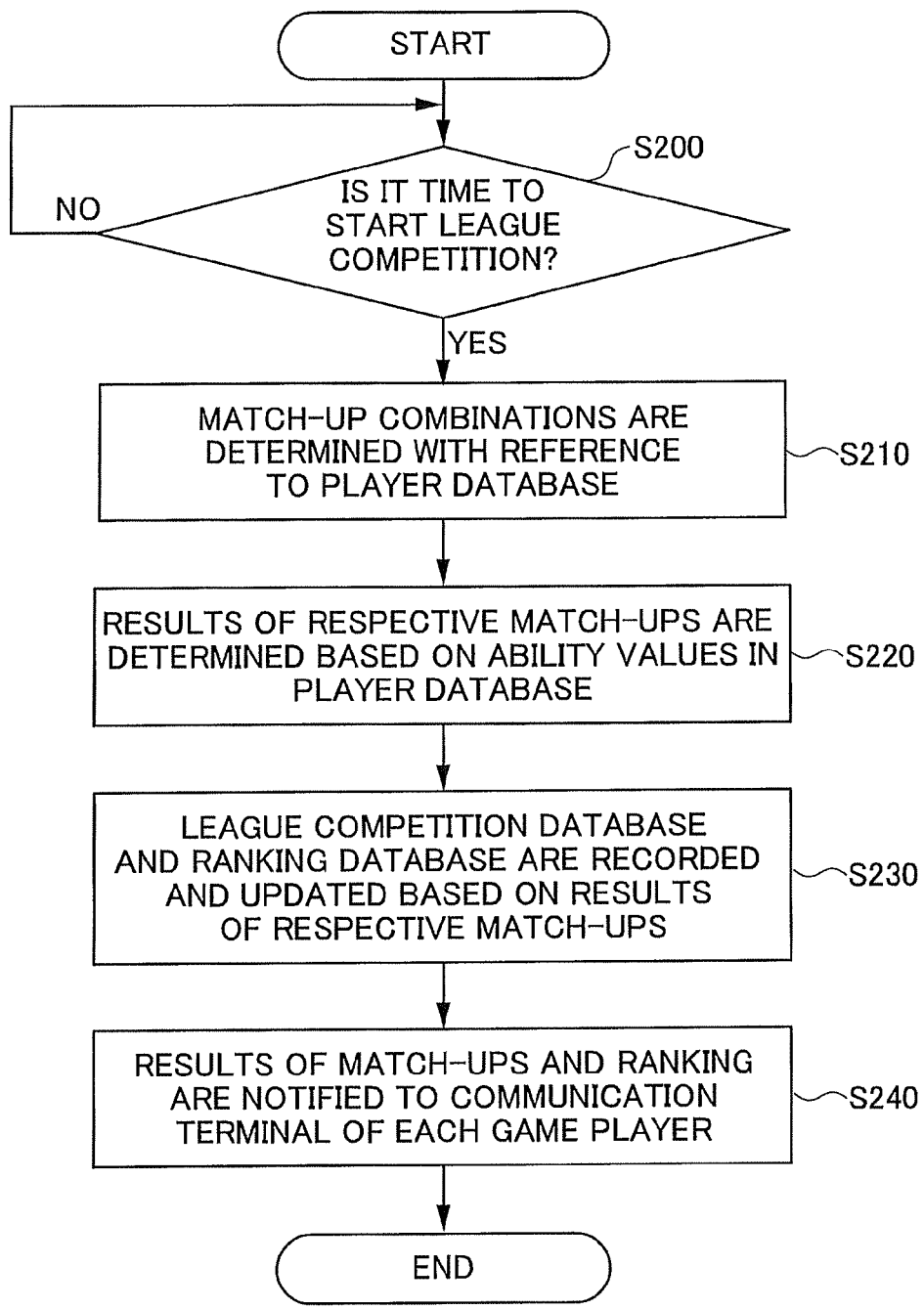
FIG. 16 is a flowchart representing a part of the main processing of the baseball game according to the first exemplary embodiment.

Next, an exemplary processing flow of the baseball game according to the present exemplary embodiment will be explained with reference to the flowcharts represented in FIGS. 15 and 16. FIG. 15 is a flowchart from the activation of the web browser of a communication terminal 10 to the execution of a processing of updating ability values of a player character. FIG. 16 is a flowchart for representing a processing of executing the league competition (i.e., the second match-up).

Firstly with reference to FIG. 15, a communication terminal 10 receives a predetermined game player's operational input at the operation input unit 15 and activates the web browser (Step S10). After the activation of the web browser, the communication terminal 10 receives a predetermined game player's operational input at the operation input unit 15 and accesses the website of the baseball game provided by the game server 20 (Step S20). It is herein assumed that the game player operating the communication terminal 10 has already obtained a unique game player ID. After this point of time, the game server 20 manages a game player's access through the communication terminal 10 on a game player ID basis.

When the communication terminal 10 accesses the website of the baseball game, the game progressing unit 51 is activated. The game progressing unit 51 causes the communication terminal 10 to display the webpage of the main menu as illustrated in FIG. 6 (Step S30). When "MATCH-UP GAME" is selected on the main menu (YES: Step S40), the game progressing unit 51 causes the communication terminal 10 to display a list of opponents (List of game player IDs, see FIG. 8) as a new webpage (see the example in FIG. 8) for selecting an opponent in the individual competition (Step S50).

Next, when any one of the opponents (i.e., the game player IDs) is selected through an appropriate game player's operation with respect to the operation input unit 15 of the communication terminal 10 (YES: Step S60), the first match-up executing unit 53 transmits the HMTL data to the communication terminal 10 for allowing it to display the webpage (exemplified in FIG. 9) for prompting confirmation of the opponent and starting of the match-up based on the game player ID as the opponent selected by the game player. Subsequently, when starting of the match-up is instructed through a selection operation on the webpage displayed on the communication terminal 10, the first match-up executing unit 53 executes the individual competition between a player character associated with the game player ID of the game player herein operating the communication terminal 10 and a player character associated with the game player ID selected as the opponent of this game player. The first match-up executing unit 53 determines a result of the individual competition based on the ability values of the player characters stored in the storage unit 52 (i.e., the player database 31 of the database server 30 in the present exemplary embodiment) (Step S80). The result of the individual competition is determined based on the ability values of the player characters associated with the game player IDs as opponents. For example, the first match-up executing unit 53 compares the ability values of the player characters associated with two game player IDs as opponents, and determines the match-up result for allowing the player character with a greater ability value to win the match-up at a higher probability. It should be noted that the match-up result is determined in a quite short period of time.

Once determining the result of the individual competition, the first match-up executing unit 53 transmits the HTML data to the communication terminals 10 of two game players having the game player IDs as opponents for allowing them to display the webpage containing the match-up result. Accordingly, the match-up result is displayed on (i.e., notified to) the communication terminals 10 through display of the webpage (Step S90).

Next, the character ability updating unit 54 is activated. Specifically, the character ability updating unit 54 updates the ability values of the player characters associated with the game player IDs stored in the storage unit 52 (i.e., the player database 31) based on the result of the individual competition (Step S100). When a player character associated with a given game player ID wins the individual competition, for instance, the character ability updating unit 54 updates the ability values of the player character to be increased from the present values thereof. When the player character associated the given game player ID loses the individual competition, by contrast, the character ability updating unit 54 updates the ability value of the player character to be reduced from the present values thereof. Therefore, each game player comes to actively play the individual competition for enhancing the ability values of the player character associated with his/her game player ID. From the standpoint of each game player, the individual competition can be executed by a quite simple operation. Further, the game server 20 is not required to execute a complex computation processing for the match-up. Therefore, a game player can get the match-up result quite easily in a short time.

Figure 17:
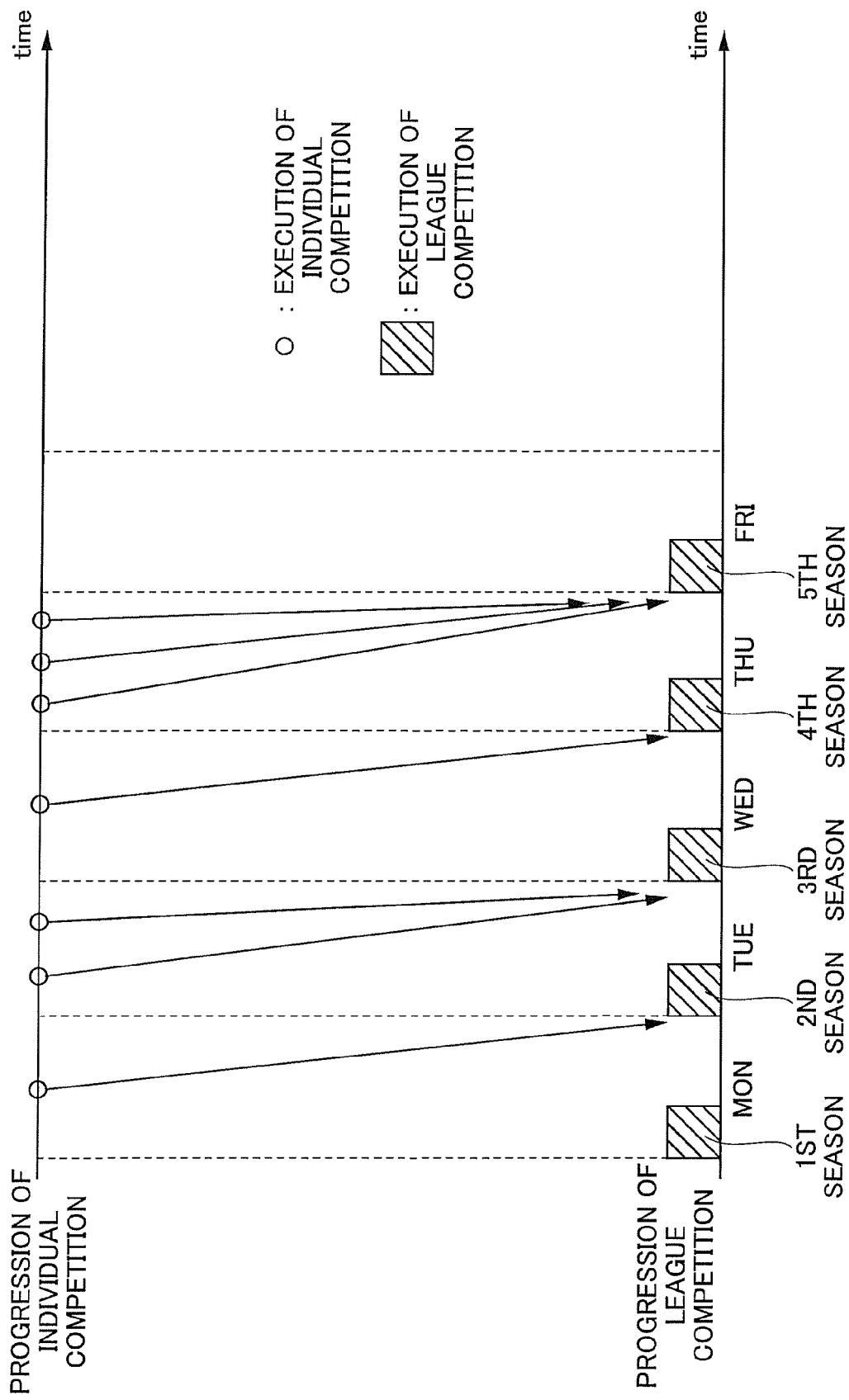
FIG. 17 is a chart for explaining an exemplary progression of the baseball game according to the first exemplary embodiment.

Next, an execution processing of a league competition will be hereinafter explained with reference to FIG. 16. It should be noted the execution processing will be explained using an exemplary case in which the league competition is held for five days from Monday to Friday as illustrated in FIG. 17. In this case, the rankings of the game player IDs are determined based on the results of the first to fifth seasons for five days in the league competition. As described above, it is preferable to start the respective seasons of the league competition at a fixed clock time preliminarily notified to game players, such as at three o'clock in the afternoon in the real world.

At a clock time when the league competition is started everyday from Monday to Friday in FIG. 16 (YES: Step S200), the second match-up executing unit 55 is activated. The second match-up executing unit 55 is automatically activated without an operational input at the communication terminal 10 by a game player having a game player ID participating in the league competition. When the first season of the league competition is held, for instance, the second match-up executing unit 55 determines match-up combinations in the first season of the league competition, i.e., match-up combinations of a player character associated with a given game player ID and player characters associated with a predetermined number of the other game player IDs (Step S210). When determining the match-up combinations, the second match-up executing unit 55 then refers to the player database 31 and determines results of the match-ups based on the ability values of the player characters, i.e., so that differences between the ability values of the player characters can affect wins/losses of the match-ups (Step S220). In the first season of the league competition, match-up results are determined for totally M×N match-ups where "M" is set as the number of match-ups held for a player character of each game player ID and "N" is set as the number of game player IDs participating in the league competition. After determining the match-up results, the second match-up executing unit 55 records the match-up results in the first season of the league competition into the league competition database 32, and simultaneously, records rankings of the game player IDs based on the match-up results in the first season of the league competition into the ranking database 33 (Step S230). Subsequently, the notifying unit 56 notifies, to the communication terminals 10 of the game players associated with the respective game player IDs participating in the league competition, the match-up results in the first season of the league competition and the rankings of the game player IDs at the point of time when the first season of the league competition is finished (Step S240). When a game player selects "LEAGUE COMPETITION" on the webpage as exemplified in FIG. 6, the notification may be executed by displaying, on the game player's communication terminal 10, the website containing the match-up results in the first season of the league competition and the ranking of the game player ID of the game player at the point of time when the first season of the league competition is finished.

On the next day at a clock time when the second season of the league competition is started, the aforementioned processing in Steps S200 to S240 is similarly executed. In this case, opponents of a player character of a given game player ID are preferably all different from the opponents of the player character in the first season of the league competition. Next in Step S230, the second match-up executing unit 55 records the results of the match-ups in the second season of the league competition in the league competition database 32 and further records rankings of the game player IDs in the ranking database 33 based on the results of all the match-ups in the league competition so far (i.e., the first and second seasons of the league competition in this case). The processing will be similarly executed for the third and subsequent seasons of the league competition.

When the fifth season of the league competition is finished, data of all the results of the match-ups in the respective first to fifth seasons of the league competition are reliably recorded in the league competition database 32, whereas the rankings of game player IDs, at the point of time when the fifth season of the league competition is finished (i.e., in consideration of the results of the match-ups in the first to fifth seasons of the league competition), are reliably recorded in the ranking database 33.

When the first to fifth seasons of the league competition are held for five days from Monday to Friday as illustrated in FIG. 17, a game player is allowed to access, through the web service to be provided from the game server 20 everyday, the results of match-ups of a player character associated with his/her game player ID in each season of the league competition and the ranking of his/her game player ID at the point of time of access by performing an appropriate operation of the communication terminal 10.

Now, the relation between the individual competition (i.e., the first match-up) and the league competition (i.e., the second match-up) will be explained with reference to FIG. 17. As described above, the league competition is started and executed at a fixed clock time everyday for five days from Monday to Friday. By contrast, the individual competition is configured to be held in response to a game player's operational input at the communication terminal 10. Therefore, the individual competition and the league competition are progressed independently from each other. When ability values of a player character associated with a given game player ID is herein updated in accordance with a result of the individual competition, a match-up is executed based on the updated ability values in the next league competition to be held after the updating. A case is herein assumed in which a player character associated with a given game player ID wins the individual competition on Monday (i.e., a day when the first season of the league competition is held) as illustrated in FIG. 17 and the ability values of the player character are accordingly increased. In this case, the player character associated with the given game player ID plays the match-up using the enhanced ability values in the second season of the league competition on the next day (i.e., Tuesday). In FIG. 17, each of the arrowed lines indicates relation between the individual competition and the league competition of one of the seasons in which ability values of a player character, updated as a result of the individual competition, are reflected.

Therefore, the baseball game will motivate each game player to enhance ability values of a player character by making the player character win the match-ups of the individual competitions as many as possible in order to obtain a better result in the league competition in which many game players participate. Each game player is herein required to operate the communication terminal 10 only in the individual competition. With a simple operation, each game player can feel a sense of playing not only the match-up of the individual competition but also the match-up in the next league competition in which updated ability values of the player character are reflected. The result of the league competition is herein notified to each game player's communication terminal 10. Therefore, each game player can get the result of the league competition after the individual competition. In other words, each game player can recognize, as the result of the league competition, the effect of the enhanced ability values of a player character in the individual competition. Thus, each game player naturally expects notification of the result of the league competition. Therefore, the video game can realize a highly amusing match-up game for allowing a game player to play the game with a simple operation of the communication terminal 10 without getting the game player bored. Further, a player character, having abilities enhanced as a result of the individual competition, is configured to play the league competition that is different from the individual competition. Therefore, each game player can feel a game element as if a player character were nurtured in the individual competition and the nurtured player character were sent to the league competition. Additionally, in the present configuration, each game player is required to perform an operation only in the individual competition and the league competition is automatically progressed in parallel to the individual competition. Thus, the video game is speedily progressed and is thereby suitable as social games or the like requiring a simple operation and a quick play result.

(2) Second Exemplary Embodiment

A second exemplary embodiment of the present invention will be hereinafter explained. Unless particularly mentioned, the following exemplary embodiment and its modifications are basically similar to the first exemplary embodiment regarding the structures and actions of the communication terminal 10 and the game server 20, the respective units (i.e., functions) to be executed by the game control device and the main processing flow in the baseball game.

Figure 18:
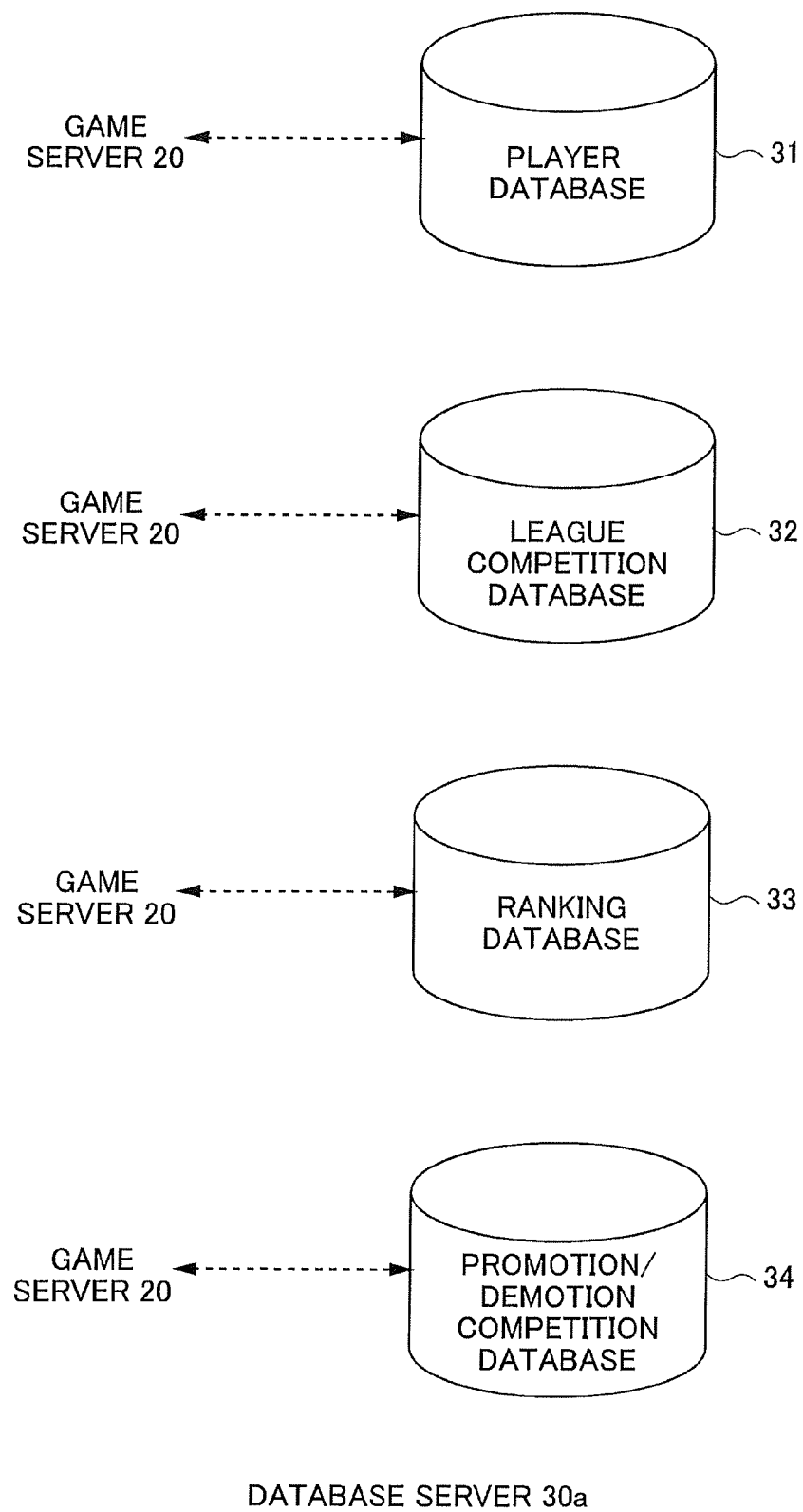
FIG. 18 is a configuration block diagram of a database server according to a second exemplary embodiment.

As illustrated in FIG. 18, a database server 30a of the present exemplary embodiment is different from the database server 30 (see FIG. 4) in that a promotion/demotion competition database 34 is herein additionally provided. As illustrated in FIG. 7, each game player ID is associated with a class in the player database 31. In the example of FIG. 7, a game player ID of "000001" is associated with the class 1.

In the present exemplary embodiment, each game player ID is associated with any one of a plurality of classes. It is herein possible to arbitrarily set class categories. For example, it is possible to set hierarchical class categories from a beginner class (or a novice class, e.g., class 1) to a master class (or a senior class, e.g., class 5). Further, each game player plays the baseball game of the present exemplary embodiment for promoting his/her game player ID to a higher ranked class in addition to the game element explained in the first exemplary embodiment. It should be noted that class updating (changing of a class) to be executed in a promotion/demotion competition can include promotion to a higher ranked class, demotion to a lower ranked class and maintenance of the status quo (i.e., remaining in the same class).

(2-1) Overview of Various Functions in Game Control Device

Figure 19:
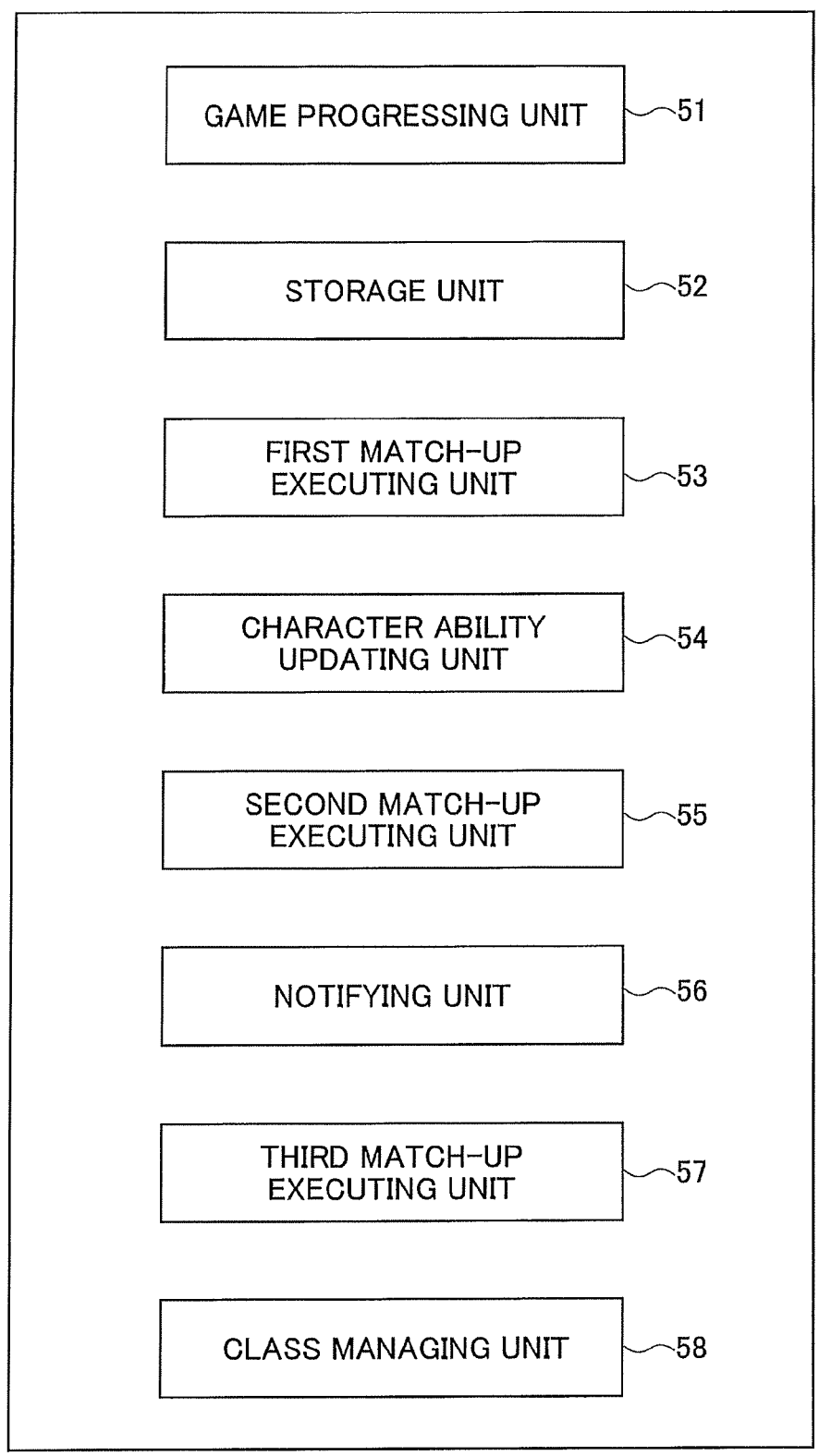
FIG. 19 is a functional block diagram for explaining functions playing main roles in a game control device according to the second exemplary embodiment.

FIG. 19 is a functional block diagram for explaining functions playing main roles in the game control device of the present exemplary embodiment. The functional block diagram of FIG. 19 is different from that of FIG. 5 in that a third match-up executing unit 57 and a class managing unit 58 are herein additionally provided.

The third match-up executing unit 57 is configured to automatically execute a promotion/demotion competition (i.e., a third match-up) between player characters associated with different unique game player IDs without an operational input at the communication terminal 10 and determine a result of the promotion/demotion competition based on the ability values of the player characters stored in the storage unit 52 (i.e., the player database 31 of the database server 30 in the present exemplary embodiment). In short, the promotion/demotion competition (i.e., the third match-up) is a type of match-up held between a given game player having a game player ID and an opponent having another game player ID on the background (i.e., in parallel to the other type of match-up), similarly to the league competition (i.e., the second match-up).

The promotion/demotion competition to be executed by the third match-up executing unit 57 is configured to be held at a predetermined clock time (e.g., clock time set by the timer embedded in the game server 20). All the game player IDs may be configured to participate in the promotion/demotion competition. Alternatively, only some of the game player IDs desiring to participate in the promotion/demotion competition may be configured to participate in the promotion/demotion competition. Further, the schedule of the promotion/demotion competition may be arbitrarily set. For example, the promotion/demotion competition may be held between two consecutive league competitions.

Similarly to the first match-up executing unit 53, the third match-up executing unit 57 may be configured to execute a method of determining win/loss of a match-up. In other words, any method can be herein employed as long as ability values of player characters affect win/loss of a match-up in the method.

The third match-up executing unit 57 is configured to record a result of the promotion/demotion competition. As the third match-up executing unit 57, the CPU 21 of the game server 20 is specifically configured to access the database server 30a and write the result of the promotion/demotion competition in the promotion/demotion competition database 34 stored in the database server 30a.

The class managing unit 58 is configured to manage each game player ID associated with any one of a plurality of classes. Further, the class managing unit 58 is configured to determine which of the following options should be executed based on the result of the promotion/demotion competition: promotion of the present class of each game player ID to a higher ranked class; demotion of the present class of each game player ID to a lower ranked class; and maintaining (unchanging) the present class of each game player ID.

As the class managing unit 58, the CPU 21 of the game server 20 is specifically configured to access the database server 30a, read out the result of the promotion/demotion competition stored in the promotion/demotion competition database 34, and determine which of the following options should be executed based on the read-out result of the promotion/demotion competition: promotion of the present class of each game player ID to a higher ranked class; demotion of the present class of each game player ID to a lower ranked class; and unchanging (maintaining) the present class of each game player ID. Any suitable method can be employed as a method of updating a class based on a result of the promotion/demotion competition. For example, it is herein possible to apply a predetermined promotion/demotion criterion preliminarily set for a result of the promotion/demotion competition. For example, the criterion may be set as follows. The present class is promoted to an immediately higher class when the winning rate is greater than or equal to 0.700 in match-ups in the promotion/demotion competition. Further, the present class is demoted to an immediately lower class when the winning rate is less than or equal to 0.300 in match-ups in the promotion/demotion competition. Yet further, the present class may be maintained when the winning rate is greater than 0.300 and less than 0.700 in match-ups in the promotion/demotion competition.

When determining a new (updated) class for each game player ID, the class managing unit 58 is configured to assign a new class to each game player ID. As the class managing unit 58, the CPU 21 of the game server 20 is specifically configured to access the database server 30a and write the new class for each game player ID in the player database 31.

In the present exemplary embodiment, when recognizing that "LEAGUE COMPETITION" is selected on the webpage illustrated in FIG. 6, for instance, the CPU 21 of the game server 20 as the notifying unit 56 is configured to transmit the HTML data to each game player's communication terminal 10 for allowing it to display the webpage containing the results of match-ups in the promotion/demotion competition as well as the results of match-ups in the immediate league competition, and/or, a game-player-ID based ranking based on the results of match-ups in a single or plurality of league competitions either for a predetermined term in the past or at a predetermined number of times. FIG. 20 illustrates an exemplary webpage to be disposed on the communication terminal 10 as a result of interpretation of the HTML data. Compared to the webpage illustrated in FIG. 14, the exemplary webpage of FIG. 20 additionally displays results of match-ups in the promotion/demotion competition and result of the class updating in the display field of the league competition result. FIG. 20 illustrates an exemplary case in which a given game player ID is promoted to an immediately higher class as a result of the promotion/demotion competition held last week (18 wins and 6 losses) but is demoted to an immediately lower class as a result of the promotion/demotion competition held this week (3 wins and 7 losses).

Similarly to the league competition (i.e., the second match-up), the notifying unit 56 is herein preferably configured to preliminarily notify each game player's communication terminal 10 of the clock time in the real world when the promotion/demotion competition (i.e., the third match-up) is started.

(2-2) Processing Flow of Promotion/Demotion Competition of Baseball Game

Figure 21:
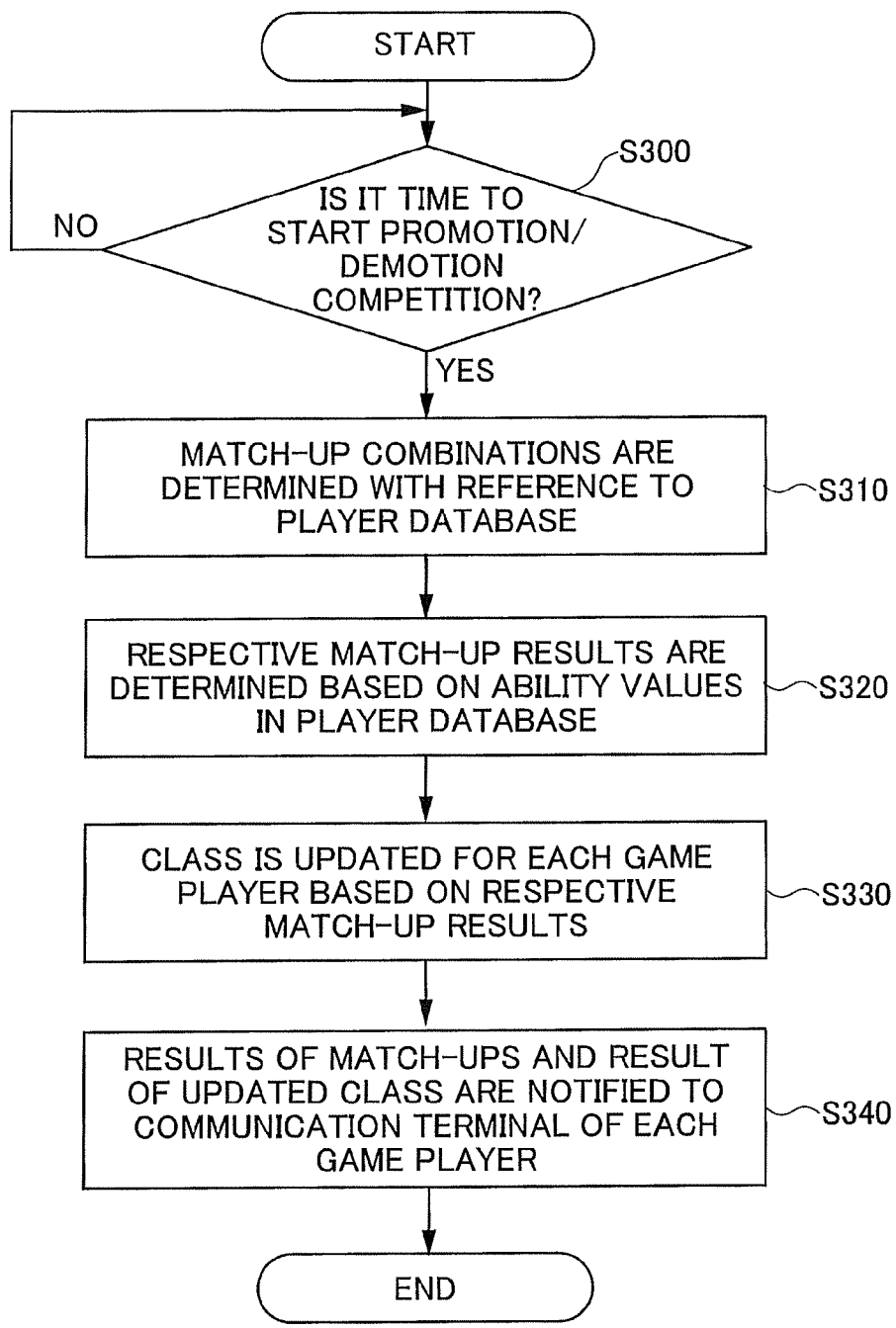
FIG. 21 is a flowchart representing a part of the main processing of a baseball game according to the second exemplary embodiment.

Next, an exemplary processing flow of the promotion/demotion competition of the baseball game of the present exemplary embodiment will be hereinafter explained with reference to a flowchart of FIG. 21. FIG. 21 is a flowchart for representing the processing of executing the promotion/demotion competition (i.e., the third match-up).

Figure 22:
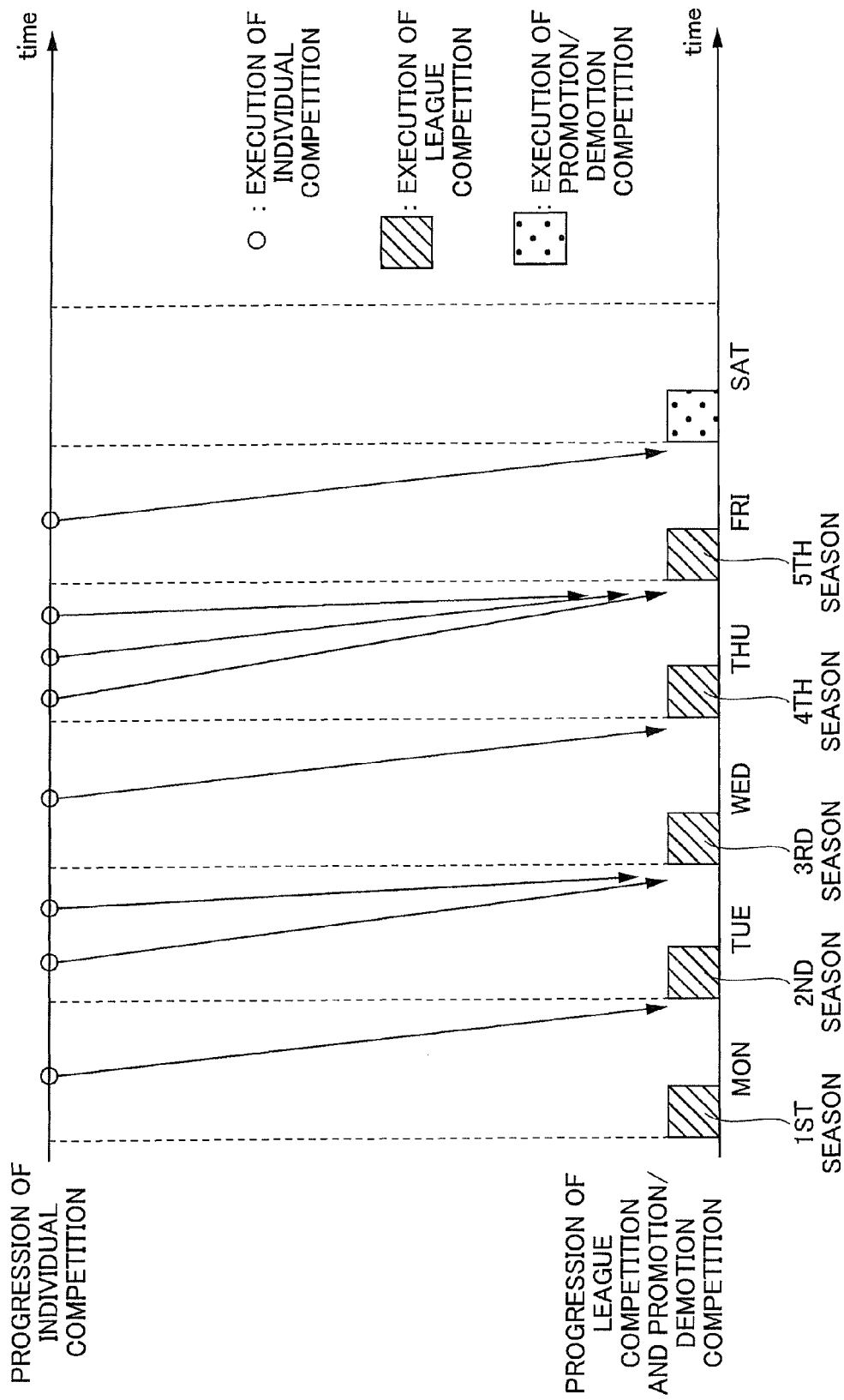
FIG. 22 is a chart for explaining an exemplary progression of the baseball game according to the second exemplary embodiment.

The processing of executing the promotion/demotion competition will be hereinafter explained with reference to FIG. 21. The processing will be herein explained based on an exemplary case as illustrated in FIG. 22 in which the league competition is held for five days from Monday to Friday and the promotion/demotion competition is then held on Saturday in the same week. It is herein preferable to start the promotion/demotion competition at a fixed clock time preliminarily notified to each game player, for instance, at three o'clock in the afternoon on Saturday in the real world.

As represented in FIG. 21, the third match-up executing unit 57 is activated at the clock time on Saturday when the promotion/demotion competition is held (YES: Step S300). The third match-up executing unit 57 is automatically executed without a game player's operational input at the communication terminal 10. In executing the promotion/demotion competition, the third match-up executing unit 57 determines the match-up combinations in the promotion/demotion competition, i.e., combinations of match-ups between a player character associated with a given game player ID and player characters of a predetermined number of the other game player IDs (Step S310). When determining the match-up combinations, the third match-up executing unit 57 then refers to the player database 31 and determines results of the match-ups based on the ability values of the game players, i.e., so that difference of the ability values of the player characters can affect win/loss in the match-ups (Step S320). When determining the results of the match-ups in the promotion/demotion competition, the third match-up executing unit 57 records the results in the promotion/demotion competition database 34.

Next, the class managing unit 58 updates a class of each game player ID based on the preliminarily set criterion (Step S330). The class managing unit 58 herein refers to the results of the match-ups in the promotion/demotion competition recorded in the promotion/demotion competition database 34 and determines a new class of each game player ID using the aforementioned criterion. The class managing unit 58 then records the new class of each game player ID in the player database 31. Next, the notifying unit 56 notifies the results of the match-ups in the promotion/demotion competition and the result of the class updating to the communication terminal 10 of each game player having a unique game player ID (Step S340). It should be noted that the notification can be executed by causing the communication terminal 10 to display a webpage containing the result of the promotion/demotion competition as well as the result of the league competition, for instance, when each game player selects "LEAGUE COMPETITION" on the webpage exemplified in FIG. 6.

With reference to FIG. 22, the relation between the individual competition (i.e., the first match-up) and the promotion/demotion competition (i.e., the third match-up) will be hereinafter explained. FIG. 22 is a diagram obtained by further adding a progression aspect of the promotion/demotion competition to FIG. 17. FIG. 22 represents a case in which the league competition is held for five days from Monday to Friday and the promotion/demotion competition is held on Saturday in the same week.

In this case, the promotion/demotion competition is started and executed at a fixed clock time on Saturday. By contrast, the individual competition is executed in response to a game player's operational input at the communication terminal 10. Therefore, the individual competition and the promotion/demotion competition are progressed independently from each other. When ability values of a player character associated with a given game player ID is herein updated in accordance with a result of a match-up of the individual competition, a match-up is held based on the updated ability values in the promotion/demotion competition to be held after the ability updating. For example, a case is herein assumed in which a player character associated with a given game player ID plays and wins the individual competition and the ability values of the player character are accordingly increased on Friday (i.e., the day when the fifth season of the league competition is held) as illustrated in FIG. 22. In this case, the player character associated with the given game player ID plays match-ups using the enhanced ability values in the promotion/demotion competition on the next day (i.e., Saturday). In FIG. 22, each of the arrowed lines indicates relation between the individual competition and either one of the seasons of the league competition or the promotion/demotion competition in which ability values of a player character, updated as a result of the individual competition, are reflected.

In the game control device of the present exemplary embodiment, a game player ID of each game player is associated with any one of a plurality of classes. Each game player having a unique game player ID experiences change of his/her ranked class depending on a result of the promotion/demotion competition. Therefore, the game control device of the present exemplary embodiment motivates each game player to make his/her player character win the promotion/demotion competition for upgrading the class of his/her game player ID to a higher class. On the other hand, the promotion/demotion competition is configured to be automatically held without an operational input at the communication terminal 10. Therefore, each game player is not required to perform any operation with respect to the communication terminal 10 in executing the promotion/demotion competition. As described above, however, the ability values of a player character are updated based on the result of a match-up of the individual competition and the promotion/demotion competition is held by the player character with the updated ability values. From the standpoint of each game player, the result of a match-up of the individual competition indirectly affects the result of the match-up in the promotion/demotion competition. Thus, each game player can feel a sense of executing not only the individual competition but also the league competition and further the promotion/demotion competition only by executing an operational input regarding the individual competition into the communication terminal 10.

In the present exemplary embodiment, each game player is motivated to achieve a better result not only in the league competition but also in the promotion/demotion competition to be held after the league competition. In other words, the game control device reliably motivates each game player to make his/her player character win match-ups of the individual competition as much as possible and thereby increase the ability values of his/her player character in order to achieve a better result in the promotion/demotion competition and upgrade the present class to a higher class. Each game player is herein only required to perform an operation regarding the individual competition with respect to the communication terminal 10. With such a simple operation, each game player can feel a sense of executing not only the individual competition but also the league competition and further the promotion/demotion competition. As exemplified in FIG. 20, the result of the promotion/demotion competition is herein preferably configured to be notified to each game player's communication terminal 10. In this case, each game player is allowed to know the result of the promotion/demotion competition after the individual competition and the league competition. In other words, each game player is also allowed to know, as the result of the promotion/demotion competition, an effect of enhancement of the ability values of his/her player character in the individual competition. Therefore, each game player naturally expects notification of the result of the promotion/demotion competition. Consequently, the game control device can realize a highly amusing match-up game for allowing a game player to play the video game with a simple operation without getting the game player bored.

(3) Preferred Modifications for First and/or Second Exemplary Embodiment(s)

Some preferable modifications for the first and/or second exemplary embodiment(s) will be hereinafter explained. It should be noted that a given modification for one of the first and second exemplary embodiments can be obviously applied as a modification of the other of the first and second exemplary embodiments. Without particularly mentioned, each modification is basically the same as the aforementioned respective exemplary embodiments regarding the configuration and actions of the communication terminal and the game server, respective units to be executed by the game control device and the main processing flow of the baseball game.

(3-1) Modification 1

In the first exemplary embodiment and/or the second exemplary embodiment, the character ability updating unit 54 may employ the aforementioned "ENHANCEMENT" of a player character, i.e., a method of enhancing a player character by integrating a plurality of player characters, as a method of updating the ability of a player character. Enhancement of a player character (i.e., the integration processing for player characters) may be executed as follows.

In a modification 1, the first match-up executing unit 53 is herein configured to give enhanced points (i.e., points for ability updating) to a game player ID associated with a winning player character in the individual competition (i.e., the first match-up). The character ability updating unit 54 is then configured to consume the predetermined amount of enhanced points in accordance with a predetermined game player's operation (e.g., the operation of selecting "ENHANCEMENT" in FIG. 6) for integrating a plurality of player characters already possessed by the game player (i.e., player characters associated with the game player ID corresponding to the game player). For example, the integration processing may be executed as follows. A player character A (hereinafter simply referred to as a player A) is herein set as a player character as an enhancement target (i.e., a player character specified by a game player as a player character to be left after the integration processing), while a player character B (hereinafter simply referred to as a player B) is herein set as a player character to be integrated with the player A and disappear after the integration. In the integration processing, the CPU 21 may be herein configured to calculate ability values of a new player A by adding a predetermined ratio of the value of each ability item (i.e., batting ability, running ability, fielding ability) of the player B to the value of the corresponding ability item (i.e., batting ability, running ability, fielding ability) of the player A. Through the integration processing, ability features of the player B are reflected in the player A. After the integration processing, the CPU 21 is configured to delete the data of the player B from the data of the target game player ID. It should be noted that the enhancement points, associated with each game player ID, is stored in the player database 31 as the data to be cumulatively increased every time a corresponding player character wins the individual competition (i.e., the first match-up). After the integration processing, the CPU 21 is configured to access the player database 31 and reduce the enhancement points of each game player ID by a predetermined amount.

In the aforementioned exemplary case, a predetermined ratio of each ability value (i.e., the value of each ability item) of the player B is added to the corresponding ability value (i.e., the value of the corresponding ability item) of the player A as a method of calculating new ability values of the player A. However, the method of calculating new ability values of the player A is not limited to the above. For example, comprehensive ability level data may be prepared for each player character and ability updating may be executed based on the comprehensive ability level data.

An exemplary screen to be displayed on the communication terminal 10 regarding the aforementioned integration processing of player characters will be hereinafter explained with reference to FIGS. 23A to 23E. FIGS. 23A to 23E are exemplary screens to be sequentially displayed in response to an operation of the communication terminal 10.

Figure 23A:
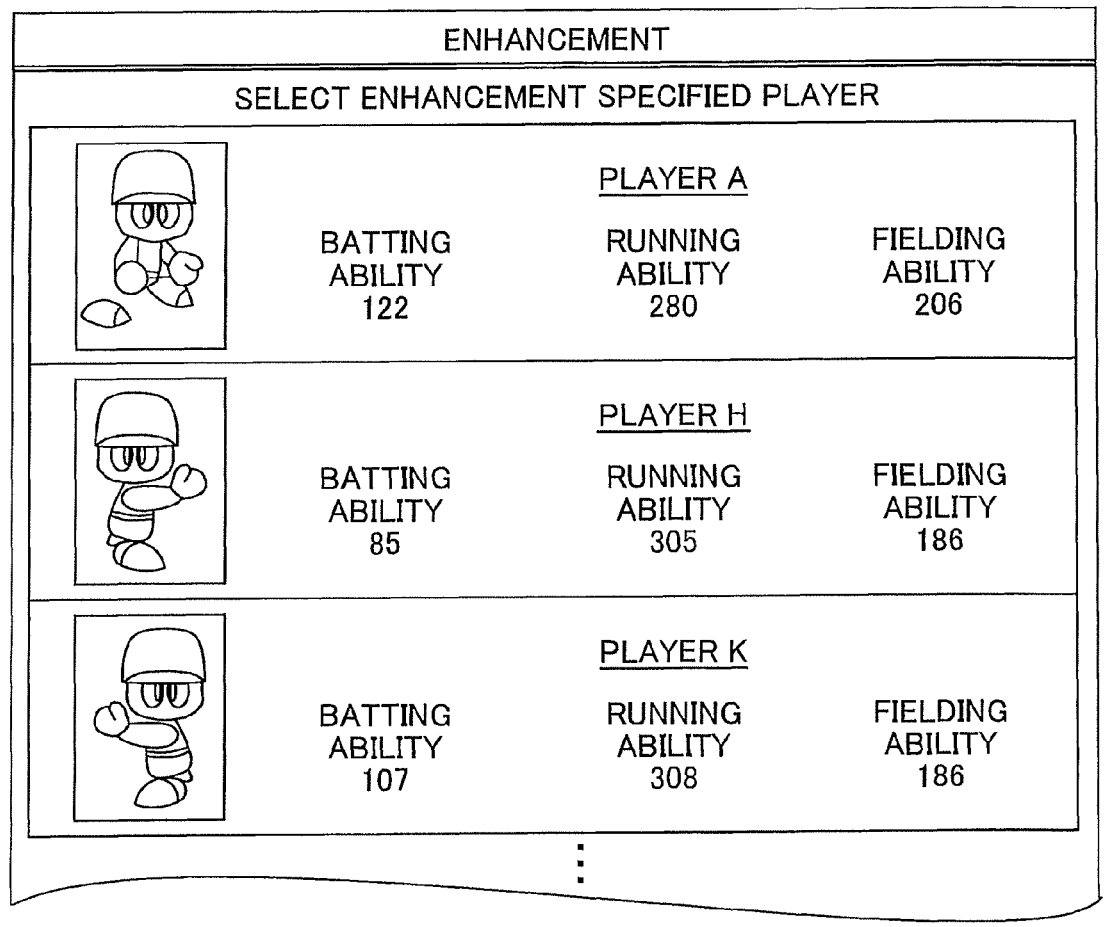
FIG. 23A is an exemplary screen to be displayed on the communication terminal in executing a processing of integrating player characters.
Figure 23B:
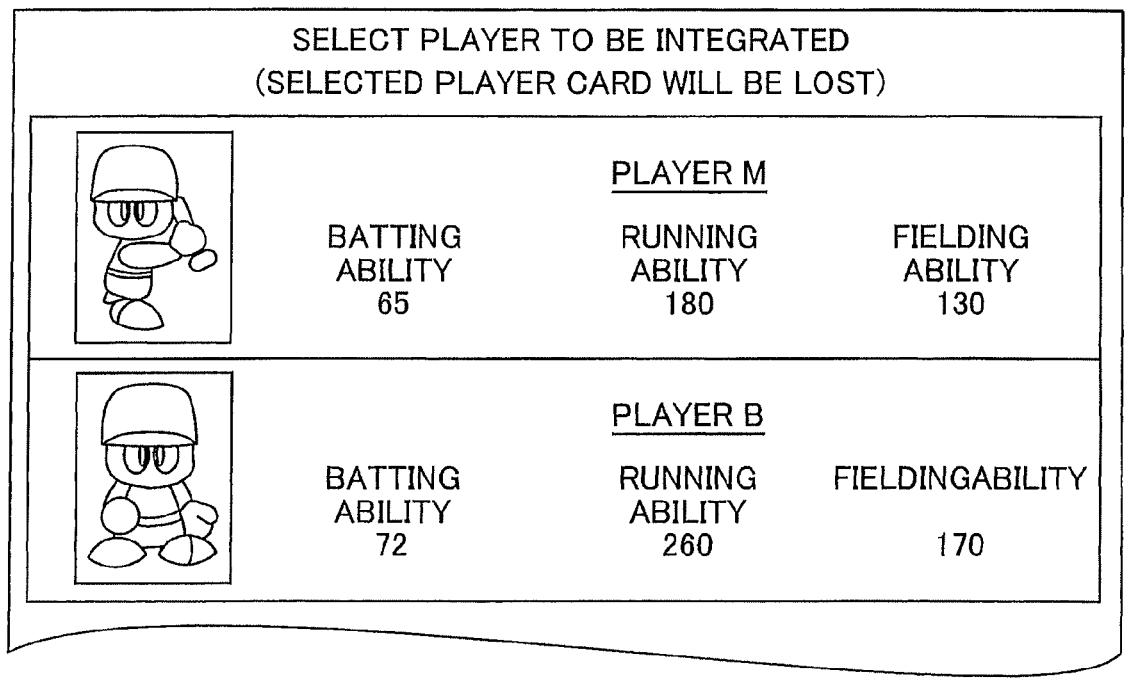
FIG. 23B is an exemplary screen to be displayed on the communication terminal in executing a processing of integrating player characters.
Figure 23C:
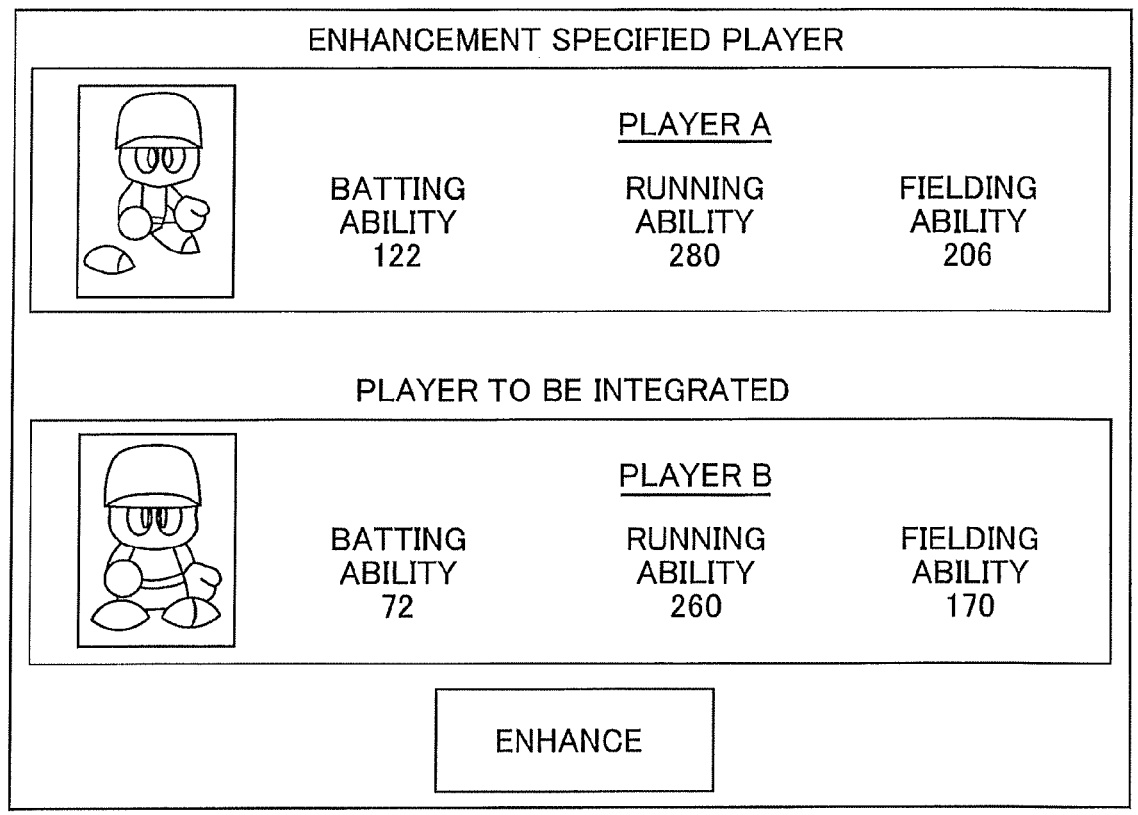
FIG. 23C is an exemplary screen to be displayed on the communication terminal in executing a processing of integrating player characters.
Figure 23D:
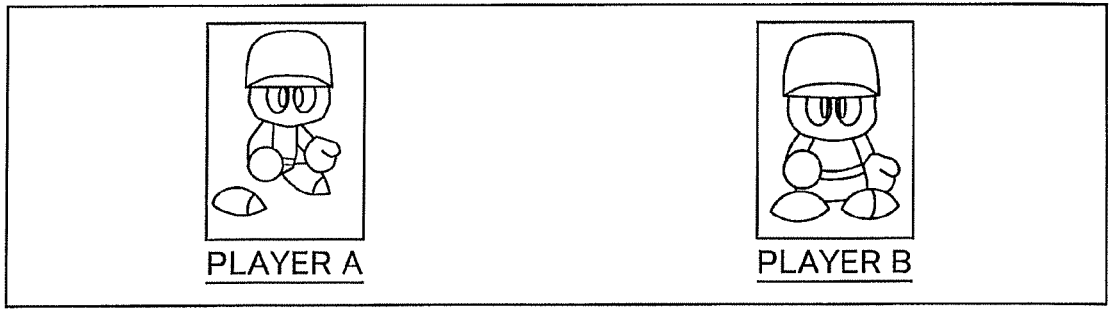
FIG. 23D is an exemplary screen to be displayed on the communication terminal in executing a processing of integrating player characters.
Figure 23E:
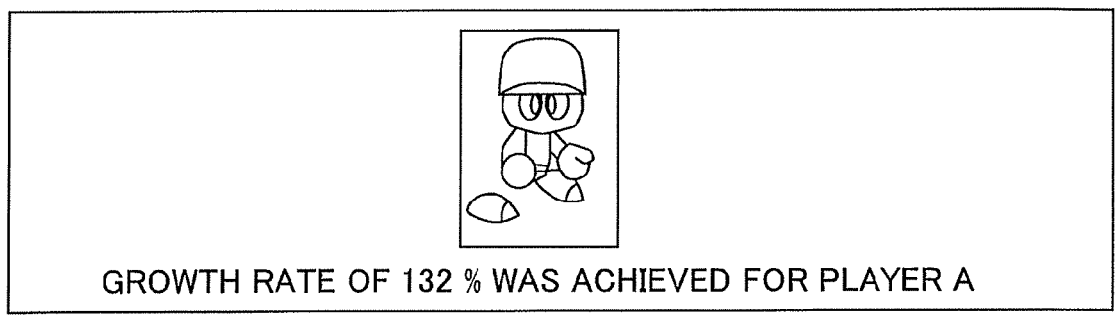
FIG. 23E is an exemplary screen to be displayed on the communication terminal in executing a processing of integrating player characters.

When recognizing that "ENHANCEMENT" is selected on the webpage illustrated in FIG. 6, for instance, the CPU 21 of the game server 20 is configured to transmit the HTML data to the communication terminal 10 for allowing it to display a webpage to prompt a game player to select a plurality of player characters as integration targets. As illustrated in FIG. 23A, an exemplary webpage to be herein firstly displayed is a list of enhancement-specified players (i.e., player characters as enhancement targets). A game player is herein allowed to select an enhancement-specified player on the webpage illustrated in FIG. 23A by performing a scrolling operation and pressing the confirmation button. When the enhancement-specified player is selected, a list of players to be integrated (i.e., player characters configured to disappear after integration) is then configured to be displayed as illustrated in FIG. 23B. A game player is herein allowed to select at least a player to be integrated with the enhancement-specified player on the webpage illustrated in FIG. 23B by performing a scrolling operation and pressing the confirmation button. FIG. 23C is a confirmation screen illustrating an exemplary case in which the player A is selected as an enhancement-specified player and the player B is selected as a player to be integrated with the player A. When an operation of selecting a menu of "ENHANCE" is herein performed, the result of the selection operation is transmitted to the game server 20. Based on the received result of the selection operation, the CPU 21 of the game server 20 is configured to calculate new ability values of the player A and access the player database 31 for deleting the data of the player B from the data of the corresponding game player ID. The CPU 21 is then configured to transmit the HTML data, containing a value indicting a level of increase in the new ability values, to the communication terminal 10. In response to receipt of the HTML data, the communication terminal 10 is configured to display a rendition that cards of the players A and B are overlapped and integrated and then only the card of the player A is displayed, as illustrated in FIGS. 23D and 23E. As illustrated in FIG. 23E, it is preferable to quantitatively display the level of increase in the ability values of the player A as the enhancement target (132% in the example of FIG. 23E).

FIGS. 23D and 23E illustrate the case in which the ability of the player A is updated by performing the rendition of integrating the player B with respect to the player A. However, the rendition of card integration may not be executed. Specifically, ability updating may be executed by extracting only the ability data of the player B and then implanting the extracted ability data of the player B into the player A. Alternatively, only the names of the respective player characters may be displayed in a list without displaying the cards of the respective player characters. A player as an enhancement target and another player to be used for enhancement of the enhancement target may be herein selected from the list, and the player as an enhancement target may be enhanced based on the selection. In this case, a specific player character is configured to be enhanced on the screen only through the textual information.

(3-2) Modification 2

A preferable modification of the first exemplary embodiment will be hereinafter explained.

The modification has the following remarkable feature. A result of the individual competition (i.e., the first match-up) is configured to affect a result of the league competition (i.e., the second match-up) to be held in parallel to the individual competition, and further, the result of the league competition (i.e., the second match-up) is configured to affect enhancement of the ability of the team of a game player by enriching the function of "DRAWING" explained with reference to FIG. 6. With the configuration, getting a better result in the individual competition (i.e., the first match-up) results in enhancement of the ability of a player character, and further, contributes to addition of either more various types of player characters or player characters with higher abilities to a game player's team. Thus, team ability can be also enhanced. Further, when a player character can be added, the added player character can be integrated with respect to a given player character in order to enhance the ability of the given player character as described in the modification 1. This realizes a profound game element.

The present modification will be hereinafter specifically explained.

Figure 24:
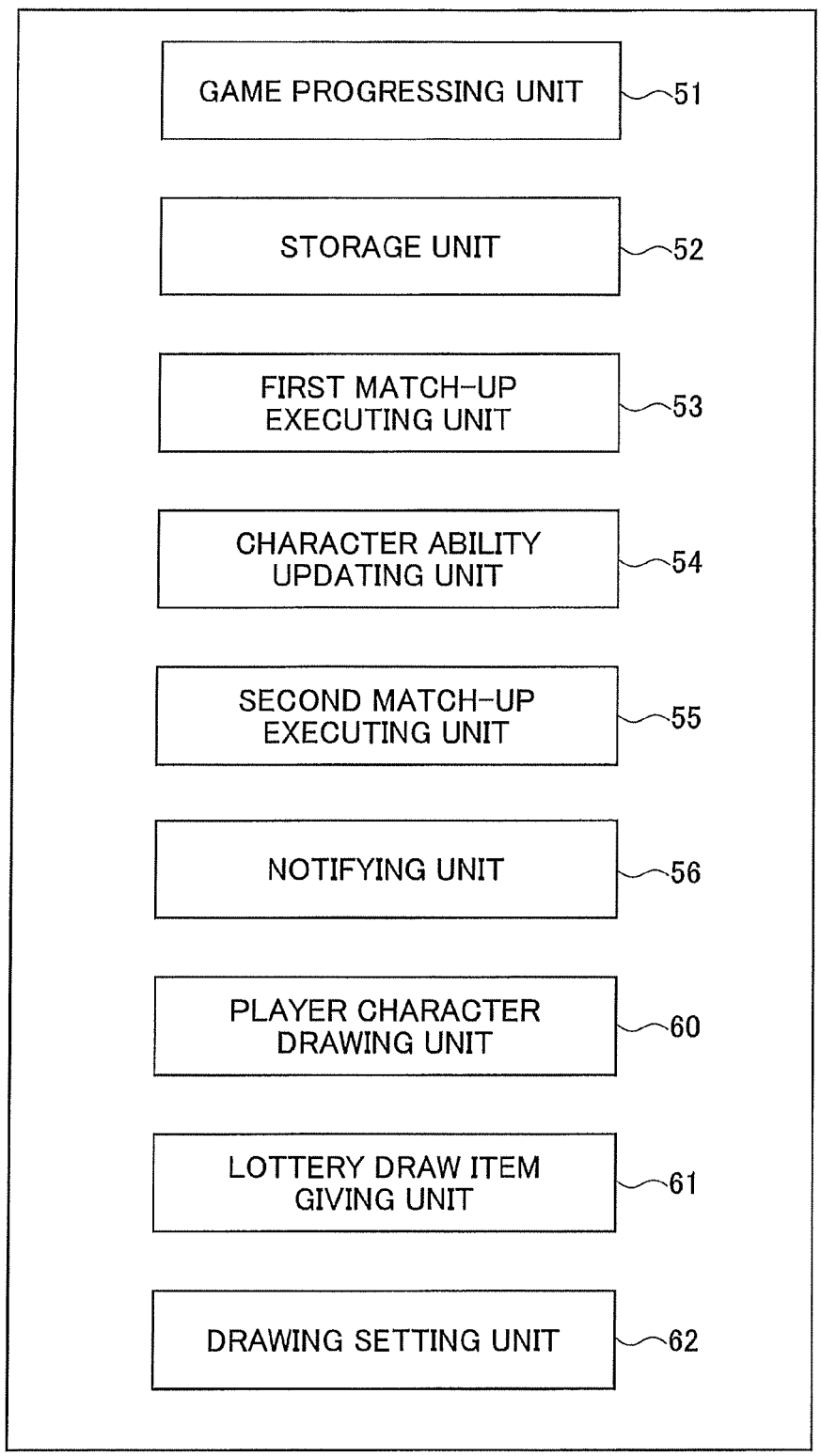
FIG. 24 is a functional block diagram for explaining a modification of the functions playing main roles in the game control device according to the exemplary embodiments.

FIG. 24 represents a functional block diagram of the modification. As represented in FIG. 24, the functional block diagram of the modification is obtained by adding a player character drawing unit 60, a lottery draw item giving unit 61 and a drawing setting unit 62 to the functional block diagram represented in FIG. 5.

The player character drawing unit 60 has a function of selecting one from the group of a plurality of player characters via a lottery draw based on a game player's operation and causing the storage unit 52 to store the selected player character in association with a corresponding game player ID. It should be noted that the lottery drawing function of the player character drawing unit 60 is different from "DRAWING" of FIG. 6 that the number of times allowed for lottery draws per day is limited. The function of the player character drawing unit 60 is realized as follows. The ROM 22 of the game server 20 stores a group of a plurality of player characters as a parent organization for lottery draws. When recognizing a game player's operational input regarding a lottery draw corresponding to the player character drawing unit 60, the CPU 21 is configured to access the group data stored in the ROM 22, randomly select a player character, and store the selected player character in association with the corresponding game player ID in the player database 31.

The lottery draw item giving unit 61 has a function of giving a game player more tickets (i.e., items for drawing) in accordance with better results of match-ups in the league competition (i.e., the second match-up) such as a better final ranking of the five seasons from Monday to Friday. For example, a predetermined number of tickets are given to a game player in accordance with the final ranking of the five seasons from Monday to Friday, and the given tickets are cumulated unless being used. The storage unit 52 is herein configured to store the number of tickets given to each game player on a game player ID basis. The function of the lottery draw item giving unit 61 is realized when the CPU 21 accesses the league competition database 32, obtains the data of the results of the match-ups in the league competition, and calculates the number of tickets to be given to a game player in accordance with the data. The following is an exemplary relation between the results of the match-ups in the league competition and the number of tickets to be given to a game player. It should be herein noted that a ranking is set as a ranking within each class.

Top 100 rankings . . . 4 tickets

Upper one-third of the total rankings . . . 3 tickets

Upper half of the total rankings (without the middle of the total rankings) . . . 2 tickets Lower half of the total rankings (including the middle of the total rankings) . . . 1 ticket The drawing setting unit 62 has a function of setting the number of times, allowed for lottery draws by the player character drawing unit 60 on a game player ID basis, to be increased in accordance with better results of match-ups in the league competition (i.e., the second match-up). For example, when a player character is assumed to be selected from the group of a plurality of player characters such as title holders (home run king, a rookie of the year, etc.), more tickets are configured to be given to a game player in accordance with better results of the match-ups in the league competition (i.e., the second match-up). Therefore, it is possible to set the number of times allowed for lottery draws from the group of title holders to be increased by that much. For example, the function of the drawing setting unit 62 can be herein realized as follows. The CPU 21 of the game server 20 causes the player database 31 to preliminarily store the cumulative value of the number of tickets to be given to a specific game player ID and determines (i.e., set) the number of times allowed for lottery draws with reference to the cumulative value. It is herein required to set the cumulative value of the number of tickets to be roughly proportional to the number of times allowed for lottery draws. For example, when 10 tickets have been cumulated so far (i.e., the cumulative value of the number of tickets is 10), the number of times allowed for lottery draws from the group of title holders is set to be once. When 20 tickets have been cumulated so far, on the other hand, the number of times allowed for lottery draws from the group of title holders is set to be twice.

According to the present modification, results of the match-ups in the league competition (i.e., the second match-up) also affects chances of obtaining player characters via lottery draws (i.e., the number of times allowed for lottery draws). In other words, a result of the match-up of the individual competition (i.e., the first match-up) affects not only results of the match-ups in the league competition, but also, indirectly the chances of obtaining player characters via lottery draws. From the standpoint of each game player, double gains can be obtained depending on a result of the match-up of the individual competition. It is thereby possible to realize a fun game full of amusement.

In the game server 20, two or more groups may be prepared as lottery draw targets for the ROM 22 in order to make lottery draws diverse. In this case, the player character drawing unit 60 may be configured to select a player character from a first group of a plurality of player characters and/or a second group of a plurality of player characters different from those in the first group via a lottery draw based on a game player's operation and to cause the storage unit 52 to store the selected player character in association with a corresponding game player ID.

For example, it is possible to set a group of a plurality of player characters as the best nine of the year (i.e., the second group) in addition to the aforementioned group of title holders (i.e., the first group). The group of the best nine of the year includes a plurality of player characters respectively having a higher ability (i.e., player characters functioning advantageously for a game player in a match-up) than that of the respective player characters in the group of title holders. In this case, when 20 tickets have been cumulated so far, the drawing setting unit 62 may be configured to set the number of times allowed for lottery draws from the group of title holders to be twice and set the number of times allowed for lottery draws from the group of the best nine of the year to be once. Thus, the drawing setting unit 62 herein has a function of causing the storage unit 52 to store the number of times allowed for lottery draws from the second group by the player character drawing unit 60 in association with a corresponding game player ID when the number of tickets, stored in the storage unit 52 in association with the corresponding game player ID by the function of the lottery draw item giving unit 61, is greater than or equal to a predetermined number.

When two or more groups are prepared as lottery draw targets and a lottery draw is available from the groups (i.e., when the number of times allowed for lottery draws is once or more with respect to two or more groups), a game player may be allowed to select any one of the groups as the lottery draw targets. For example, either of the following options may be selected by a game player. One is that a game player executes a lottery draw from the group of title holders when 10 tickets are cumulated. The other is that a game player further saves tickets and executes a lottery draw from the group of best nine of the year when 20 tickets are cumulated.

Figure 25:
FIG. 25 is an exemplary screen to be displayed on the communication terminal according to the modification of the exemplary embodiments.

FIG. 25 illustrates an exemplary screen to be displayed on the communication terminal 10 in the present modification. For example, a Hyperlink "GO TO RESULTS OF LEAGUE COMPETITION" illustrated in an image Sa of FIG. 25 is contained in the webpage configured to be displayed when a given game player access the game server 20. When the given game player performs the operation of selecting the Hyperlink, the selection result is configured to be transmitted to the game server 20. When receiving the selection result, the CPU 21 of the game server 20 is configured to access the player database 31. With reference to the data of the number of tickets possessed by the game player ID of the given game player, the CPU 21 is herein configured to check whether or not lottery draws are available for the group of title holders and the group of best nine of the year, respectively. When available, the CPU 21 is configured to determine the number of times allowed for lottery draws. The CPU 21 is then configured to transmit the HTML data to the communication terminal 10 of the given game player for allowing it to display the above information. As a result, the communication terminal 10 is configured to display a screen as illustrated in an image Sb of FIG. 25. In this example, 10 tickets are required for executing a lottery draw from the group of title holders, whereas 20 tickets are required for executing a lottery draw from the group of best nine of the year. At the present point of time, a game player of this example holds 12 tickets, and therefore, a lottery draw from the group of title holders is only available.

As described above, in the second modification 2, lottery draws are available from either the group of title holders or the group of best nine of the year through the collection of a predetermined number of items for drawing. In other words, a single type of item is prepared as the lottery draw item to be collected. Alternatively, it is possible to assume a configuration of preparing a plurality of types of items as the items for drawing. Specifically, two types of items, such as tickets for a lottery draw from the group of title holders and tickets for a lottery draw from the group of best nine of the year, may be prepared as the items for drawing to be given to game players in accordance with a result of the second match-up. For example, game players can get a ticket for a lottery draw from the group of best nine of the year when being ranked within top 30 in the ranking as a result of the second match-up. Further, game players can get a ticket for a lottery draw from the group of title holders when being ranked within top 70 in the ranking as a result of the second match-up.

In the aforementioned example, the number of tickets allowed for lottery draws is determined based on the final ranking of a single league competition (i.e., the second match-up) including five seasons from Monday to Friday. However, the number of tickets allowed for lottery draws may be alternatively determined based on values except for the final ranking. For example, an evaluation value may be calculated for each game player in accordance with a result of the league competition and the number of tickets (lottery draw items) may be configured to be determined in accordance with the magnitude of the evaluation value. For example, the evaluation value can be assumed to be obtained by converting a winning rate into point as follows.

15 wins and 10 losses . . . 600 points (i.e., a value obtained by multiplying the winning rate by 1000)

10 wins and 15 losses . . . 400 points (i.e., a value obtained by multiplying the winning rate by 1000)

For example, the number of tickets to be given to the aforementioned evaluation value may be set as follows.

950 points or greater . . . 4 tickets
700 points or greater . . . 3 tickets
500 points or greater . . . 2 tickets
Less than 500 points . . . 1 ticket Further in the aforementioned case, a predetermined number of items for drawing are firstly collected depending on a result of the league competition (i.e., the second match-up) and then a lottery draw is executed using the predetermined number of items. However, a lottery draw may be configured to be directly executed without intervention of the items for drawing. In other words, lottery draws may be configured to be executed from either the group of title holders or the group of best nine of the year at a predetermined number of times in accordance with a result of the league competition (i.e., the second match-up). In this case, the drawing setting unit 62 may set the number of times allowed for lottery draws by the player character drawing unit 60 to be increased in accordance with a better result of the second match-up (i.e., in accordance with a better order in the ranking or a higher evaluation value). For example, the number of times allowed for lottery draws may be set as follows.

Within top 30 in the total rankings . . . the number of times allowed for lottery draws from the group of best nine of the year: twice Within top 50 in the total rankings . . . the number of times allowed for lottery draws from the group of best nine of the year: once Within top one-tenth in the total rankings . . . the number of times allowed for lottery draws from the group of title holders: twice Within top one-fifth in the total rankings . . . the number of times allowed for lottery draws from the group of title holders: once In this example, the number of times allowed for lottery draws may be set based on the magnitude of the evaluation value in accordance with a result of the league competition (i.e., the second match-up), similarly to the aforementioned example. For example, the number of times allowed for lottery draws may be set as follows.

950 points or more . . . the number of times allowed for lottery draws from the group of best nine of the year: twice 900 points or more . . . the number of times allowed for lottery draws from the group of best nine of the year: once 800 points or more . . . the number of times allowed for lottery draws from the group of title holders: twice 750 points or more . . . the number of times allowed for lottery draws from the group of title holders: once In the aforementioned modification, the first group (i.e., the aforementioned group of title holders) and the second group (i.e., the aforementioned group of best nine of the year) are prepared as two parent groups for lottery draws, i.e., one group of plural player characters and the other group of plural player characters different from those in the former group. A single or plurality of chances for lottery draws (i.e., at least once of the number of times allowed for lottery draws) from one of the groups (i.e., the second group) are given to a game player in accordance with a result of the league competition. In other words, it is possible to provide a game setting of changing the parent group for lottery draws in accordance with a result of the league competition. Accordingly, the video game can be diversified.

Further in the aforementioned modification, a chance of lottery draw is not directly given to a game player based on a result of the league competition. Instead, a game player firstly collects items for drawing, the number of which to be given is determined depending on a result of the league competition. Then, a single or plurality of chances (i.e., at least once of the number of times allowed for lottery draws) are given to the game player when a predetermined number or more of the items for drawing are collected. In other words, an object for getting a chance of lottery draw (i.e., collecting a predetermined number of items for drawing) is set until a lottery draw becomes available for a game player. A game player is thus motivated to achieve the object. This can further enhance a game element.

It should be noted that "the number of times allowed for lottery draws" could be zero. In other words, no chance of lottery draw may be given to a game player in accordance with a result of the league competition.

In the aforementioned example, when two groups are prepared as target groups for lottery draw, the second group (i.e., the aforementioned group of best nine of the year) includes player characters respectively having a higher ability (i.e., player characters functioning advantageously for a game player in a match-up) than that of the respective player characters in the first group (i.e., the aforementioned group of title holders). According to the configuration, each game player is motivated to: collect items for drawing as much as possible by achieving a better result of the league competition (i.e., the second match-up); make a lottery draw from the second group available by the player character drawing unit 60; and thereby make the future match-ups advantageous. As described above, a result of a match-up of the individual competition (i.e., the first match-up) affects a result of a match-up in the league competition. Therefore, each game player is also indirectly motivated to achieve a better result of a match-up of the individual competition.

It should be noted that the second group may be formed by player characters respectively having a lower appearance rate (i.e., rare player characters) than that for the respective player characters in the first group. Here, appearance rate is relating to probability of drawing a player character. Specifically, the player characters in the second group may be set as rarely obtainable player characters respectively having lower ability values than those of the respective player characters in the first group. For example, it can be assumed that either retired baseball players in the real world or popular but incompetent baseball players are set as the rarely obtainable player characters.

In this case, a game player is motivated to: collect tickets (items for drawing) as much as possible by achieving better results in match-ups of the league competition (i.e., the second match-up); make a lottery draw from the second group available by the player character drawing unit 60; and obtain a rarely appearing player character via a lottery draw. As described above, a result of a match-up of the individual competition affects results of match-ups in the league competition. Therefore, each game player is also indirectly motivated to achieve a better result in a match-up of the individual competition.

(3-3) Modification 3

Another modification of the first exemplary embodiment will be hereinafter explained. In the first exemplary embodiment associated with FIG. 17, a result of a match-up of the individual competition (i.e., the first match-up) configured to be executed based on a game player's operational input at the communication terminal 10 is configured to be reflected to the league competition (i.e., the second match-up) configured to be executed on the background of (i.e., in parallel to) the individual competition on the next day of the individual competition (i.e., the first match-up). However, the reflecting timing may be set as follows.

For example, results of a plurality of match-ups of the individual competitions (i.e., the first match-up) to be held in a single day may be reflected to the league competition to be held in the same day. In other words, the league competition (i.e., the second match-up) is configured to be held in non-synchronization with the individual competition (i.e., the first match-up). The results of the match-ups of the individual competitions (i.e., the first match-up) are reflected to a subsequent league competition (i.e., the second match-up). Specifically, a plurality of seasons of the league competition may be preliminarily set in a single day, and results of match-ups of the individual competitions (i.e., the first match-up) executed before each league competition may be reflected to an immediately subsequent league competition (i.e., the second match-up). The player database 31 immediately stores ability updating to be executed for each player character based on a result of a match-up of the individual competition. Therefore, the updated ability is reflected to the subsequent league competition even in the same day.

Further, when "ENHANCEMENT" of a player character (i.e., a method of enhancing a player character by integrating a plurality of player characters) is herein employed and the "ENHANCEMENT" is executed before each league competition, a result of "ENHANCEMENT" may be reflected to an immediately subsequent league competition. In other words, a player character, for which "ENHANCEMENT" is executed before a given league competition, is configured to be used in the given league competition. By contrast, when "ENHANCEMENT" is executed after a plurality of league competitions are held, influence of match-ups of the individual competitions (i.e., the first match-up) held in the meantime may be collectively reflected to the ability of a player character, and the player character is configured to be used in an immediately subsequent league competition. According to the present modification, a result of the individual competition is quickly reflected to the league competition (i.e., the second match-up). Therefore, a speedy fun game can be realized.

(3-4) Modification 4

Yet another modification of the first exemplary embodiment will be hereinafter explained. The aforementioned modification 1 exemplifies the case in which the first match-up executing unit 53 is configured to give enhancement points (ability updating points) to a game player ID associated with a winner player character in the individual competition (i.e., the first match-up) as an ability updating method of updating the ability of a player character in response to a game player's operation of the communication terminal. Further, the processing of integrating a plurality of player characters already possessed by a game player is configured to be executed in return for consuming a predetermined mount of enhancement points in response to a predetermined game player's operation (e.g., the operation of selecting "ENHANCEMENT" in FIG. 6). However, the following modification may be further added to the first exemplary embodiment.

Specifically, separate enhancement points (i.e., the second ability updating points) to a game player ID as a winner in the league competition (i.e., the second match-up) may be given in addition to the enhancement points (i.e., the first ability updating points) to a game player ID as a winner in the individual competition (i.e., the first match-up). In other words, the second match-up executing unit 55 may be configured to give enhancement points to a game player ID associated with a winning player character in the league competition (i.e., the second match-up). The first ability updating points and the second ability updating points are respectively cumulated and stored in the player database 31 on a game player ID basis. The first ability updating points and the second ability updating points may be independently managed (stored), or alternatively, collectively managed (stored) as common ability updating points. In the modification, each game player can receive benefit of obtaining two types of points in a single individual competition. Therefore, a fun game full of amusement can be realized. Further, each game player can obtain enhancement points in accordance with a result of the league competition, although each game player does not directly get involved in the league competition. From the standpoint of each game player, not only a result of the individual competition affects the league competition, but also a result of the league competition can also contribute to ability updating for a player character. Further, the ability updating for a player character can affect the subsequent individual competition. Therefore, it is possible to realize a fun and profound game element of allowing each game player to obtain a plurality of results based on a single match-up.

Enhancement points (i.e., the first ability updating points) are herein configured to be given to a game player when the game player wins the individual competition. Alternatively, regardless of win or loss, predetermined enhancement points may be configured to be given to a game player when the game player executes the individual competition. When the game player wins the individual competition, more enhancement points may be configured to be additionally given to the game player. The league competition is configured to be automatically executed regardless of game player's intention. Therefore, enhancement points (i.e., the second ability updating points) may be configured to be given to a game player only when the game player wins the league competition.

It should be noted that the enhancement points obtainable in the individual competition (i.e., the first ability updating points) and the enhancement points obtainable in the league competition (i.e., the second ability updating points) can be used for integrating a plurality of player characters, and can be set in a variety of units and manners. Suppose the both types of enhancement points are set as the same unit, the amount of enhancement points to be given and the amount of enhancement points to be consumed may be set as follows based on a variety of opinions with respect to the game setting. It should be noted that the first match-up executing unit 53 and the second match-up executing unit 55 may set the amount of enhancement points to be given, while the character ability updating unit 54 may set the amount of enhancement points to be consumed.

It is possible to substantially change the influential level of a result of the individual competition and that of a result of the league competition with respect to updating of the ability of a player character by differently setting the given/consumed amount of enhancement points obtainable in the individual competition (i.e., the first ability updating points) and that of enhancement points obtainable in the league competition (i.e., the second ability updating points). Accordingly, the video game can be more diversified.

(Setting 1)

In a setting 1, the amount of the enhancement points obtainable as a result of the league competition (i.e., the second ability updating points) is set to be less than that of the enhancement points obtainable as a result of the individual competition (i.e., the first ability updating points). This is because weight of game player's direct involvement in the individual competition, which is a positive aspect of the game, is relatively reduced when the both types of enhancement points are set to be identical to each other. The setting is based on the concept that the enhancement points obtainable as a result of the league competition play an auxiliary role for deepening amusement of the game element. When a result of a match-up without game player's direct involvement is greatly valued, weight of a game player's operation is reduced and a factor without game player's direct involvement contributes to ability updating for a player character, which may cause the entire game balance to be lost. As a setting example, enhancement points obtainable for winning in the league competition may be set to be 15 points, while enhancement points obtainable for winning in the individual competition may be set to be 30 points. Thus, the amount of the enhancement points obtainable in the league competition may be set to be half that of the enhancement points obtainable in the individual competition.

(Setting 2)

In a setting 2 contrary to the setting 1, the amount of the enhancement points obtainable as a result of the league competition (i.e., the second ability updating points) is set to be greater than that of the enhancement points obtainable as a result of the individual competition (i.e., the first ability updating points). In this case, the amount of the enhancement points obtainable in the league competition without game player's direct involvement is greater than that of the enhancement points obtainable in the individual competition. Therefore, each game player may herein experience an unexpected situation. Specifically, each game player has chances of unexpectedly obtaining enhancement points greater than enhancement points obtained in the respective individual competition. Accordingly, an unpredictable game full of amusement can be realized.

(Setting 3)

In a setting 3, the amount of the enhancement points obtainable as a result of the individual competition (i.e., the first ability updating points) is set to be identical to that of the enhancement points obtainable as a result of the league competition (i.e., the second ability updating points). However, the amount of the second ability updating points may be set to be greater than that of the first ability updating points when being consumed as the enhancement points for integrating a plurality of player characters. In an exemplary case of integrating a player character B with respect to a player character A, 500 points may be required when the first ability updating points are consumed for the character integration as the conventional enhancement points. On the other hand, 1,000 points may be required when the second ability updating points are consumed for the character integration. Thus, the consumed points for the second ability updating points may be set to be double those for the first ability updating points. According to the setting, greater points are configured to be consumed from the enhancement points obtained as a result of the league competition without game player's direct involvement. In other words, weight of the individual competition is relatively increased similarly to the aforementioned setting 1. Therefore, the entire game balance cannot be easily lost.

(Setting 4)

In a setting 4 contrary to the setting 3, less point may be consumed from the second ability updating points than from the first ability updating points when being consumed as the enhancement points for integrating a plurality of player characters. From the standpoint of each game player, the enhancement points obtainable in the league competition without game player's direct involvement can be more effectively used in updating the ability of a corresponding player character. Therefore, each game player can feel a kind of sense of gaining profit. Together with such a fun gambling aspect, a video game with amusement can be realized. It should be noted that a game player may be allowed to select either of the first ability updating points and the second ability updating points as target points to be consumed. Alternatively, the first ability updating points may be configured to be automatically consumed first, and then, the second ability updating points may be configured to be consumed for offsetting a shortage of required points on an as-needed basis.

(3-5) Modification 5

A preferred modification of the second exemplary embodiment will be hereinafter explained.

Settings of opponents in the aforementioned promotion/demotion competition are not particularly limited. For example, the promotion/demotion competition may be held by opponent game player IDs classified in classes with greatly different levels. However, amusement of the video game can be further enhanced by executing the aforementioned promotion/demotion competition in tandem with the league competition and by limiting a match-up opponent in the subsequent promotion/demotion competition in accordance with results of match-ups in the league competition.

More specifically, the second match-up executing unit 55 is configured to execute the league competition among player characters associated with game player IDs classified in the same class. On the other hand, the third match-up executing unit 57 is configured to determine a class of a game player ID as an opponent of a given game player ID in the promotion/demotion competition based on results of match-ups in a single or plurality of league competitions either for a predetermined term in the past or at a predetermined number of times. In determining an opponent in the league competition, the CPU 21 of the game server 20 as second match-up executing unit 55 is herein configured to refer to the player database 31, extract only game player IDs classified in the same class, and determine an opponent from the extracted game player IDs. Further, the CPU 21 of the game server 20 as the third match-up executing unit 57 is configured to refer to the league competition database 32 in determining a class of an opponent (i.e., a game player ID) in the promotion/demotion competition. In other words, the result of the league competition held within the same class is configured to affect subsequent determination of an opponent in the promotion/demotion competition.

In the modification, any suitable method can be employed as a method of determining an opponent in the promotion/demotion competition in order to attract game player's interest to results of match-ups in the league competition. The following is an exemplary method of determining an opponent in the promotion/demotion competition. Specifically, when achieving a better result in the league competition, a given game player ID is configured to be assigned a game player ID ranked higher than the given game player ID as an opponent in the promotion/demotion competition. When achieving a poor result, by contrast, a given game player is configured to be assigned a game player ID ranked lower than the given game player ID as an opponent in the promotion/demotion competition. With the configuration, a game player ID having achieved a better result in the league competition can be promoted to a class higher than the present class thereof in the promotion/demotion competition, whereas a game player ID having achieved a poor result in the league competition can be demoted to a class lower than the present class thereof depending on a result in the promotion/demotion competition. Thus, the result of the league competition (i.e., the second match-up) held within the same class is configured to affect determination of an opponent in the promotion/demotion competition (i.e., the third match-up). Therefore, competitive relations are established among game players within the same class. This induces game player's interest in the results of the league competition, and amusement of the game can be thereby further enhanced.

A more specific aspect of the promotion/demotion competition according to the present modification will be explained with reference to FIG. 26.

Figure 26:
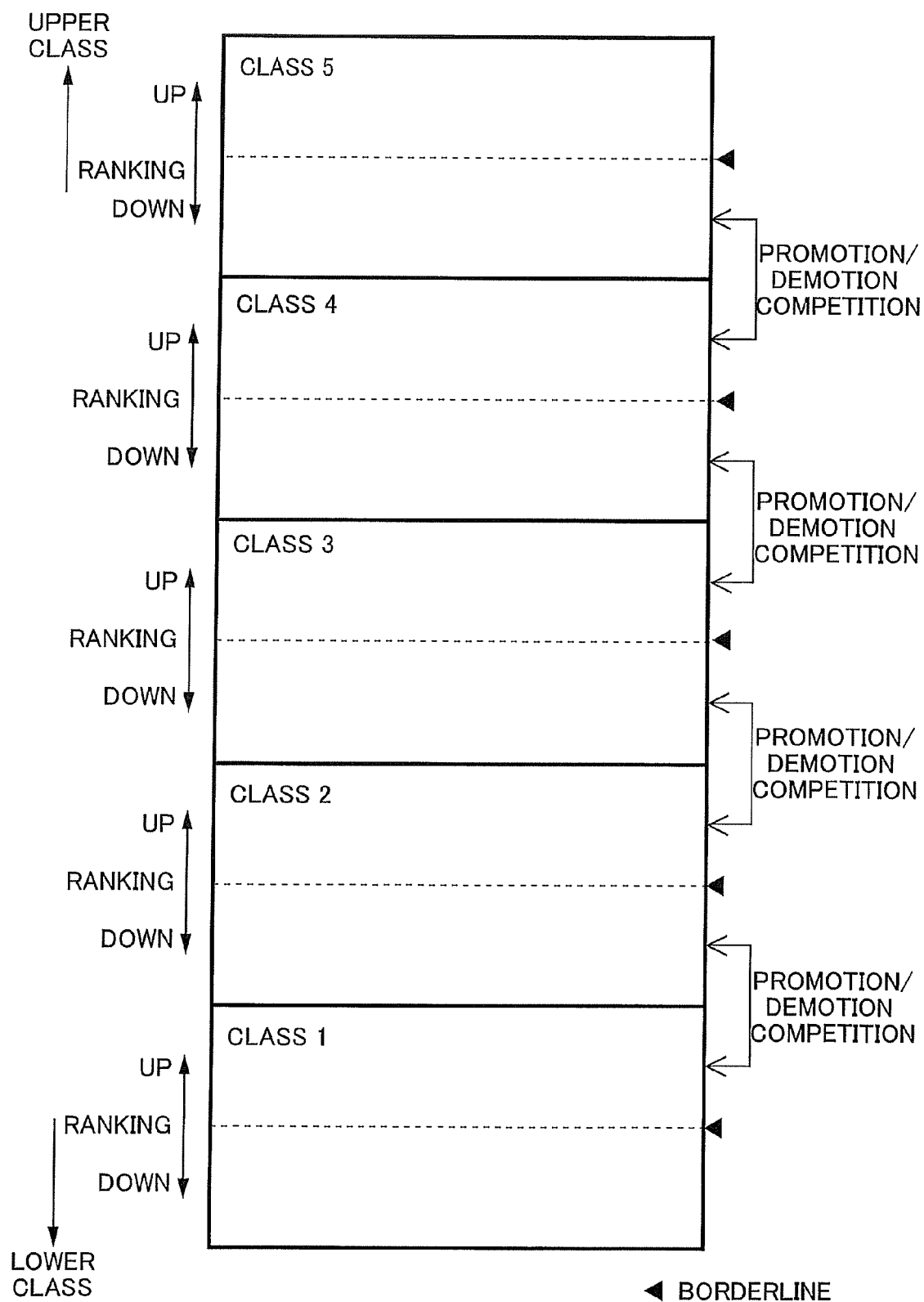
FIG. 26 is a diagram for explaining an exemplary inter-class promotion/demotion competition according to the second exemplary embodiment.

FIG. 26 conceptually illustrates an exemplary baseball game including five classes of Class 1, Class 2 . . . and Class 5 ranked from bottom to top. For example, a player character, associated with a given game player ID joining in a league competition, is configured to play five seasons of the league competition for five days from Monday to Friday, and the league competition is configured to be held within the same class. Therefore, the ranking of each game player ID is determined within each class when the final season of the league competition (i.e., the league competition on Friday) is finished. Further, an opponent of a given game player ID in the subsequent promotion/demotion competition is set depending on the ranking of the given game player ID within the class. For example, when 100 game player IDs are classified in each class in FIG. 26, either of the following options is set for a given game player ID depending on the ranking of the given game player ID in the league competition held by 100 game player IDs. One is that the given game player ID plays the promotion/demotion competition with an opponent classified in a class higher than the present class of the given game player ID. The other is that the given game player ID plays the promotion/demotion competition with an opponent classified in a class lower than the present class of the given game player ID.

FIG. 26 illustrates a threshold ranking as a borderline for dividing the rankings within the same class into a higher ranking group and a lower ranking group. For example, as to Classes 2 to 4 respectively including 100 game player IDs, depending on results of match-ups in the league competition for each class, 50 game player IDs classified in the higher ranking group of Class 3 are configured to play match-ups in the promotion/demotion competition with 50 game player IDs classified in the lower ranking group of Class 4, whereas 50 game player IDs classified in the lower ranking group of Class 3 are configured to play match-ups in the promotion/demotion competition with 50 game player IDs classified in the higher ranking group of Class 2. It should be noted that the borderline may be set in an arbitrary position. For example, the borderline may be preliminarily set either as a predetermined one of the rankings of game player IDs in each class or a position for dividing the game player IDs into two groups based on a predetermined ratio. Thus configured promotion/demotion competition produces a situation in which each game player expects to be finally ranked higher than a predetermined ranking in the league competition and is moved from joy to sorrow by the result of the ranking in the present class to be notified sequentially (e.g., on an everyday basis). Thus, the present modification always induces strong interest of each game player in the result of the league competition. Amusement of the match-up game can be thereby enhanced.

Further, the following advantageous effects can be further achieved by the present aspect of the promotion/demotion competition. In the aforementioned configuration, all the game players are divided into two groups depending on a result of the league competition. One of the groups includes game players configured to play match-ups with other game players classified in a higher class, while the other of the groups includes game players configured to play match-ups with other game players classified in a lower class. In this case, all the game players are configured to play match-ups in the promotion/demotion competition without exception. However, a given game player achieving a relatively poor result in the league competition is forced to play a match-up with an opponent game player classified in a lower class. Further, the given game player may be demoted to a lower class depending on a result of the match-up. Thus, it is possible to structure a system for providing each game player with a sense of tension. For the sake of explanation, the following exemplary case is assumed in which totally 100 game players play the league competition where game players ranked in a higher ranking group (i.e., 1st to 50th rankings) are configured to play the promotion/demotion competition with other game player classified in a higher class while game players ranked in a lower ranking group (i.e., 51st to 100th rankings) are configured to play the promotion/demotion competition with other game players classified in a lower class. In this case, a 50th ranked game player may be promoted to a class higher than his/her present class thereof depending on a result of the match-up with an opponent classified in a class higher than his/her present class. In addition, the 50th ranked game player at least has no chance of being demoted to a class lower than his/her present class. However, a 51st ranked game player may be demoted to a class lower than his/her present class depending on a result of the match-up with an opponent classified in a class lower than his/her present class. Thus, difference by one in rankings makes a big difference. Therefore, each game player is motivated to achieve a better result as much as possible and avoid a situation of being forced to play a match-up with an opponent classified in a lower class. As a result, it is possible to realize a game for providing each game player with a sense of tension.

(3-6) Modification 6

Yet another modification of the second exemplary embodiment will be hereinafter explained. In the second exemplary embodiment, the notifying unit 56 is configured to transmit the HTML data to the communication terminal 10 for causing it to display the webpage containing the result of the promotion/demotion competition in addition to the ranking of a corresponding game player ID based on results of match-ups in the immediate league competition and/or results of match-ups in a single or plurality of league competitions either for a predetermined term in the past or at a predetermined number of times. FIG. 20 illustrates an exemplary case in which a given game player ID was promoted to a class immediately higher than the as-of-then class thereof last week due to the last week's result of the match-ups in the promotion/demotion competition (18 wins and 6 losses), but was demoted to a class immediately lower than the as-of-then class thereof this week due to this week's result of the match-ups in the promotion/demotion competition (3 wins and 7 losses). The configuration is intended to inform each game player of the result of the league competition. As a modification, however, the notifying unit 56 may be configured to inform the communication terminal 10 of information regarding prediction of a class to be set after the promotion/demotion competition (i.e., the third match-up) to be held after a league competition (i.e., the second match-up) based on results of match-ups in the league competition.

As explained in the modification 5, prior to the promotion/demotion competition in the weekend (see FIG. 22), it is determined which of the groups each game player ID is ranked within each class (i.e., either an upper ranked group or a lower ranked group) depending on results of match-ups in the seasons of the league competition from Monday to Friday. As a result, an opponent (i.e., either an opponent classified in a higher class or an opponent classified in a lower class) in the promotion/demotion competition is determined. In the promotion/demotion competition, a given game player ID can be promoted to a class higher than the present class thereof when wining a match-up with an opponent classified in a class higher than the present class of the given game player ID, but is left in its present class when losing the match-up. On the other hand, a given game player ID is demoted to a class lower than the present class thereof when losing a match-up with an opponent classified in a class lower than the present class of the given game player ID, but is left in its present class when winning the match-up. In other words, chances of promotion or demotion are revealed prior to execution of the promotion/demotion competition. In the present modification, as the information regarding prediction of a class to be set after the promotion/demotion competition, each game player is notified of: information indicating that the game player ID of each game player is within "a promotion range" when having a chance of promotion; and information indicating that the game player ID of each game player is within "a demotion range" when having a chance of demotion. When being notified of such information, each game player learns chances of promotion and demotion prior to execution of the promotion/demotion competition. Therefore, each game player will wait for the result of the promotion/demotion competition while being evoked a sense of psychological excitation. As a result, amusement of the video game can be enhanced.

Figure 27:
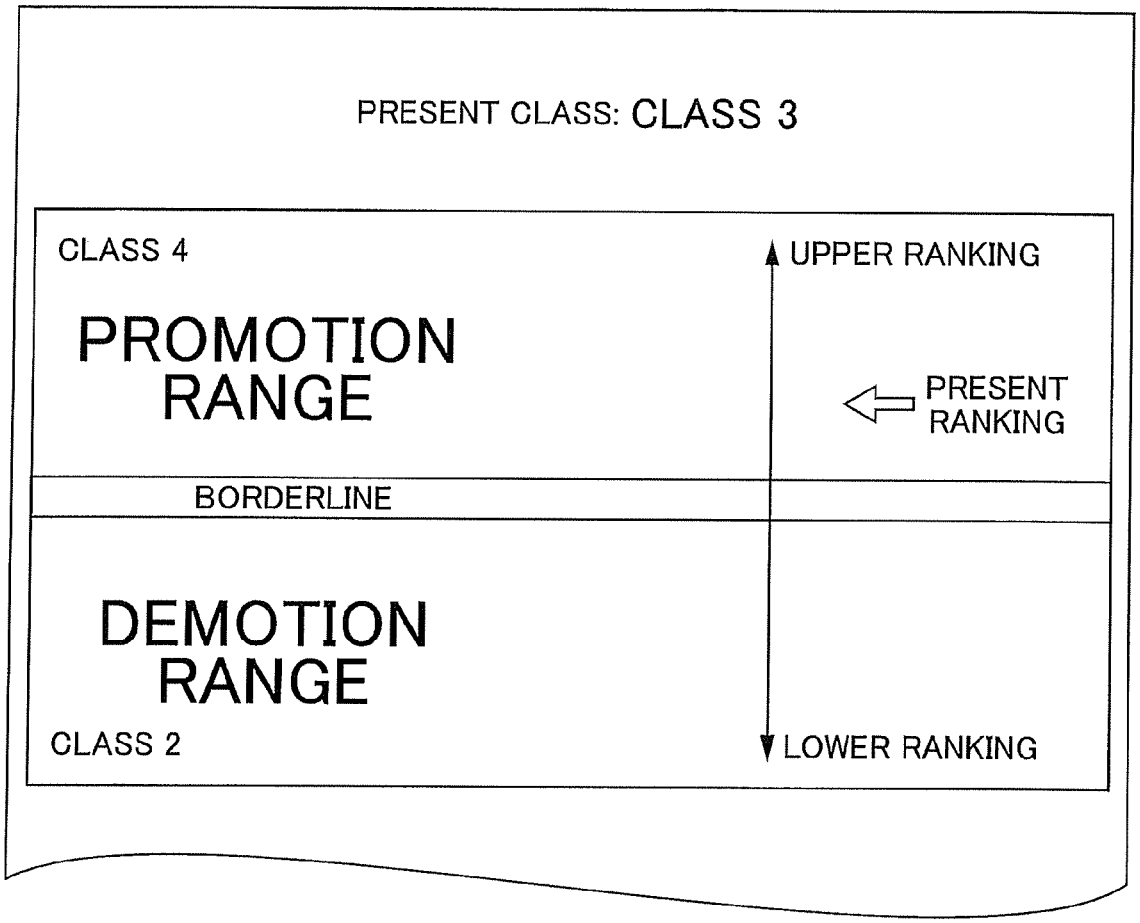
FIG. 27 is an exemplary screen for displaying information regarding prediction of a class set after the promotion/demotion competition.

FIG. 27 illustrates an exemplary screen to be displayed when the communication terminal 10 receives the HTML data containing information regarding prediction of a class to be set after the promotion/demotion competition. In the example of FIG. 27, a target game player is the one having a game player ID currently classified in Class 3. On the display screen, the present ranking of a given game player ID in Class 3 is visually recognizable immediately by the vertical position of the text character sequence of "PRESENT RANKING". In the example, the present ranking is included within the "PROMOTION RANGE", and therefore, the class to be set after the promotion/demotion competition will be obviously either Class 3 as the present class or Class 4 as a class higher than the present class. It should be noted that the display screen of FIG. 27 is just exemplary only. Chances of promotion and demotion may be expressed by numeric values such as "PROMOTION CHANCE: A %; DEMOTION CHANCE: B %", or alternatively, expressed by stepwise scales (e.g., chances of promotion and demotion displayed with 10 levels). For example, it is assumed that chances of promotion or demotion are calculated to be in a range of 30-70% depending on a ranking within a class. Alternatively, chances of promotion and demotion may be more simply displayed with three levels of "promotion range", "borderline" and "demotion range".

It should be noted that the notifying unit 56 may be configured to notify the communication terminal 10 of the information regarding prediction of a class as of now, either after each match-up in the league competition or every day from Monday to Friday, without notifying it of the information after all the match-ups in the seasons of the league competition from Monday to Friday are finished and then all the results are obtained. In this case, once recognizing that a corresponding game player ID is included within the "demotion range", each game player tries to achieve a better result in the remaining match-ups in the league competition towards promotion because his/her game player ID has a chance of demotion in the next promotion/demotion competition. In other words, each game player aims at winning in the individual competition affecting a result of the league competition. Therefore, each game player can be strongly motivated to actively play the video game.

The exemplary embodiments of the present invention have been explained in detail. However, the present invention is not limited to the aforementioned exemplary embodiments. Further, it is apparent that a variety of changes and modifications can be made for the respective exemplary embodiments without departing from the scope of the present invention.

In the aforementioned exemplary embodiments, for instance, the match-up game is configured to be progressed through the webpage displayed by the web browser of each game player's communication terminal based on the web service provided from the game server. The configuration is advantageous in that each communication terminal is not required to download or install software for the game. However, the method of executing the match-up game is not limited to the aforementioned configuration. The match-up game of the present exemplary embodiments can be executed by partially downloading or installing functions to be realized by the software for the game into each communication terminal.

What is claimed is:

1. A game control device connected to at least one communication terminal through a network, the at least one communication terminal being operated by a game player, for executing a match-up between two player characters associated with two respective sets of unique game player identification information, the game control device comprising:
   a memory;
   a processor configured to:
      exemplify at least one physical ability of each player character by assigning an ability value to each player character in association with a corresponding set of unique game player identification information,
      store in the memory the ability value of each player character in association with a corresponding set of unique game player identification information,
      interpret an input at one of said at least one communication terminal as an indication to perform an individual competition by executing a manual match-up between two player characters in response to input at one of said at least one communication terminal, the two player characters being associated with respective sets of game player identification information that are different from each other, and to determine a result of the individual competition in accordance with a result of the manual match-up that is based on the stored ability value of each player character,
      evaluate the result of the manual match-up to identify as a winning player character that of the two player characters that won the manual match-up, and to identify as a losing player character that of the two player characters that lost the manual match up,
      update the ability values of the winning player character of the two player characters in a first manner, update the ability values of the losing player character of the two player characters in a second manner, different than the first manner, and cause the memory to store the updated ability values of the winning player character and the losing player character,
      evaluate timing information to determine a specified time at which to perform a league competition,
      create, at the specified time at which the league competition is to begin, copy data of a version of the stored ability values of the player characters associated with the different sets of game player identification information that exists at the specified time at which the league competition is to begin,
      automatically perform the league competition at the specified time by executing an automatic match-up between player characters at the specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and
      during the executing of the automatic match-up, evaluating competition between the player characters, and updating the ability values of the player characters associated with the different sets of game player identification information stored in the memory based on the competition while executing the automatic match-up based on the copy data; and
   a communication interface configured to transmit, to said at least one communication terminal, a result of at least one automatic match-up either for a specified past time period or at a predetermined number of times and/or of a ranking of a corresponding set of game player identification information based on said result of at least one automatic match-up.

2. The game control device according to claim 1, the processor further configured to:
   select a player character from a group of a plurality of player characters via a lottery draw based on a game player's operational input at said at least one communication terminal and to cause the memory to store the selected player character in association with a corresponding set of unique game player identification information, and
   set a number of times of lottery draws in association with each set of game player identification information to be increased in accordance with a better result of the automatic match up.

3. The game control device according to claim 1, the processor further configured to:
   select a player character from a first group of a plurality of player characters and/or a second group of a plurality of player characters different from the player characters in the first group via a lottery draw based on a game player's operational input at said at least one communication terminal and to cause the memory to store the selected player character in association with a corresponding set of unique game player identification information,
   cause the memory to store a greater number of lottery draw items in accordance with a better result of the automatic match-up in association with a corresponding set of unique game player identification information, and
   set a number of times of lottery draws from the second group when the number of the stored draw items in association with a corresponding set of unique game player identification information is greater than or equal to a predetermined number.

4. The game control device according to claim 1, the processor further configured to:
select a player character from a first group of a plurality of player characters and/or a second group of a plurality of player characters respectively having an ability value higher than an ability value of each of the player characters in the first group via a lottery draw based on a game player's operational input at said at least one communication terminal and to cause the memory to store the selected player character in association with a corresponding set of unique game player identification information,
cause the memory to store a greater number of lottery draw items in accordance with a better result of the automatic match-up in association with a corresponding set of unique game player identification information, and
set a number of times of lottery draws from the second group when the number of the stored lottery draw items in association with a corresponding set of unique game player identification information is greater than or equal to a predetermined number.

5. The game control device according to claim 1, the processor further configured to:
select a player character from a first group of a plurality of player characters and/or a second group of a plurality of player characters respectively having an appearance rate lower than an appearance rate of each of the player characters in the first group via a lottery draw based on a game player's operational input at said at least one communication terminal and to cause the memory to store the selected player character in association with a corresponding set of unique game player identification information,
cause the memory to store a greater number of lottery draw items in accordance with a better result of the automatic match-up in association with a corresponding set of unique game player identification information, and
set a number of times of lottery draws from the second group when the number of the stored lottery draw items in association with a corresponding set of unique game player identification information is greater than or equal to a predetermined number.

6. The game control device according to claim 1, wherein the processor is configured to:
execute the manual match-up to give a first ability updating point in accordance with the result of the manual match-up in association with a corresponding set of unique game player identification information and to cause the memory to cumulatively store the given first ability updating point,
execute the automatic match-up to give a second ability updating point in accordance with the result of the automatic match-up in association with a corresponding set of unique game player identification information and to cause the memory to cumulatively store the given second ability updating point, and
update the character ability to consume a predetermined amount of the first ability updating point and/or the second ability updating point for updating an ability of a corresponding player character in response to a game player's operational input at said at least one communication terminal.

7. The game control device according to claim 6, wherein the processor is configured to update the character ability to a differently set amount of the first ability updating point to be given and an amount of the second ability updating point to be given when the result of the manual match-up and the result of the automatic match-up are the same.

8. The game control device according to claim 6, wherein the processor is configured to update character ability to a differently set amount of the first ability updating point to be consumed and an amount of the second ability updating point to be consumed when ability updating is executed for the identical player character.

9. The game control device according to claim 1, the processor further configured to:
execute a second automatic match-up between player characters independently from the manual match-up without receiving a command to begin the second automatic match-up from any said communication terminal, the player characters being associated with different sets of game player identification information, and to automatically determine a result of the second automatic match-up based on the stored ability value of each player character, and
manage each set of unique game player identification information in association with one of a plurality of classes and determine one from the options of: changing a present class of each set of unique game player identification information to a class higher than the present class; changing the present class of each set of unique game player identification information to a class lower than the present class; and unchanging the present class of each set of unique game player identification information.

10. The game control device according to claim 9, wherein the processor is configured to:
execute the automatic match-up between player characters associated with sets of unique game player identification information classified in the same class, and
automatically determine a class of a set of unique game player identification information as an opponent of each set of unique game player identification information in the second automatic match-up based on at least one result of the automatic match-up either for a specified past time period or at a predetermined number of times.

11. The game control device according to claim 10, wherein the processor is configured to:
define a first condition as a condition that a ranking of a given set of unique game player identification information classified in one of the classes based on at least one result of the automatic match-up either for a specified past time period or at a predetermined number of times is either ranked higher than a predetermined ranking within said one of the classes or included in a group of higher rankings occupying a predetermined ratio of the total number of sets of game player identification information within said one of the classes, and
automatically determine an opponent of the given set of unique game player identification information in the second automatic match-up from sets of unique game player identification information classified in a class ranked higher than the class of the given set of unique game player identification information when the first condition is satisfied, and automatically determine an opponent of the given set of unique game player identification information in the second automatic match-up from sets of unique game player identification information classified in a class ranked lower than the class of the given set of unique game player identification information when the first condition is unsatisfied.

12. The game control device according to claim 10, wherein the communication interface is configured to transmit, to said at least one communication terminals, information regarding prediction of a class assigned to a corresponding set of unique game player identification information after the second automatic match-up to be executed after the automatic match-up based on the result of the automatic match-up.

13. The game control device according to claim 9, wherein the communication interface is configured to preliminarily transmit, to at least one communication terminals, a real world starting time of at least one of the automatic match-up and the second automatic match-up before the start of the at least one of the automatic match-up and the second automatic match-up.

14. A game control device connected to at least one communication terminal through a network, the at least one communication terminal being operated by a game player, for executing a match-up between two player characters associated with two respective sets of unique game player identification information, the game control device comprising:
a storage memory;
a processor configured to:
exemplify at least one physical ability of each player character by assigning an ability value to each player character in association with a corresponding set of unique game player identification information,
store in the memory the ability value of each player character in association with a corresponding set of unique game player identification information,
interpret an input at one of said at least one communication terminal as an indication to perform an individual competition by executing a manual match-up between two player characters based on input at one of said at least one communication terminal, the two player characters being associated with respective sets of game player identification information that are different from each other, and to determine a result of the individual competition in accordance with a result of the manual match-up that is based on the stored ability value of each player character,
evaluate the result of the manual match-up to identify as a winning player character that of the two player characters that won the manual match-up, and to identify as a losing player character that of the two player characters that lost the manual match up,
update the ability values of the winning player character of the two player characters in a first manner, update the ability values of the losing player character of the two player characters in a second manner, different than the first manner, and cause the memory to store the updated ability values of the winning player character and the losing player character,
evaluate timing information to determine a specified time at which to perform a league competition,
create, at the specified time at which the league competition is to begin, copy data of a version of the stored ability values of the player characters associated with the different sets of game player identification information that exists at the specified time at which the league competition is to begin,
automatically perform the league competition at the specified time by executing an automatic match-up between player characters at predetermined intervals, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and
during the executing of the automatic match-up, evaluating competition between the player characters, and updating the ability values of the player characters associated with the different sets of game player identification information stored in the memory based on the competition while executing the automatic match-up based on the copy data; and
a communication interface configured to transmit, to one of said at least one communication terminals, a result of at least one automatic match-up either for a past time period or at a predetermined number of times and/or of a ranking of a corresponding set of game player identification information based on said result of at least one automatic match-up.

15. A game control device connected to at least one communication terminal through a network, the at least one communication terminal being operated by a game player, for executing a match-up between two player characters associated with two respective sets of unique game player identification information, the game control device comprising:
a memory;
a processor configured to:
exemplify at least one physical ability of each player character by assigning an ability value to each player character in association with a corresponding set of unique game player identification information,
store in the memory the ability value of each player character in association with a corresponding set of unique game player identification information,
interpret an input at one of said at least one communication terminal as an indication to perform an individual competition by executing a manual match-up between two player characters based on input at one of said at least one communication terminal, the two player characters being associated with respective sets of game player identification information that are different from each other, and to determine a result of the individual competition in accordance with a result of the manual match-up that is based on the stored ability value of each player character,
evaluate the result of the manual match-up to identify as a winning player character that of the two player characters that won the manual match-up, and to identify as a losing player character that of the two player characters that lost the manual match up, update the ability values of the winning player character of the two player characters in a first manner, update the ability values of the losing player character of the two player characters in a second manner, different than the first manner, and cause the memory to store the updated ability values of the winning player character and the losing player character, evaluate timing information to determine a specified time at which to perform a league competition, create, at the specified time at which the league competition is to begin, copy data of a version of the stored ability values of the player characters associated with the different sets of game player identification information that exists at the specified time at which the league competition is to begin, automatically perform the league competition at the specified time by executing an automatic match-up between player characters at a preliminarily set clock, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to one of said at least one communication terminals, a result of at least one automatic match-up either for a specified past time period or at a predetermined number of times and/or of a ranking of a corresponding set of game player identification information based on said result of at least one automatic match-up.

16. A game control device connected to at least one communication terminal through a network, the at least one communication terminal being operated by a game player, for executing a match-up between two player characters associated with two respective sets of unique game player identification information, the game control device comprising:

a memory;

a processor configured to:

exemplify at least one physical ability of each player character by assigning an ability value to each player character in association with a corresponding set of unique game player identification information, store in the memory the ability value of each player character in association with a corresponding set of unique game player identification information, interpret an input at one of said at least one communication terminal as an indication to perform an individual competition by executing a manual match-up between two player characters in response to an input at one of said at least one communication terminal, the two player characters being associated with respective sets of game player identification information that are different from each other, and to determine a result of the individual competition in accordance with a result of the manual match-up that is based on the stored ability value of each player character, evaluate the result of the manual match-up to identify as a winning player character that of the two player characters that won the manual match-up, and to identify as a losing player character that of the two player characters that lost the manual match up, update the ability values of the winning player character of the two player characters in a first manner, and update the ability values of the losing player character of the two player characters in a second manner, different than the first manner, in response to a game player's operational input at one of said at least one communication terminal based on the result of the manual match-up, and cause the memory to store the updated ability values of the winning player character and the losing player character, evaluate timing information to determine a specified time at which to perform a league competition, create, at the specified time at which the league competition is to begin, copy data of a version of the stored ability values of the player characters associated with the different sets of game player identification information that exists at the specified time at which the league competition is to begin, automatically perform the league competition at the specified time by executing an automatic match-up between player characters at the specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to said at least one communication terminals, a result of at least one automatic match-up either for a specified past time period or at a predetermined number of times and/or of a ranking of a corresponding set of game player identification information based on said result of at least one automatic match-up.

17. A game control device connected to at least one communication terminal through a network, the at least one communication terminal being operated by a game player, for executing a match-up between two player characters associated with two respective sets of unique game player identification information, the game control device comprising:
- a memory;
- a processor configured to:
    - exemplify at least one physical ability of each player character by assigning an ability value to each player character in association with a corresponding set of unique game player identification information,
    - store in the memory the ability value of each player character in association with a corresponding set of unique game player identification information,
    - interpret an input at one of said at least one communication terminal as an indication to perform an individual competition by executing a manual match-up between two player characters in response to an input at one of said at least one communication terminal, the two player characters being associated with respective sets of game player identification information that are different from each other, and to determine a result of the individual competition in accordance with a result of the manual match-up that is based on the stored ability value of each player character;
    - evaluate the result of the manual match-up to identify as a winning player character that of the two player characters that won the manual match-up, and to identify as a losing player character that of the two player characters that lost the manual match up,
    - update the ability values of the winning player character of the two player characters in a first manner, and update the ability values of the losing player character of the two player characters in a second manner, different than the first manner, based on the result of the manual match-up in response to a game player's operational input at the given one of said at least one communication terminal, and cause the memory to store the updated ability values of the winning player character and the losing player character,
    - evaluate timing information to determine a specified time at which to perform a league competition,
    - create, at the specified time at which the league competition is to begin, copy data of a version of the stored ability values of the player characters associated with the different sets of game player identification information that exists at the specified time at which the league competition is to begin,
    - automatically perform the league competition at the specified time by executing an automatic match-up between player characters at the specified, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and
    - during the executing of the automatic match-up, evaluating competition between the player characters, and updating the ability values of the player characters associated with the different sets of game player identification information stored in the memory based on the competition while executing the automatic match-up based on the copy data; and
- a communication interface configured to transmit, to said at least one communication terminals, a result of at least one automatic match-up either for a specified past time period or at a predetermined number of times and/or of a ranking of a corresponding set of game player identification information based on said result of at least one automatic match-up.

18. A game control device connected to at least one communication terminal through a network, the at least one communication terminal being operated by a game player, for executing a match-up between two player characters associated with two respective sets of unique game player identification information, the game control device comprising:
- a memory;
- a processor configured to:
    - exemplify at least one physical ability of each player character by assigning an ability value to each player character in association with a corresponding set of unique game player identification information,
    - store in the memory the ability value of each player character in association with a corresponding set of unique game player identification information,
    - interpret an input at one of said at least one communication terminal as an indication to perform an individual competition by executing a manual match-up between two player characters based on an input at one of said at least one communication terminal, the two player characters being associated with respective sets of game player identification information that are different from each other, and to determine a result of the individual competition in accordance with a result of the manual match-up that is based on the stored ability value of each player character,
    - evaluate the result of the manual match-up to identify as a winning player character that of the two player characters that won the manual match-up, and to identify as a losing player character that of the two player characters that lost the manual match up,
    - update the ability values of the winning player character of the two player characters in a first manner, and update the ability values of the losing player character of the two player characters in a second manner, different than the first manner, in response to a game player's operational input at one of said at least one communication terminal, and cause the memory to store the updated ability values of the winning player character and the losing player character,
    - evaluate timing information to determine a specified time at which to perform a league competition,
    - create, at the specified time at which the league competition is to begin, copy data of a version of the stored ability values of the player characters associated with the different sets of game player identification information that exists at the specified time at which the league competition is to begin,
    - automatically perform the league competition at the specified time by executing an automatic match-up between player characters at predetermined intervals, the automatic match-up being based on the copy data of the stored ability values of the player characters participating in the automatic match-up, the automatic match-up being performed independently from the manual match-up, the player characters being associated with different sets of game player identification information without receiving a command to begin the automatic match-up from any said communication terminal and without receiving any input from any said communication terminal during the automatic match-up, and automatically determine a result of the automatic match-up based on the stored ability value of each player character, and during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to one of said at least one communication terminals, a result of at least one automatic match-up either for a specified past time period or at a predetermined number of times and/or of a ranking of a corresponding set of game player identification information based on said result of at least one automatic match-up.

19. A game control device connected to at least one communication terminal through a network, the at least one communication terminal being operated by a game player, for executing a match-up between two player characters associated with two respective sets of unique game player identification information, the game control device comprising:

a memory;
a processor configured to:
exemplify at least one physical ability of each player character by assigning an ability value to each player character in association with a corresponding set of unique game player identification information,
store in the memory the ability value of each player character in association with a corresponding set of unique game player identification information,
interpret an input at one of said at least one communication terminal as an indication to perform an individual competition by executing a manual match-up between two player characters in response to an input at one of said at least one communication terminal, the two player characters being associated with respective sets of game player identification information that are different from each other, and to determine a result of the individual competition in accordance with a result of the manual match-up that is based on the stored ability value of each player character,
evaluate the result of the manual match-up to identify as a winning player character that of the two player characters that won the manual match-up, and to identify as a losing player character that of the two player characters that lost the manual match up,
update the ability values of the winning player character of the two player characters in a first manner, update the ability values of the losing player character of the two player characters in a second manner, different than the first manner, and cause the memory to store the updated ability values of the winning player character and the losing player character, evaluate timing information to determine a specified time at which to perform a league competition,
create, at the specified time at which the league competition is to begin, copy data of a version of the stored ability values of the player characters associated with the different sets of game player identification information that exists at the specified time at which the league competition is to begin,
automatically perform the league competition at the specified time by executing an automatic match-up between player characters at said specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and
during the executing of the automatic match-up, evaluating competition between the player characters, and updating the ability values of the player characters associated with the different sets of game player identification information stored in the memory based on the competition while executing the automatic match-up based on the copy data; and
a communication interface configured to transmit, to said at least one communication terminals, a result of at least one automatic match-up either for a specified past time period or at a predetermined number of times and/or of an evaluation value of a corresponding set of game player identification information based on said result of at least one automatic match-up.

20. A game control device connected to at least one communication terminal through a network, the at least one communication terminal being operated by a game player, for executing a match-up between two player characters associated with two respective sets of unique game player identification information, the game control device comprising:

a memory;
a processor configured to:
exemplify at least one physical ability of each player character by assigning an ability value to each player character in association with a corresponding set of unique game player identification information,
store in the memory the ability value of each player character in association with a corresponding set of unique game player identification information,
interpret an input at one of said at least one communication terminal as an indication to perform an individual competition by executing a manual match-up between two player characters based on an input at one of said at least one communication terminal, the two player characters being associated with respective sets of game player identification information that are different from each other, and to determine a result of the individual competition in accordance with a result of the manual match-up that is based on the stored ability value of each player character, evaluate the result of the manual match-up to identify as a winning player character that of the two player characters that won the manual match-up, and to identify as a losing player character that of the two player characters that lost the manual match up, update the ability values of the winning player character of the two player characters in a first manner, update the ability values of the losing player character of the two player characters in a second manner, different than the first manner, and cause the memory to store the updated ability values of the winning player character and the losing player character, evaluate timing information to determine a specified time at which to perform a league competition, create, at the specified time at which the league competition is to begin, copy data of a version of the stored ability values of the player characters associated with the different sets of game player identification information that exists at the specified time at which the league competition is to begin, automatically perform the league competition at the specified time by executing an automatic match-up between player characters at predetermined intervals, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to said at least one communication terminals, a result of at least one automatic match-up either for a specified past time period or at a predetermined number of times and/or of an evaluation value of a corresponding set of game player identification information based on said result of at least one automatic match-up.

21. A game control device connected to at least one communication terminal through a network, the at least one communication terminal being operated by a game player, for executing a match-up between two player characters associated with two respective sets of unique game player identification information, the game control device comprising:

a memory;

a processor configured to:

exemplify at least one physical ability of each player character by assigning an ability value to each player character in association with a corresponding set of unique game player identification information, store in the memory the ability value of each player character in association with a corresponding set of unique game player identification information, interpret an input at one of said at least one communication terminal as an indication to perform an individual competition by executing a manual match-up between two player characters in response to an input at one of said at least one communication terminal, the two player characters being associated with respective sets of game player identification information that are different from each other, and to determine a result of the individual competition in accordance with a result of the manual match-up that is based on the stored ability value of each player character, evaluate the result of the manual match-up to identify as a winning player character that of the two player characters that won the manual match-up, and to identify as a losing player character that of the two player characters that lost the manual match up, update the ability values of the winning player character of the two player characters in a first manner, and update the ability values of the losing player character of the two player characters in a second manner, different than the first manner, based on the result of the manual match-up and a game player's operational input at one of said at least one communication terminal, and cause the memory to store the updated ability values of the winning player character and the losing player character, evaluate timing information to determine a specified time at which to perform a league competition, create, at the specified time at which the league competition is to begin, copy data of a version of the stored ability values of the player characters associated with the different sets of game player identification information that exists at the specified time at which the league competition is to begin, automatically perform the league competition at the specified time by executing an automatic match-up between player characters at the specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, and during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to said at least one communication terminals, a result of at least one automatic match-up either for a specified past time period or at a predetermined number of times and/or of a ranking of a corresponding set of game player identification information based on said result of at least one automatic match-up.

22. A game control method configured to be executed by a game control device connected to at least one communication terminal through a network, the at least one communication terminal being operated by a game player, for executing a match-up between two player characters associated with two respective sets of unique game player identification information, the game control method comprising:

exemplifying, by a at least one physical ability of each player character by assigning an ability value to each player character in association with a corresponding set of unique game player identification information, storing, in a memory, the ability value of each player character in association with a corresponding set of unique game player identification information, interpreting, by a processor, an input at one of said at least one communication terminal as an indication to perform an individual competition by executing a manual match-up between two player characters in response to input at one of said at least one communication terminal, the two player characters being associated with respective sets of game player identification information that are different from each other, to determine a result of the individual competition in accordance with a result of the manual match-up that is based on the stored ability value of each player character;

evaluating the result of the manual match-up to identify as a winning player character that of the two player characters that won the manual match-up, and to identify as a losing player character that of the two player characters that lost the manual match up;

updating, by the processor, the ability values of the two player characters in a first manner, update the ability values of the losing player character of the two player characters in a second manner, different than the first manner, and storing the updated ability values of the winning player character and the losing player character in the memory;

evaluating, by the processor, timing information to determine a specified time at which to perform a league competition;

creating, by the processor at the specified time at which the league competition is to begin, copy data of a version of the stored ability values of the player characters associated with the different sets of game player identification information that exists at the specified time at which the league competition is to begin;

automatically performing, by the processor, an automatic match-up between player characters at a specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, to automatically determine a result of the automatic match-up based on the stored ability value of each player character;

evaluating, by the processor during the executing of the automatic match-up, competition between the player characters, and updating the ability values of the player characters associated with the different sets of game player identification information stored in the memory based on the competition while executing the automatic match-up based on the copy data; and transmitting, by a communication interface, said at least one communication terminal of a result of at least one automatic match-up either for a specified past time period or at a predetermined number of times and/or of a ranking of a corresponding set of game player identification information based on said result of at least one automatic match-up.

23. A game system including at least one communication terminal operated by a game player and a game control device connected to each of said at least one communication terminal through a network for executing a match-up between two player characters associated with two sets of unique game player identification information, the game control device comprising:

a memory;

a processor configured to:

exemplify at least one physical ability of each player character by assigning an ability value to each player character in association with a corresponding set of unique game player identification information, store in the memory the ability value of each player character in association with a corresponding set of unique game player identification information, interpret an input at one of said at least one communication terminal as an indication to perform an individual competition by executing a manual match-up between two player characters in response to an input at one of said at least one communication terminal, the two player characters being associated with respective sets of game player identification information that are different from each other, and to determine a result of the individual competition in accordance with a result of the manual match-up that is based on the stored ability value of each player character, evaluate the result of the manual match-up to identify as a winning player character that of the two player characters that won the manual match-up, and to identify as a losing player character that of the two player characters that lost the manual match up, update the ability values of the winning player character of the two player characters in a first manner, update the ability values of the losing player character of the two player characters in a second manner, different than the first manner, and cause the memory to store the updated ability values of the winning player character and the losing player character, evaluate timing information to determine a specified time at which to perform a league competition, create, at the specified time at which the league competition is to begin, copy data of a version of the stored ability values of the player characters associated with the different sets of game player identification information that exists at the specified time at which the league competition is to begin, automatically perform the league competition at the specified time by executing an automatic match-up between player characters at said specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, the player characters being associated with different sets of game player identification information, and automatically determine a result of the automatic match-up based on the stored ability value of each player character, during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to said at least one communication terminals, a result of at least one automatic match-up either for a specified past time period or at a predetermined number of times and/or of a ranking of a corresponding set of game player identification information based on said result of at least one automatic match-up.

24. A game control device connected to at least one communication terminal through a network, the at least one communication terminal being operated by a game player, for executing a match-up between two respective sets of unique game player identification information, the game control device comprising:

a memory;

a processor configured to:

exemplify at least one physical ability of each player character by assigning an ability value to each player character in association with a corresponding set of unique game player identification information, store in the memory the ability value of each player character in association with a corresponding set of unique game player identification information, interpret an input at one of said at least one communication terminal as an indication to perform an individual competition by executing a manual match-up between two sets of game player identification information in response to input at one of said at least one communication terminal, the two sets of game player identification information being different from each other, and to determine a result of the individual competition in accordance with a result of the manual match-up that is based on the stored ability value associated with each game player identification information, evaluate the result of the manual match-up to identify as a winning player character that of the two player characters that won the manual match-up, and to identify as a losing player character that of the two player characters that lost the manual match up, update the ability values of the winning player character of the two player characters in a first manner, update the ability values of the losing player character of the two player characters in a second manner, different than the first, and cause the memory to store the updated ability values of the winning player character and the losing player character, evaluate timing information to determine a specified time at which to perform a league competition, create, at the specified time at which the league competition is to begin, copy data of a version of the stored ability values of the player characters associated with the different sets of game player identification information that exists at the specified time at which the league competition is to begin, automatically perform the league competition at the specified time by executing an automatic match-up between two sets of game player identification information at said specified, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, and automatically determine a result of the automatic match-up based on the stored ability value associated with each game player identification information, and during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to said at least one communication terminals a result of at least one automatic match-up either for a specified past time period or at a predetermined number of times and/or of a ranking of a corresponding set of game player identification information based on said result of at least one automatic match-up.

25. A game control method configured to be executed by a game control device connected to at least one communication terminal through a network, the at least one communication terminal being operated by a game player, for executing a match-up between two respective sets of unique game player identification information, the game control method comprising:

exemplifying, by a at least one physical ability of each player character by assigning an ability value to each player character in association with a corresponding set of unique game player identification information, storing, in the memory, the ability value of each player character in association with a corresponding set of unique game player identification information, interpreting, by the processor, an input at one of said at least one communication terminal as an indication to perform an individual competition by executing a manual match-up between two sets of game player identification information in response to input at one of said at least one communication terminal, the two sets of game player identification information being different from each other, to determine a result of the individual competition in accordance with a result of the manual match-up that is based on the stored ability value associated with each game player identification information;

evaluate the result of the manual match-up to identify as a winning player character that of the two player characters that won the manual match-up, and to identify as a losing player character that of the two player characters that lost the manual match up, updating, by the processor, the ability values of the winning player character of the two player characters in a first manner, update the ability values of the losing player character of the two player characters in a second manner, different than the first, and storing the updated ability values of the winning player character and the losing player character;

evaluating, by the processor, timing information to determine a specified time at which to perform a league competition;

creating, by the processor at the specified time at which the league competition is to begin, copy data of a version of the stored ability values of the player characters associated with the different sets of game player identification information that exists at the specified time at which the league competition is to begin;

automatically performing, by the processor, an automatic match-up between two sets of game player identification information at a specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, to automatically determine a result of the automatic match-up based on the stored ability value associated with each game player identification information;

evaluating, by the processor during the executing of the automatic match-up, competition between the player characters and updating the ability values of the player characters associated with the different sets of game player identification information stored in the memory based on the competition while executing the automatic match-up based on the copy data; and transmitting, by a communication interface, said at least one communication terminal of a result of at least one automatic match-up either for a specified past time period or at a predetermined number of times and/or of a ranking of a corresponding set of game player identification information based on said result of at least one automatic match-up.

26. A game system including at least one communication terminal operated by a game player and a game control device connected to each of said at least one communication terminal through a network for executing a match-up between two sets of unique game player identification information, the game control device comprising:

a memory;
a processor configured to:
exemplify at least one physical ability of each player character by assigning an ability value to each player character in association with a corresponding set of unique game player identification information, store in the memory the ability value of each player character in association with a corresponding set of unique game player identification information, interpret an input at one of said at least one communication terminal as an indication to perform an individual competition by executing a manual match-up between two sets of game player identification information in response to input at one of said at least one communication terminal, the two sets of game player identification information being different from each other, and to determine a result of the individual competition in accordance with a result of the manual match-up that is based on the stored ability value associated with each game player identification information, evaluate the result of the manual match-up to identify as a winning player character that of the two player characters that won the manual match-up, and to identify as a losing player character that of the two player characters that lost the manual match up, update the ability values of the winning player character of the two player characters in a first manner, update the ability values of the losing player character of the two player characters in a second manner, different than the first manner, and cause the memory to store the updated ability values of the winning player character and the losing player character, evaluate timing information to determine a specified time at which to perform a league competition, create, at the specified time at which the league competition is to begin, copy data of a version of the stored ability values of the player characters associated with the different sets of game player identification information that exists at the specified time at which the league competition is to begin, automatically perform the league competition at the specified time by executing an automatic match-up between two sets of game player identification information at said specified time, the automatic match-up being based on the copy data of the stored ability values of the player characters participating in the automatic match-up, the automatic match-up being performed independently from the manual match-up without receiving a command to begin the automatic match-up from any said communication terminal and without receiving any input from any said communication terminal during the automatic match-up, and automatically determine a result of the automatic match-up based on the stored ability value associated with each game player identification information, and during the executing of the automatic match-up, evaluating competition between the player characters, and updating the ability values of the player characters associated with the different sets of game player identification information stored in the memory based on the competition while executing the automatic match-up based on the copy data; and a communication interface configured to transmit, to said at least one communication terminals a result of at least one automatic match-up either for a specified past time period or at a predetermined number of times and/or of a ranking of a corresponding set of game player identification information based on said result of at least one automatic match-up.

* * * * *